United States Patent
Damon et al.

(10) Patent No.: US 10,945,815 B2
(45) Date of Patent: Mar. 16, 2021

(54) ORTHODONTIC BRACKET

(71) Applicant: Premier Orthodontic Designs, LLLP, Carson City, NV (US)

(72) Inventors: Paul L. Damon, Spokane, WA (US); Dwight H. Damon, Spokane, WA (US)

(73) Assignee: Premier Orthodontics Designs, LLLP, Carson City, NV (US)

( * ) Notice: Subject to any disclaimer, the term of this patent is extended or adjusted under 35 U.S.C. 154(b) by 916 days.

(21) Appl. No.: 14/702,961

(22) Filed: May 4, 2015

(65) Prior Publication Data

US 2015/0230887 A1    Aug. 20, 2015

Related U.S. Application Data

(63) Continuation-in-part of application No. 13/970,100, filed on Aug. 19, 2013, now Pat. No. 9,198,740.

(51) Int. Cl.
| | |
|---|---|
| *A61C 7/14* | (2006.01) |
| *A61C 7/16* | (2006.01) |
| *A61C 7/28* | (2006.01) |
| *A61C 7/30* | (2006.01) |

(52) U.S. Cl.
CPC ............... *A61C 7/146* (2013.01); *A61C 7/14* (2013.01); *A61C 7/141* (2013.01); *A61C 7/16* (2013.01); *A61C 7/287* (2013.01); *A61C 7/30* (2013.01)

(58) Field of Classification Search
CPC .... A61C 7/12; A61C 7/14; A61C 7/16; A61C 7/28; A61C 7/141; A61C 7/146; A61C 7/285; A61C 7/34; A61C 7/287; A61C 7/30

USPC ........................................................ 433/2–24
See application file for complete search history.

(56) References Cited

U.S. PATENT DOCUMENTS

| | | | | |
|---|---|---|---|---|
| 2,379,011 A | * | 6/1945 | Laskin ...................... | A61C 7/12 433/16 |
| 2,908,974 A | * | 10/1959 | Stifter ...................... | A61C 7/12 433/16 |
| 3,721,005 A | * | 3/1973 | Cohen ...................... | A61C 7/14 433/16 |
| 4,243,387 A | | 1/1981 | Prins | |
| 4,353,692 A | | 10/1982 | Karrakussoglu | |
| | | (Continued) | | |

FOREIGN PATENT DOCUMENTS

| | | |
|---|---|---|
| EP | 2457535 A1 | 5/2012 |
| FR | 2710830 A1 | 7/1993 |
| | (Continued) | |

OTHER PUBLICATIONS

PCT Search Report dated Apr. 14, 2014.
(Continued)

*Primary Examiner* — Edward Moran
*Assistant Examiner* — Matthew P Saunders
(74) *Attorney, Agent, or Firm* — Wood Herron & Evans LLP

(57) ABSTRACT

An orthodontic bracket includes a platform base having a posterior facing surface and is matingly and releasably positioned adjacent to an anterior facing surface of a patient's tooth. The patient's tooth is subject to a multiple step orthodontic treatment regimen. The platform base remains affixed to the patient's tooth throughout the multiple step orthodontic treatment regimen selected by the treating clinician.

12 Claims, 34 Drawing Sheets

(56) References Cited

U.S. PATENT DOCUMENTS

| | | | |
|---|---|---|---|
| 4,427,381 A | 1/1984 | Hall | |
| 4,487,581 A * | 12/1984 | Adler | A61C 7/30 433/16 |
| 4,496,317 A | 1/1985 | Hulsey | |
| 4,597,739 A * | 7/1986 | Rosenberg | A61C 7/12 433/16 |
| 4,850,865 A | 7/1989 | Napolitano | |
| 5,302,121 A | 4/1994 | Gagin | |
| 5,358,402 A | 10/1994 | Reed et al. | |
| 5,380,196 A | 1/1995 | Kelly et al. | |
| 5,464,347 A | 11/1995 | Allesee | |
| 5,474,447 A * | 12/1995 | Chikami | A61C 7/12 433/10 |
| 5,618,175 A * | 4/1997 | Reher | A61C 7/141 433/16 |
| 5,820,370 A | 10/1998 | Allesee et al. | |
| 5,954,502 A | 9/1999 | Tuenge et al. | |
| 6,071,118 A | 6/2000 | Damon | |
| 6,264,469 B1 | 7/2001 | Moschik | |
| 6,305,932 B1 | 10/2001 | Mottate | |
| 7,192,274 B2 | 3/2007 | Stadtmiller et al. | |
| 7,306,458 B1 | 12/2007 | Lu | |
| 7,431,586 B1 | 10/2008 | Silverman | |
| 8,366,440 B2 * | 2/2013 | Bathen | A61C 7/28 433/16 |
| 8,550,814 B1 * | 10/2013 | Collins | A61C 7/12 433/17 |
| 9,198,740 B2 | 12/2015 | Damon et al. | |
| 9,636,191 B2 * | 5/2017 | Damon | A61C 7/14 |
| 2002/0110771 A1 | 8/2002 | Abels et al. | |
| 2005/0239012 A1 | 10/2005 | Bathen et al. | |
| 2006/0051721 A1 | 3/2006 | Carriere Lluch | |
| 2008/0293005 A1 | 11/2008 | Rahlis et al. | |
| 2009/0004619 A1 | 1/2009 | Oda et al. | |
| 2010/0285420 A1 | 11/2010 | Oda | |
| 2010/0304321 A1 | 12/2010 | Patel | |
| 2011/0183280 A1 | 7/2011 | Cosse et al. | |
| 2011/0311934 A1 | 12/2011 | Kantomaa | |
| 2012/0064475 A1 | 3/2012 | Lewis et al. | |
| 2012/0122050 A1 | 5/2012 | Bathen et al. | |
| 2012/0276496 A1 | 11/2012 | Bathen et al. | |
| 2012/0308952 A1 * | 12/2012 | Cosse | A61C 7/12 433/3 |
| 2012/0315593 A1 * | 12/2012 | Ramos-de-la-Pena | A61C 7/14 433/9 |
| 2014/0065567 A1 * | 3/2014 | Rahimi | A61C 7/14 433/9 |
| 2014/0205962 A1 * | 7/2014 | Damon | A61C 7/22 433/13 |
| 2014/0272751 A1 * | 9/2014 | Cosse | A61C 7/02 433/9 |
| 2015/0050612 A1 | 2/2015 | Damon et al. | |
| 2015/0157422 A1 * | 6/2015 | Cosse | A61C 7/287 433/16 |
| 2015/0182306 A1 * | 7/2015 | Chen | A61C 7/143 433/9 |
| 2015/0238281 A1 | 8/2015 | Alauddin et al. | |
| 2015/0305833 A1 | 10/2015 | Cosse | |
| 2015/0359611 A1 * | 12/2015 | Rudman | A61C 7/002 433/9 |
| 2016/0045284 A1 | 2/2016 | Damon et al. | |
| 2016/0045285 A1 | 2/2016 | Damon et al. | |
| 2016/0045286 A1 | 2/2016 | Damon et al. | |
| 2018/0368947 A1 * | 12/2018 | Cosse | A61C 7/30 |

FOREIGN PATENT DOCUMENTS

| | | |
|---|---|---|
| WO | 9400072 A1 | 1/1994 |
| WO | WO9509580 A1 | 4/1995 |
| WO | 2011141937 A1 | 11/2011 |
| WO | WO2012141937 A1 | 11/2011 |

OTHER PUBLICATIONS

PCT Notification of Transmittal of International Search Report and Written Opinion dated Jul. 21, 2016.

Office Action dated Apr. 30, 2015.

European Patent Office, Extended European Search Report in corresponding European Application No. 16789743.8 dated Nov. 28, 2018.

Japanese Patent Office, Office Action issued in JP 2017-555622 dated Apr. 23, 2020, 3 pages.

PCT Office, International Preliminary Report on Patentability issued in PCT/US2019/017575 dated Aug. 18, 2020.

U.S. Patent and Trademark Office, Office Action issued in corresponding U.S. Appl. No. 15/895,190 dated Nov. 16, 2020.

* cited by examiner

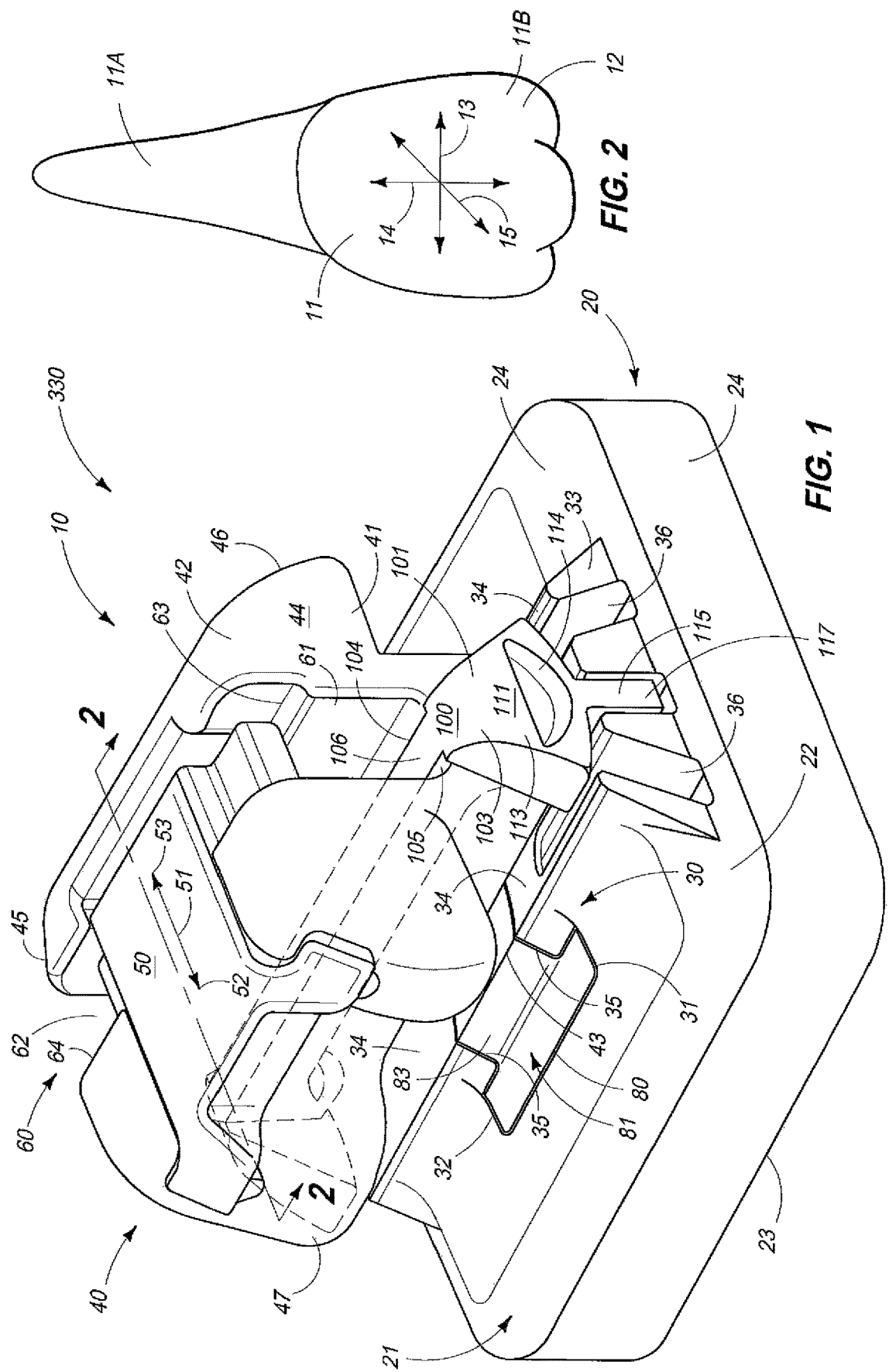

ORTHODONTIC BRACKET

TECHNICAL FIELD

The present invention relates to an orthodontic bracket, and more specifically to an orthodontic bracket which includes a platform base, and which is affixed to a patient's tooth, and which further is operable to matingly and operably cooperate with a multiplicity of bracket bodies of different designs in order to facilitate the implementation of a multiple step orthodontic treatment regimen or plan which is established by a clinician.

BACKGROUND OF THE INVENTION

In earlier U.S. patent application Ser. Nos. 13/745,638 and 13/970,100, the contents of which are incorporated by reference herein, orthodontic brackets are described, and which when used in combination with an archwire, provides first, second and third orders of movement of a patient's tooth without a clinically predetermined manipulation of the archwire, and which is received in the transversely disposed archwire slot. The various forms of the invention as disclosed in these pending U.S. patent applications provide a multitude of patient and clinical advantages not possible in orthodontic appliances which have been utilized heretofore.

Generally speaking, first order movements are commonly thought of as tooth rotation, and in/out tooth control. Further, second order movements are often referred to as "tipping" the root of the tooth in a mesial and/or distal angulation or elevation, and/or depression of a tooth position. Further, third order movement, or "couples" have resulted in the expression of "torque," which causes the axial inclination of a tooth from a flared or upright orientation to its final and desired position. From its earliest utilization, and to achieve ideal tooth positioning, a clinician has, heretofore, been required to bend round and rectangular cross-sectionally shaped archwires to express the in/out, up/down, tipping, and torque to accomplish a final desired tooth position. This activity not only took long periods of time, and advanced clinical practice skills, but it was nearly impossible for most clinicians to control the resulting treatment forces applied in all planes of space. As a result, the duration of the treatment times for patients were often unduly long, and the resulting treatment forces which were applied often had a negative long-term impact on the patient's bone and tissue.

As should be understood, clinicians have developed preferred orthodontic treatment regimens or plans for routinely reoccurring tooth anomalies based upon a number of factors which include, but are not limited to, commonly available orthodontic appliances, which have been designed to address the anomaly; the clinician's experienced success using previously available commercially available orthodontic appliances; and the time necessary for the clinician to learn, and then implement new orthodontic practices and appliances based upon their current patient load, and their own experience in treating orthodontic anomalies.

As human nature would have it, many individuals, including treating clinicians, often find it difficult to implement new practices because of the pressing needs of patients, delays in treatment times, uncertain orthodontic outcomes in utilizing new treatments and appliances, and the financial implications attendant in juggling and revising treatment plans for sometimes hundreds of patients in their practices. These and other concerns frequently causes delays in the adoption of new practices and devices. While such delays in the adoption of new treatments and devices is not tantamount to clinical malpractice, it is clear that the delay in the implementation of demonstrated improved orthodontic treatment techniques often are not in the patients' best interest, and certainly often result in prolonged patient treatment times.

In the treatment of various orthodontic maladies, a treating clinician often develops a multiple-step treatment regimen or plan. These orthodontic treatment regimens often require the utilization of a multitude of differently designed orthodontic appliances or orthodontic brackets to complete the treatment regimen within a given treatment duration period. During the orthodontic treatment period, the clinician is often required to remove a given orthodontic appliance or bracket from a tooth of a patient, and then replace it with another appliance. This replacement of the orthodontic appliance or bracket requires a patient visit to the clinician; a removal of the orthodontic appliance from the tooth; and then a replacement of the previous orthodontic appliance with a new appliance. These repeated visits to an orthodontic clinician are often time consuming for the patient, and some discomfort is often experienced by the patient. Often in a given orthodontic treatment regimen or plan, this event will occur multiple times during the orthodontic treatment duration. This process of placing and then removing orthodontic brackets from a patient's teeth is often time consuming, and ultimately delays the movement of the patient's teeth to the desired location in order to achieve the orthodontic treatment objectives that are being sought by patient and the clinician.

While the many orthodontic appliances that have been utilized, heretofore, including those orthodontic appliances as set forth in the earlier-mentioned pending U.S. patent applications have worked with great degrees of success, numerous shortcomings attendant with the utilization of such prior art orthodontic appliances, as set forth in the paragraphs above, remain. Again, treatment times are often extended, and clinicians have continued to find it difficult to achieve the desired first, second and third orders of movement which are necessary in order to achieve a pleasing, and lasting treatment result for the patient. A new orthodontic bracket, which achieves the objectives mentioned above, and which further facilitates increased patient comfort and allows treating clinicians an opportunity to select among a wide range of previously familiar orthodontic appliances, and then utilize them efficiently in the implementation of a selected patient treatment regimen or plan, is the subject matter of the present application.

SUMMARY OF THE INVENTION

A first aspect of the present invention relates to an orthodontic bracket, which includes a platform base having a posterior facing surface, and which is matingly, and releasably positioned adjacent to an anterior facing surface of a patient's tooth, and wherein the patient's tooth is subject to a multiple-step orthodontic treatment regimen which is provided by a clinician to treat an orthodontic anomaly which the patient possesses, and wherein the orthodontic treatment regimen requires that the patient's tooth be subjected to varying degrees of torque, and/or other forces, and which, in combination, corrects the orthodontic anomaly, and wherein the platform base remains affixed to the patient's tooth throughout the multiple-step orthodontic treatment regimen selected by the treating clinician.

Another aspect of the present invention relates to an orthodontic bracket which includes a platform base, and which further is releasably retained on an anterior facing surface of a patient's tooth, and which additionally requires an orthodontic treatment regimen which is selected by a clinician; and multiple bracket bodies which can individually, matingly, and sequentially cooperate with the platform base so as to facilitate the orthodontic treatment regimen for a patient by the treating clinician, and without a removal of the platform base from the anterior facing surface of the patient's tooth during the orthodontic treatment regimen.

Still further, another aspect of the present invention relates to an orthodontic bracket which includes a platform base and which is releasably affixed to a tooth of a patient undergoing a multiple step orthodontic treatment regimen prescribed by a clinician, and wherein the platform base remains affixed to the tooth of the patient during the duration of the orthodontic treatment regimen, and wherein the orthodontic treatment regimen selected by the clinician may require that the clinician impart a first, second, and/or third order of movement to the tooth of the patient undergoing the orthodontic treatment regimen; and a multiplicity of bracket bodies which are selected by the clinician, and which individually, and sequentially, releasably and matingly cooperate with the platform base, during a predetermined, selected time period during the duration of the orthodontic treatment regimen, and which individually and/or collectively, facilitate the delivery of a clinician selected amount of force to the tooth undergoing the orthodontic treatment regimen so as to impart the first, second and/or third orders of movement selected by the clinician to achieve a desired movement of the patient's tooth.

Yet still another aspect of the present invention relates to an orthodontic bracket which includes a platform base which is matingly and releasably positioned adjacent to an anterior facing surface of a patient's tooth, and wherein the patient's tooth is subject to a multiple-step orthodontic treatment regimen, and wherein the platform base has an anterior and a posterior facing surface; a multiplicity of bracket bodies which are operable to individually, matingly, and sequentially cooperate with the anterior facing surface of the platform base, and which implement an individual step of the multiple-step orthodontic treatment regimen; and a pad which is made integral with the posterior facing surface of the platform base, and which further has a posterior facing surface which is juxtaposed relative to the anterior facing surface of the patient's tooth, and wherein the pad has a predetermined, and variable thickness dimension and topography which locates the respective bracket bodies which cooperate with the platform base in an orientation relative to the patient's tooth which is undergoing an orthodontic treatment regimen so as to impart varying degrees of torque, and other forces, and which, in combination corrects an orthodontic anomaly which the patient's tooth possesses.

These and other aspects of the present invention will be discussed in greater detail hereinafter.

BRIEF DESCRIPTION OF THE DRAWINGS

Preferred embodiments of the invention are described, below, with reference to the following accompanying drawings.

FIG. 1 is a perspective, side elevation view of one form of the orthodontic bracket of the present invention.

FIG. 2 is a greatly simplified and enlarged view of a patient's tooth showing individual orders of movement.

DETAILED DESCRIPTION OF THE PREFERRED EMBODIMENTS

Figure 3:
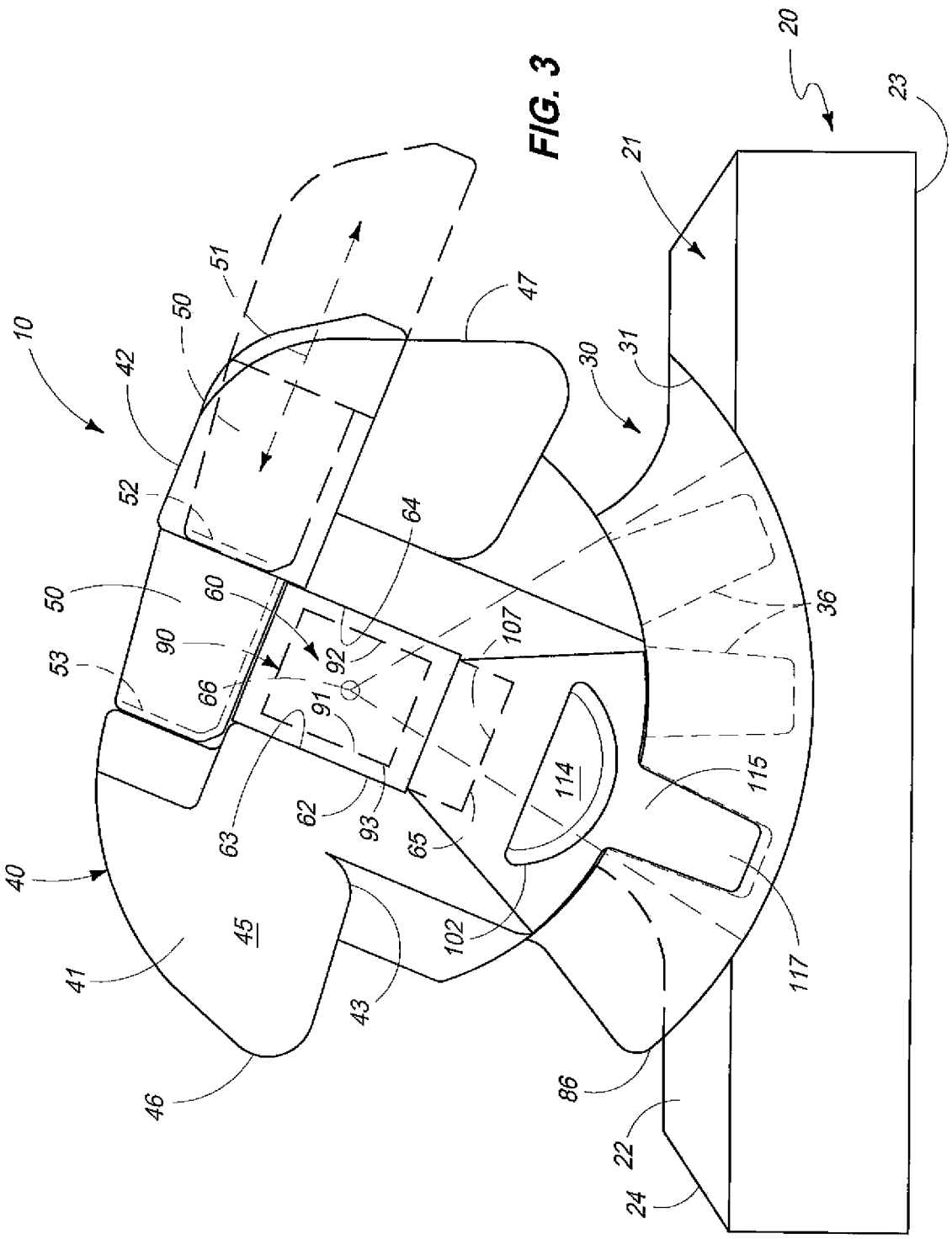
FIG. 3 is a side elevation view of the first form of the orthodontic bracket, as seen in FIG. 1.
Figure 4:
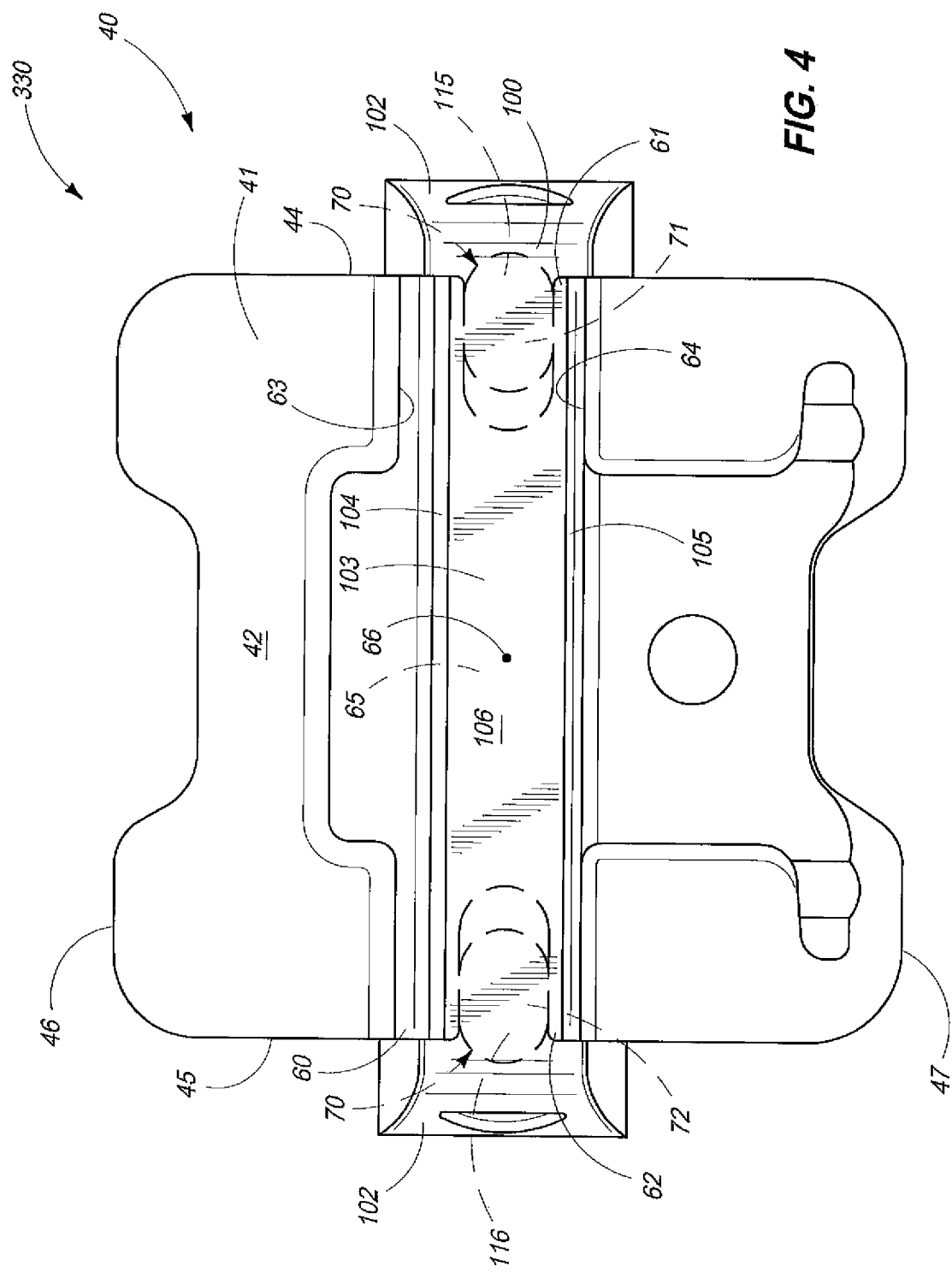
FIG. 4 is an anterior, side elevation view of the first form of the orthodontic bracket, as seen in FIG. 1, with a gate removed to show the structure thereunder.
Figure 5:
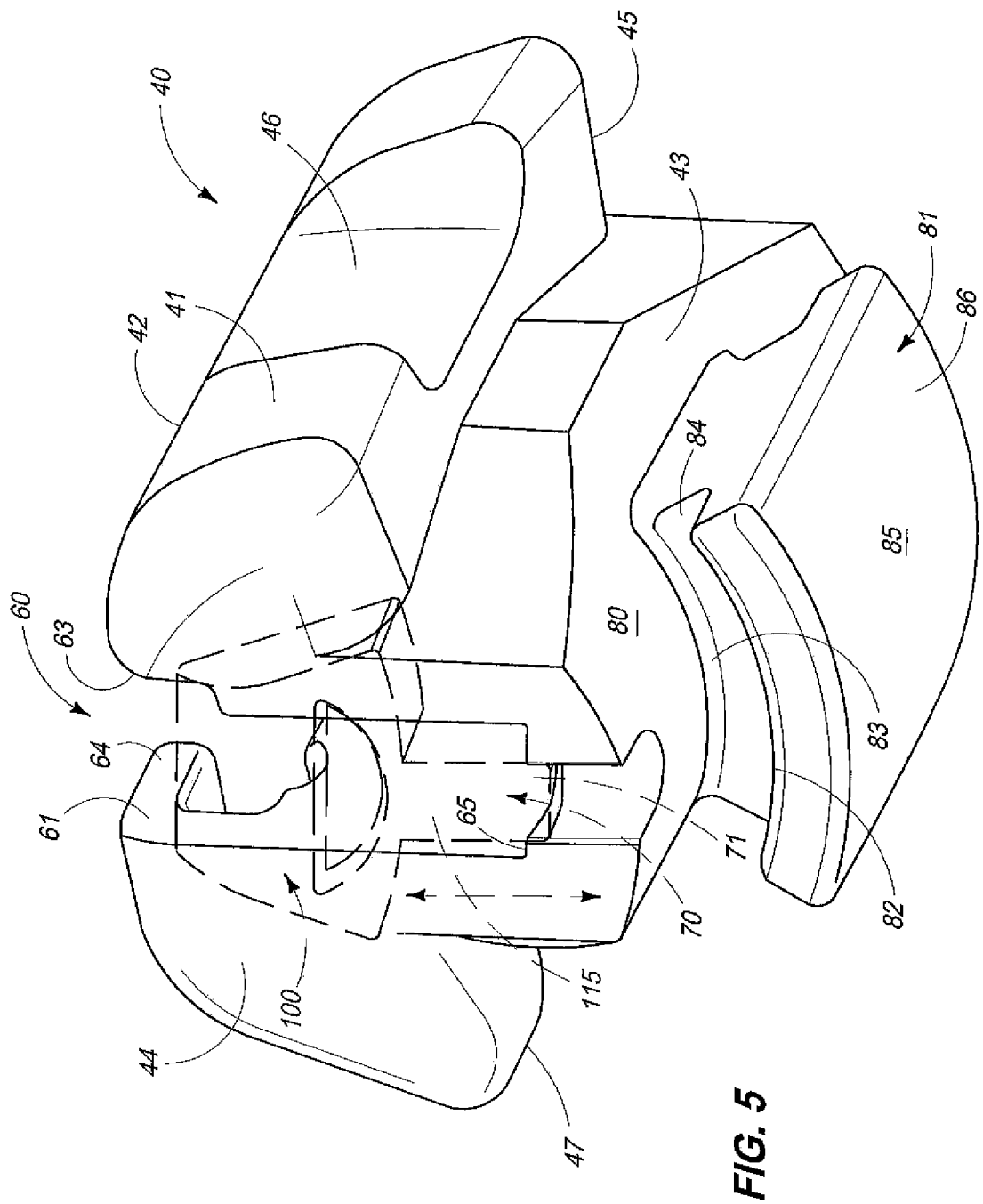
FIG. 5 is a fragmentary, perspective, side elevation view of a bracket body which forms a feature of the orthodontic bracket, as seen in FIG. 1.

This disclosure of the invention is submitted in furtherance of the constitutional purposes of the U.S. Patent laws to "promote the progress of science and useful arts" (Article I, Section 8).

The first form of the present invention is generally indicated by the numeral 10 in FIG. 1, and following. For purposes of the present invention, it will be understood that the various forms of the invention, as described, hereinafter, will be used to implement a multiple-step orthodontic treatment regimen or plan, which is provided by a clinician to treat one or several orthodontic anomalies which a patient possesses. The orthodontic bracket 10 of the present invention is releasably affixed by means of a suitable adhesive or other means to a patient's tooth 11 as seen in FIG. 2, and in particular to the anterior facing surface 12 thereof. The orthodontic bracket 10, in its various forms, will be discussed, hereinafter, and when used in combination with an archwire, and other orthodontic appliances as will be described, is operable to provide varying degrees of torque, and/or other forces, and which, in combination, corrects the orthodontic anomaly that the tooth of the patient possesses. The force applied to the tooth 11 may be in the form of a multiplicity of selective torque expressions which individually, and forcibly act upon a patient's tooth 11. The patient's tooth includes a root 11A and a crown 11B. For purposes of this patent application the term "torque expression" as used, hereinafter, is defined as a force which provides rotation of a patient's tooth 11 around the X axis, that being the axis which lies in the mesial/distal direction. In particular, the orthodontic bracket 10 of the present invention can be employed to achieve first, second and third order movements 13, 14 and 15 respectively as seen in FIG. 2, without a clinically predetermined manipulation, bending, twisting and/or other rotation of a rectangularly shaped archwire, or the often repeated replacement of the same archwire with different sizes of other archwires during the orthodontic treatment of the patient. Other forces, of course, can be applied to the patient's tooth 11 by other devices, and means, as will be described, hereinafter. Further, and as will be discussed later in this application, the treatment of a patient throughout the multiple step orthodontic treatment regimen may proceed to completion without the removal of a platform base, as will be described, hereinafter, from the patient's tooth, although individual bracket bodies which are releasably mounted in a sequential manner on the platform base may be periodically replaced with a multitude of other clinician selected bracket bodies during the treatment period based upon the clinical judgment of the treating clinician. The present invention 10 provides a novel means by which a clinician, by utilizing an assortment of different bracket bodies, and which can operably and matingly cooperate with the platform base, as will be described, achieves first, second and third order movements of a tooth 11 of a patient, and thereby considerably shortens patient treatment times, and also achieves superior treatment results. The present invention also provides increased patient comfort in a manner not possible, heretofore, by utilizing the prior art appliances or practices which are known and are most familiar to the treating clinician.

As earlier discussed in this application, tooth movement is defined relative to three planes in space. In this regard, movements in these respective planes are categorized as first order, second order and third order movements, that being 13, 14 and 15, respectively. As seen in FIG. 2 first order movements 13 are commonly thought of as rotation and/or in and out movements. This refers to movements that can be viewed from the occlusal perspective. On the other hand, second order movements 14 are often referred to as tipping, and can be viewed from a buccolingual or labiolingual perspective. These include movements in the occlusal-gingival direction, or tipping about the buccolingual or labiolingual axis. As a general matter, rotation about the aforementioned axes would typically result in a tipping of the root 11A or crown 11B of a patient's tooth 11 in a mesial or distal direction. The second order movements 14 are used for paralleling of the roots of the respective teeth 11, as well as elevating or depressing a given tooth. Finally, third order movements 15, and which are commonly thought of as "torque" can be viewed from a mesial-distal perspective, or a buccolingual cross-section. Third order of movements 15 typically refer to movements about the mesial-distal axis. This particular movement is often important when attempting to achieve proper incisor, or labiolingual or buccolingual inclination. First, second and third order movements, again are best seen in FIG. 2, and are indicated by the numerals 13, 14 and 15, respectively.

First Form

In the first form of the invention as seen in FIG. 1, and following, the orthodontic bracket 10 includes a platform base 20, and which has a main body 21 and which defines an anterior facing surface 22; a posterior facing surface 23; and which further has a peripheral edge 24. The posterior facing surface 23 is typically affixed to the anterior facing surface 12 of the patient's tooth 11 by a suitable adhesive, not shown. The platform base 20, following fabrication, has a posterior facing surface 23, having a sufficient material thickness, and which can be modified so as to provide a clinician selected and predetermined amount of torque which can then be exerted on the patient's tooth during a given predetermined orthodontic treatment regimen. During fabrication of the platform base 20, the material thickness of the platform base is thicker, relatively speaking, than the thickness of material as provided in earlier orthodontic appliances. However, this additional material provides greater flexibility for a manufacturer to generate custom orthodontic brackets which may be utilized to address orthodontic anomalies for patients having treatment regimens which are unique.

Figure 6:
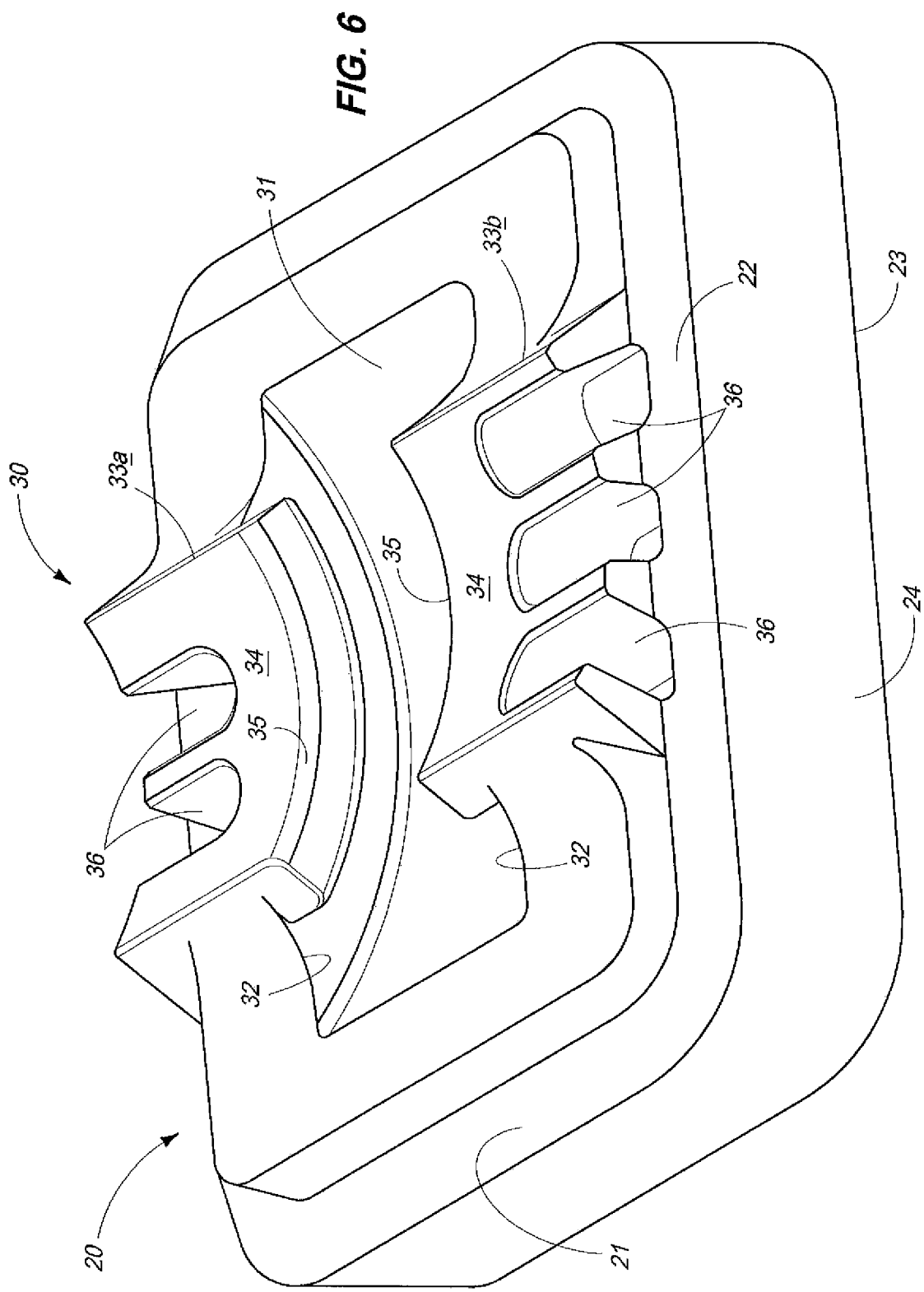
FIG. 6 is a perspective, fragmentary, greatly enlarged, side elevation view of a first form of a platform base, and which finds usefulness in the present invention.
Figure 7:
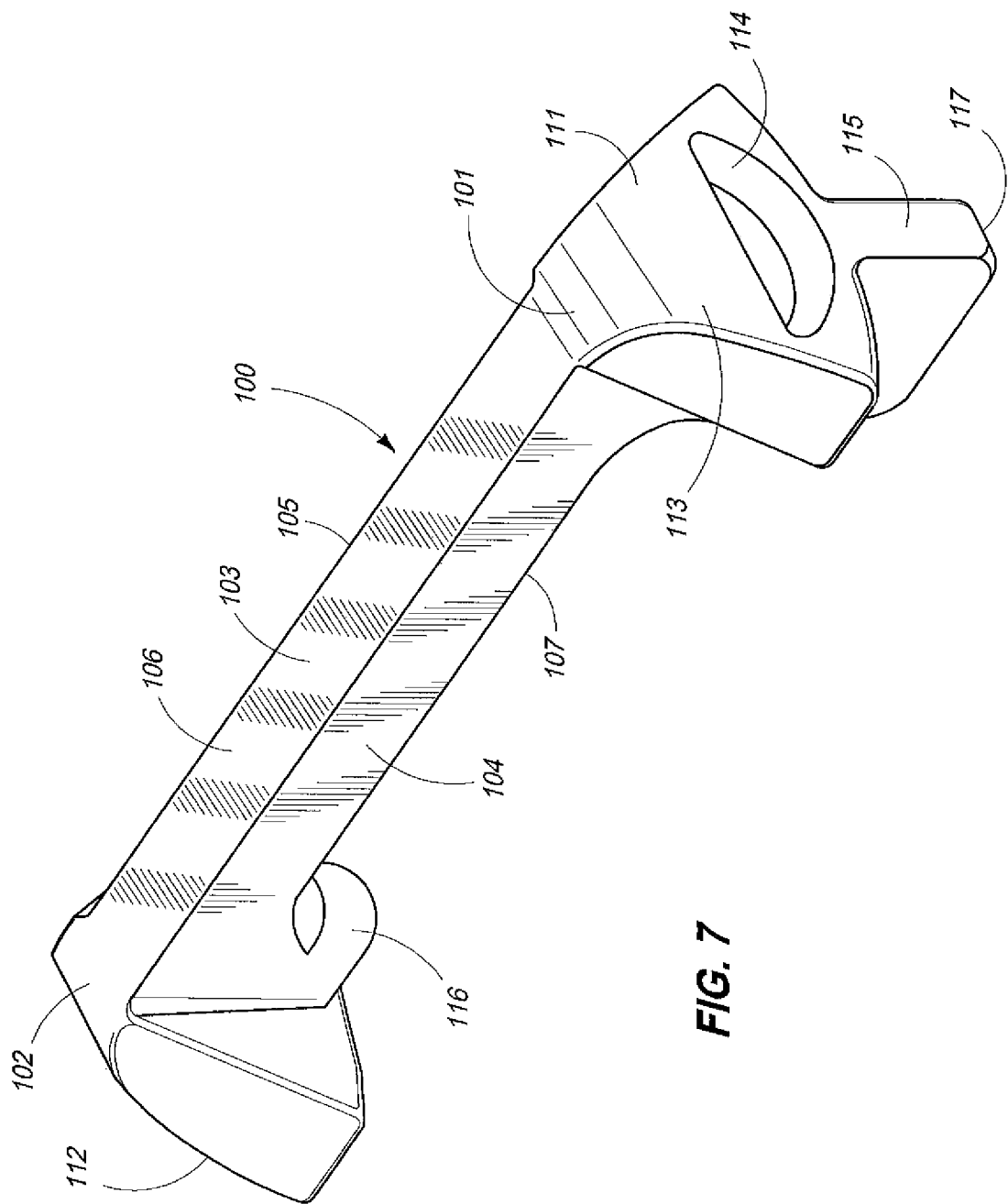
FIG. 7 is a perspective, greatly enlarged, side elevation view of a first form of a bracket body insert, and which finds usefulness in the present invention.

Referring now to FIG. 6, the first form of the invention 10, and more specifically the anterior facing surface 22, of the platform base 20 includes a coupling portion or region which is generally indicated by the numeral 30. The coupling portion or region 30 is defined, in part, by a curved dovetail-shaped slot 31 which is illustrated in FIG. 6 as being substantially concavely shaped. However, and while the form of the invention, as illustrated, shows a concavely shaped dovetail-shaped slot, it is equally feasible that a form of the invention may be fabricated and where the curved dovetail-shaped slot 31 assumes a convexly-curved or a substantially planar shape. Therefore, the invention should not be limited to that which is illustrated. It should be recognized, therefore, that a curved dovetail-shaped slot either of convex, concave, and/or potentially planar arrangements may be equally employed in the fabrication of the present invention. The described coupling portion 30 renders this first illustrated platform base 20, a "universal" base, and which may be utilized with a multiplicity of bracket bodies as will be described, hereinafter. In the arrangement as described, the platform base 20 can be employed with bracket bodies which employ passive ligation, active ligation, or conventionally tied brackets. In view of this feature a clinician no longer has to remove the platform base 20 when replacing orthodontic brackets during the implementation of an orthodontic treatment regimen. Rather, a clinician must only remove the bracket body from the coupling portion 30, and then reattach an alternative bracket body which will achieve the clinician selected benefits which are to be employed in the implementation of the multiple step orthodontic treatment regimen. As earlier discussed, the platform base 20 can stay affixed on the tooth 11 during the entire time of the orthodontic treatment thereby expediting the treatment, and making the overall treatment regimen much more comfortable for the patient. The curved dovetail-shaped slot 31 is defined, at least in part, by a pair of spaced sidewalls 32. Additionally, the coupling portion 30 is defined, at least in part, by a centrally located, and elevated region 33 having opposite sides, here identified as 33A and 33B, respectively, and which are located on the opposite sides of the curved dovetail-shaped slot 31. The centrally elevated regions 33A and 33B, respectively, each have a curved upwardly facing surface 34 having the same curvature as that of the curved dovetail-shaped slot 31. Each of the centrally elevated regions 33 includes inwardly extending flange portions 35, and which provide a means for slidably and matingly capturing and cooperating with a moveable bracket body as will be discussed in greater detail, hereinafter. Additionally, and formed in each of the centrally elevated regions 33, and extending downwardly through the curved upwardly facing surface 34 is a multiplicity of engagement regions which are generally indicated by the numeral 36. The engagement regions are individually sized so as to matingly receive, and cooperate with, a bracket body insert as will be described in greater detail, hereinafter. It will be noted from studying FIG. 6 that the multiplicity of engagement regions 36 are disposed in a predetermined, spacial pattern which provides a convenient means for adjustably positioning the rotatable orientation of a bracket body which moveably, and mating cooperates with the platform base 20 so as to impart a given amount of torque or other force to an archwire which is received within an archwire slot, and which is further defined by the individual bracket bodies as will be described, below.

The orthodontic bracket 10 as illustrated in FIGS. 1 through 10, for example, includes a moveable bracket body 40, and which is borne on, or moveably and matingly cooperates with, the platform base 20. In this regard the bracket body 40 has a main body 41 which is defined, at least in part, by an anterior facing surface 42, and an opposite, posterior facing surface 43. Still further, the bracket body is defined by opposite first (mesial), and second (distal) sides, 44 and 45, respectively, and which are further located at a predetermined distance, one relative to the other. Still further the bracket body 40 includes a superior facing surface 46, and an opposite, inferior facing surface 47. The superior and inferior facing services 46 and 47, define respective wings which are well known in the art. As seen in FIGS. 1 through 10, the bracket body 40 mounts a moveable gate which is generally indicated by the numeral 50, and which is well known in the art. The moveable gate 50 is operable to reciprocally travel or move along a defined path of travel 51, and between a first, down or open position 52; and a second, up, or occluding position 53, relative to an archwire slot which is further defined by the bracket body 40, and which is illustrated in the drawings. The gate 50 which moveably cooperates with the anterior facing surface 42, of the bracket body 40, is operable to selectively retain an archwire, as will be discussed, below, within a transversely disposed archwire slot which is generally indicated by the numeral 60. The transversely disposed archwire slot 60 has a first end 61, which is located adjacent to the first, mesial side 44 of the bracket body 40, and an opposite, second or distal end 62, and which is adjacent to the second side 45. The archwire slot 60 is defined, at least in part, by a top or superior surface 63, and an opposite, bottom or inferior surface 64. The top and bottom surfaces which define, at least in part, the archwire slot 60, are disposed in substantially parallel, spaced relation, one relative to the other. The given spacial distance between the top and bottom surfaces allows the archwire slot 60 to receive an archwire as will be described, hereinafter. Still further the main body 41 defines a supporting or recessed wall 65 (FIG. 3), and which extends between the top and bottom surfaces 63 and 64, but which does not define the resulting archwire slot 60, as more fully described, below. The archwire slot 60 has a central region or portion which is indicated by the numeral 66. The archwire slot 60 is moveable in both the vertical and horizontal planes as described, below after being moveably coupled to the platform base 20. This rotation of the archwire slot by movement of bracket body 40 in either of the vertical, or horizontal planes, is maintained about the central region 66 of the archwire slot 60 (Please see FIGS. 26A-C). This feature of the invention provides significant benefits and advantages to a clinician who is employing the invention to correct an orthodontic malady. In the invention arrangement as seen in the drawings, it should be understood that the archwire slot 60, as more fully described, below, has a predetermined cross-sectional dimension which is variable by means of various other structures such as by the use of a bracket body insert, as described, below.

The first form of the orthodontic bracket 10, as described, and more specifically the first form of the invention as seen in FIGS. 1 to 7, for example, includes a bracket body 40 having a posterior facing surface 43. The posterior facing surface 43 defines a complimentary, substantially uniformly curved surface which matingly, and moveably engages the coupling portion 30 of the bracket base 21. As earlier described, the coupling portion 30, of the bracket base 21, defines a curved dovetail-shaped slot 31, having a predetermined shape, and dimensions, and the bracket body 40 further includes a complimentary, uniformly curved surface 80, and a mating structure which moveably and matingly engages the coupling portion 30 of the platform base 20 as seen in the drawings. This complimentary, substantially uniformly curved surface 80 which forms, at least in part, the posterior facing surface 43, moveably and matingly cooperates with the curved upwardly facing surface 34 of the centrally elevated region 33, and which further forms a feature of the coupling portion 30. The bracket body 40 also includes a curved male pin member 81 which forms, at least in part, the aforementioned mating structure, and which is made integral with the substantially uniformly curved posterior facing surface 80, of the bracket body 40, and which is further dimensioned for complimentary, slidable, matingly engagable receipt within the curved dovetail-shaped slot 31, and which is formed in the platform base 20. This feature provides a means by which various bracket bodies 40 can be designed to matingly and moveably cooperate with the platform base 20. This feature also allows the platform base 20 to remain attached to the tooth 11 throughout the orthodontic treatment regimen or plan which is selected by a clinician. As should be understood, rotation of the bracket body 40 relative to the platform base 20 is effective in moving the male pin member 81 along the curved dovetail-shaped slot 31 which is formed in the platform base 20. The male pin member 81 is defined, at least in part, by a main body 82, and which includes a central support post, or shaft region 83, and which further is located or otherwise received within the space that is defined between the flange portions 35, and which further, in combination, form the centrally elevated region 33. The central support portion or shaft 83 has a distal end 84. Made integral with the distal end 84 is an enlarged, transversely disposed flange portion 85. The flange portion 85 has a width dimension which is less than the distance as measured between the sidewalls 32, and which individually form a portion of the curved dovetail-shaped slot 31. Further, the same flange portion 85 has a thickness dimension which is less than the distance as measured between the flange portions 35, and the curved dovetail-shaped slot 31. In its curved configuration, the enlarged flange 85 has a complimentary, curved surface 86, and which has a curvature which is substantially similar to that which is provided for the curved dovetail-shaped slot 31. As dimensionally designed, the male pin member 81 matingly interfits or otherwise matingly cooperates and slides along the curved dovetail-shaped slot 31 thereby rendering the bracket body 40 at least partially rotatably moveable within or relative to the curved dovetail-shaped slot 31. Additionally, this feature provides a means by which the bracket body 40 can be readily detached from the platform base 20, and be subsequently replaced with another form of a bracket body in order to achieve additional clinical advantages desired by the treating clinician. When the platform base 20 is appropriately attached to the patient's tooth 11, the transversely disposed archwire slot 60 has a given, predetermined orientation relative to the platform base 20, and the arrangement as provided with this invention permits the individual torque expressions, here indicated as being first, second and third order movements 13, 14 and 15 respectively to be readily adjusted without significantly impacting the predetermined orientation of the transversely disposed archwire slot 60. This is best seen by reference to FIGS. 3 and 28A, B and C, respectively, of the drawings. This is a significant advancement in orthodontic treatment inasmuch as the partial rotation of the bracket body 40 relative to the platform base 20 does not vertically adjust the transversely disposed archwire slot 60 while different torque expressions are provided for moving and correcting the portion of the patient's tooth 11. This is a very significant and novel advantage over previously disclosed orthodontic appliances.

As illustrated in the drawings, the orthodontic bracket 10, as described in the present invention, is operable to receive and cooperate with an archwire 90, which is received within the archwire slot 60. The archwire 90 is of traditional design, and is further defined by opposite top and bottom surfaces 91 and 92, and sidewalls 93, which connect the top and bottom surfaces together, and which further form a substantially rectangular or square cross-section. In the arrangement as seen in the drawings, the archwire 90 is received within the transversely disposed archwire slot 60; and the bracket body 40, as illustrated, acting in combination with the archwire 90, is adjustable along both the horizontal or vertical planes, so as to provide a multiplicity of selective torque expressions 13 through 15, respectively, and which forcibly act upon the patient's tooth 11, so as to move it in a fashion which achieves a clinically desirable orientation and benefit within the patient's mouth. The present invention 10 includes a bracket body insert 100, and which is best seen by reference to FIG. 7. The bracket body insert 100 is received within the archwire slot 60, at a time before the archwire 90 is received in the archwire slot 60. The bracket body insert 100 has a first end 101, and an opposite second end 102. The bracket body insert 100 further has an elongated main body 103, which is defined by a top or superior facing surface 104, and an opposite, bottom or inferior facing surface 105. Still further, the main body 103 is additionally defined by an anterior facing surface 106, which forms a rear wall for the archwire slot 60, and an opposite, posterior facing surface 107, which rests in juxtaposed resting relation on, or against, the supporting or recessed wall 65, and which is defined by the bracket body 40. The bracket body insert 100 has a height dimension as measured between the top and bottom surface 104 and 105, and which is less than the distance as measured between the top and bottom surfaces 63 and 64, and which defines, at least in part, the archwire slot 60. The height dimension of the main body 103 allows the main body 103 to be received within the archwire slot 60, and further rests in mating receipt thereagainst the supporting or recessed wall 65, and which is further formed by the bracket body. It should be understood that the main body 103 of the bracket body insert 100 may have a substantially constant thickness dimension as measured between the anterior and posterior facing surfaces 106 and 107, or may further have a variable dimension. As such, the bracket body insert 100 provides a convenient means for selectively adjusting the cross-sectional dimension of the resulting archwire slot 60 so as to provide some of the benefits of the present invention, and which include, among others, providing an orthodontic bracket 10 which provides first, second and third order movements 13, 14, and 15 for a patient's tooth 11, and without a clinically predetermined manipulation of the archwire 90, which is received in the transversely disposed archwire slot 60.

The first form of the bracket body insert 100 further includes first and second engagement portions 111 and 112, respectively, and which are located at the first and second ends 101 and 102 of the bracket body insert. In particular, the first and second engagement portions 111 and 112 extend outwardly beyond the first and second sides 44 and 45 of the bracket body 40, and further provides a convenient means by which a clinician, not shown, may easily visually identify the bracket body insert 100 such that it may be positioned appropriately or otherwise adjusted as will be discussed in further detail below. Each of the engagement portions 111 and 112, respectively, have an outside facing surface 113, which has formed therein a depression or cavity 114, and which allows a clinician to insert a tool, for example, like tweezers, or the like, into the depression so as to conveniently exert sufficient force which effects the removal of the bracket body insert 100 from the archwire slot 60. As will be seen in FIG. 7, the first form of the bracket body insert 100 also includes a first engagement member 115 which extends normally, downwardly, relative to the first end of the bracket body. The first engagement member is dimensioned so as to be slidably received within the first passageway 71, and which is formed in the first side of the bracket body 40. Still further, the bracket body insert 100 includes a second engagement member 116, which is shorter in length than the first engagement member 115, and which further is received in the second passageway 72, and which is formed in the second side of the bracket body 40. The first engagement member 115 has a distal end 117, which is operable to be matingly received within one of the multiplicity of engagement regions 36, and which are formed in the bracket base 21. As will be recognized, when the main body of the bracket body insert 100 is appropriately inserted within the archwire slot 60, the distal end 117 of the engagement member 115 is received within one of the multiplicity of engagement regions 36 which are individually formed in the platform base 20, and thereby is effective in fixedly, rotatably positioning the bracket body 40 in an appropriate rotatable orientation relative to the platform base 20. Further, and as will be recognized from the drawings, the main body 103 of the bracket body insert 100 can be fabricated in different thickness dimensions, and consequently provides a means by which the orthodontic bracket 10 can be supplied, and which may have a clinician selected and customizable torque expression to affect the movement of a patient's tooth. Further, it will be recognized by reversing the direction of the main body 103 within the archwire slot 60, the same bracket body insert 100 can appropriately position the bracket body in five possible, different angular orientations relative to the platform base 20. This provides a multiplicity of treatment options for a clinician employing the same orthodontic bracket 20 to correct the misalignment of a patient's tooth. These multitude of positions or orientations may constitute the application of low, medium or high torques to the patient's tooth to achieve the clinical benefits that the treating clinician has established for the patient. When this feature is combined with a platform base 20, and which can, post fabrication, be machined to assorted thickness, a multitude of treatment options have now been made available to a treating clinician which were unavailable, heretofore.

In one of its broadest aspect, therefore, the present invention relates to an orthodontic bracket as seen in its various forms in the present application, and which includes a platform base 20, and which further is releasably affixed to a tooth 11 of a patient undergoing a multiple step orthodontic treatment regimen or plan as prescribed by a clinician. The platform base 20 remains affixed to the tooth 11 of the patient during the duration of the orthodontic treatment regimen, and the orthodontic treatment regimen selected by the clinician may require that the clinician impart a first, second and/or third order of movement 13, 14 and 15, respectively, to the tooth 11 of the patient undergoing the orthodontic treatment regimen. The invention 10 allows for the use of a multiplicity of bracket bodies 40, and which are selected by the clinician, and which further individually, sequentially, releasably, moveably and matingly cooperate with the platform base 20 during a predetermined selective time period during the duration of the orthodontic treatment regimen, and which additionally individually and/or collectively facilitate the delivery of a clinician selected amount of force to the tooth 11, and which is undergoing the orthodontic treatment regimen so as to impart the first, second and/or third orders of movement 13, 14 and 15, respectively, and which are selected by the clinician to achieve a clinically desired amount of movement of the patient's tooth 11. In the arrangement as seen in the drawings, the platform base 20 as provided has, following fabrication, a posterior or other outwardly facing surface 23 having a sufficient material thickness, and which can be modified, post-fabrication, so as to provide a clinician selected predetermined amount of torque, which could then be exerted on the patient's tooth 11 during the orthodontic treatment regimen that is selected.

In the present invention, the several forms of the orthodontic bracket, as described, includes a first form of a platform base 20, and which is operable to individually, matingly and sequentially cooperate with a multiplicity of bracket bodies so as to facilitate the multiple step orthodontic treatment regimen selected by the clinician. In the preceding paragraphs, one possible bracket body 40 has been described in significant detail. One of the features of the present invention relates to an orthodontic bracket or appliance which encourages clinicians to utilize orthodontic appliances and methods of orthodontic treatment which are familiar to them so as to expedite the treatment of a patient, and to avoid patient discomfort during the orthodontic treatment regimen which is selected. As noted earlier in this application, due to a number of pressing issues which confront practicing clinicians, often the adoption and mastering of new orthodontic techniques, practices and appliances is delayed because of the time necessary to master any new techniques, and then juggle competing demands of patient loads, and existing treatment plans which have already been established for patients. The present invention provides a means by which orthodontic clinicians may continue to use orthodontic appliances and techniques which are familiar to them, and may proceed with orthodontic treatment plans or regimens which have already been established, but which now will be expedited because the clinician will no longer need to remove entire orthodontic brackets from a patient's tooth 11 in order to expedite a treatment plan. Rather, the clinician will merely need to remove, and then replace the required bracket body which is releasably mounted on the platform base 20, and which remains permanently affixed to the patient's tooth 11 during the treatment plan or regimen.

In the arrangement as seen in the drawings, the several bracket bodies as discussed, herein, matingly cooperate with a platform base 20, such as previously described, and which are adjustably moveable relative to the platform base and during the implementation of multiple step orthodontic treatment plan. Still further, and as determined by the clinician, at least some of the bracket bodies, as disclosed herein, matingly cooperate with the platform base, and are immoveable during the multiple step orthodontic treatment regimen. Still further, it should be understood from a study of FIG. 1, and following, that at least some of the bracket bodies when matingly cooperating with the platform base, as disclosed, are adjustably moveable and immoveable relative to the platform base, and during the orthodontic treatment regimen. Such can be effected by the use of the bracket body insert 100 as earlier discussed. It should be noted the bracket body insert 100, when cooperating with the previously described platform base 20 is effective in orienting or positioning the bracket body 40 in given orientations relative to the platform base 20, so as to effect first, second and third order movements 13, 14 and 15 respectively.

Second Form

Figure 8:
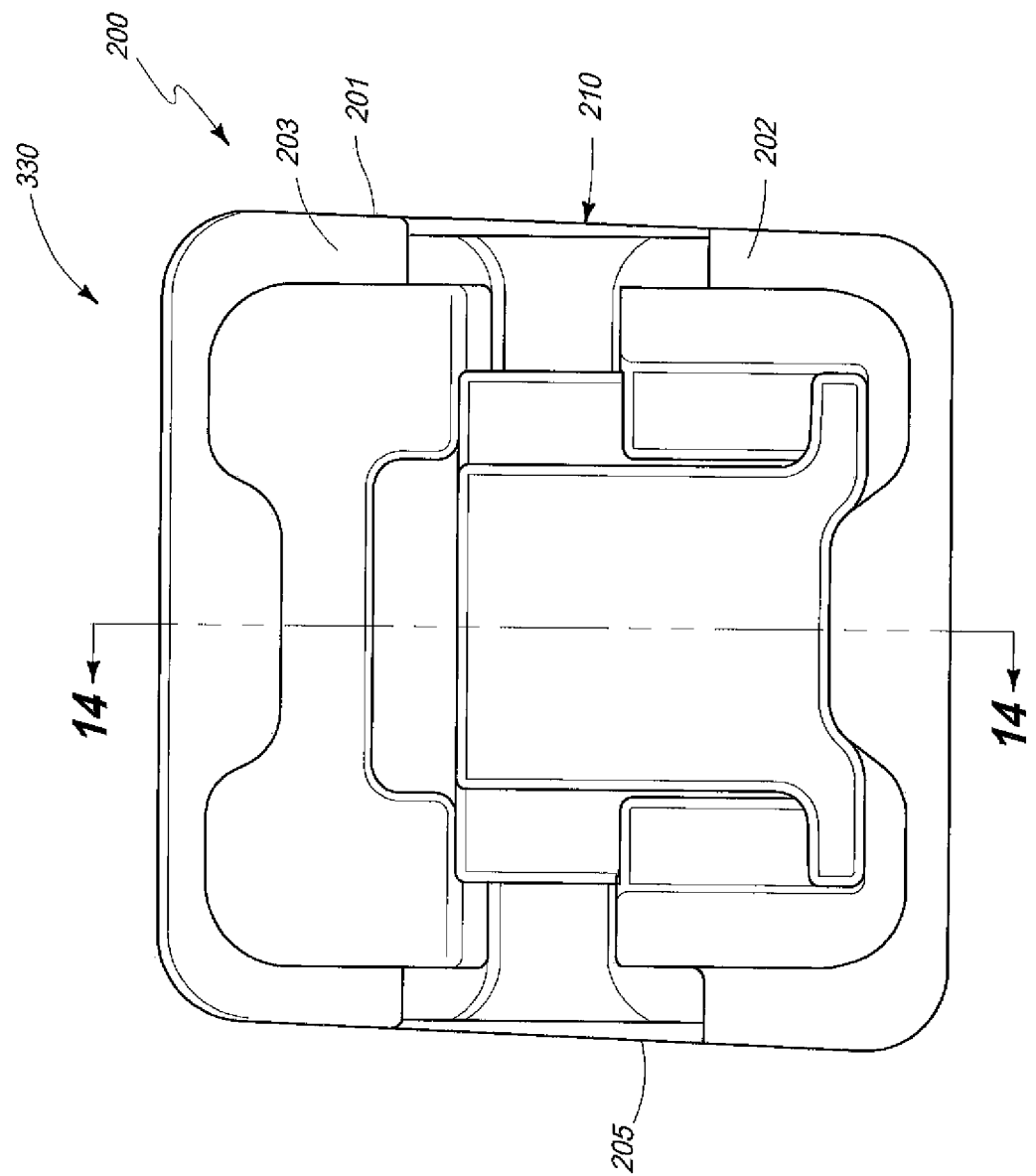
FIG. 8 is an anterior, side elevation view of a second form of an orthodontic bracket of the present invention.
Figure 12B:
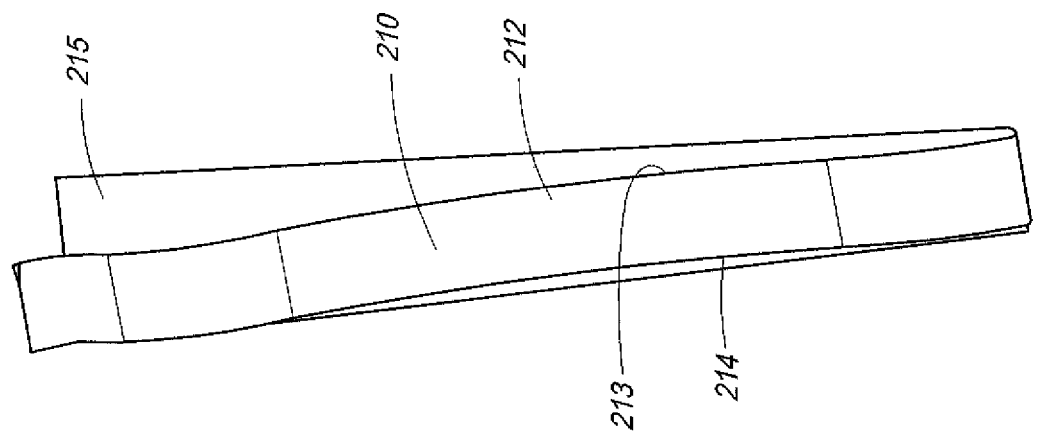
FIG. 12B is a greatly enlarged, side elevation view of another possible form a pad which forms a portion of the platform base, and which is a feature of the present invention.
Figure 12A:
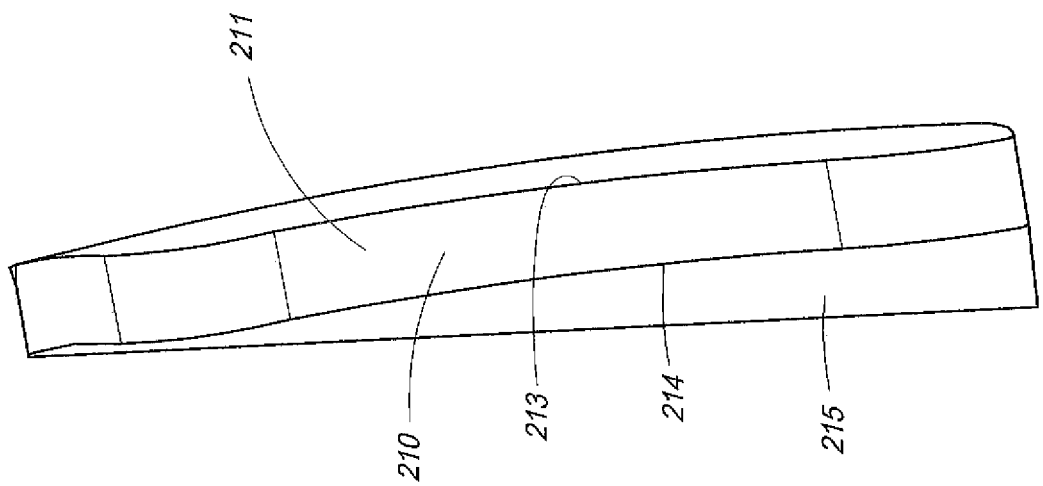
FIG. 12A is a greatly enlarged, side elevation view of one possible form of a pad which forms a portion of the platform base, and which is a feature of the present invention.

The second form of the orthodontic bracket of the present invention is generally indicated by the numeral 200, and is seen in FIG. 8, and following. In many respects, the second form of the orthodontic bracket 200 has similar features to that earlier disclosed in FIGS. 1-7. The second form of the orthodontic bracket is supported for selective movement relative to the anterior facing surface 12 of the patient's tooth 11 as seen in FIG. 2 by means of a platform base which is generally indicated by the numeral 201. The platform base is releasably secured on the anterior facing surface 11 of the patient's tooth by a suitable adhesive, or other means known in the art. The platform base 201 is similar to that which was earlier described with regard to the structure 20. The platform base 201 has a main body 202 which has an exterior or anterior facing surface 203, and an opposite, posterior facing surface 204. Still further the platform base has a peripheral edge which is generally indicated by the numeral 205. Referring now to FIGS. 12A and 12B respectively, it will be recognized from these drawings that the second form of the platform base 201 is fabricated in two discreet pieces, those being the pad or base 210 which is placed in juxtaposed relation relative to the anterior facing surface of the patient's tooth 11, and an overlying platform 201 which is made integral with the pad or base 210, and upon which the bracket body, as will be described, below, moveably cooperates. As seen in FIGS. 12A and 12B, respectively, two possible forms of the pad/base 210 may be fabricated, and which will provide, as earlier disclosed, sufficient material thickness so as to allow the orthodontic bracket 200, post-fabrication, to be machined, or otherwise formed, so as to give a clinician a wide variety of options in addressing or correcting orthodontic anomalies for given patients which have been difficult or impossible to correct, heretofore. As seen in FIGS. 12A and B it should be understood that the pad, or base 210 has two possible forms including a first form 211, and a second form 212. The pad/base 210, and which is typically made integral with the remaining platform as will be described, has, upon fabrication, an anterior facing surface 213 which is secured to the adjacent platform, and an outside or posterior facing surface 214, which is juxtaposed relative to the anterior facing surface of the tooth 11. As will be recognized by a study of FIG. 12A, and in the first form 211, extra material 215 is fabricated and/or deposited on the posterior facing surface of the pad/base thus permitting the assembled orthodontic bracket 200 to be subsequently machined or otherwise adjusted, post-fabrication, and which allows a clinician to have custom orthodontic appliances fabricated for use on patients having anomalies which require such custom fabrication. On the other hand, and referring now to FIG. 12B, and in the second form 212, extra material 215 may be deposited on the posterior facing surface 214, thus allowing, again, another differently shaped pad 210 to be attached to the platform thus enabling a clinician to have a series of orthodontic brackets fabricated which can address still a wider range of orthodontic anomalies affecting a patient. Thus a clinician is now permitted to create specific torque brackets, and can have milling or other machining conducted, post fabrication, and which would permit a series of orthodontic brackets to be fabricated and which further could be shaped to fit unusual tooth contours that a patient might possess. This inventive feature has not been available in orthodontic brackets which have been utilized, heretofore.

Figure 9:
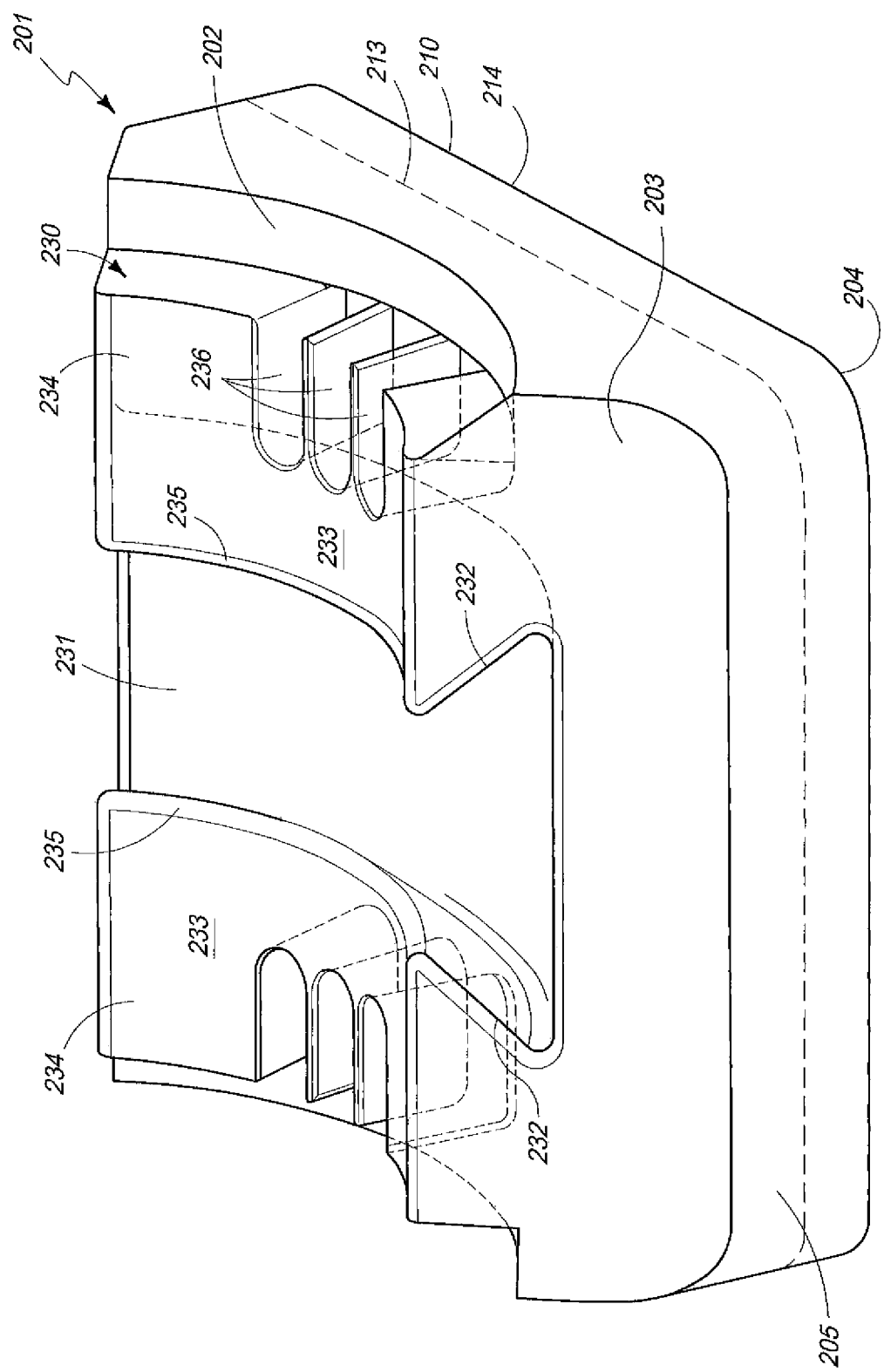
FIG. 9 is a perspective, greatly enlarged, side elevation view of a second form of the platform base, and which forms a feature of the present invention.
Figure 10:
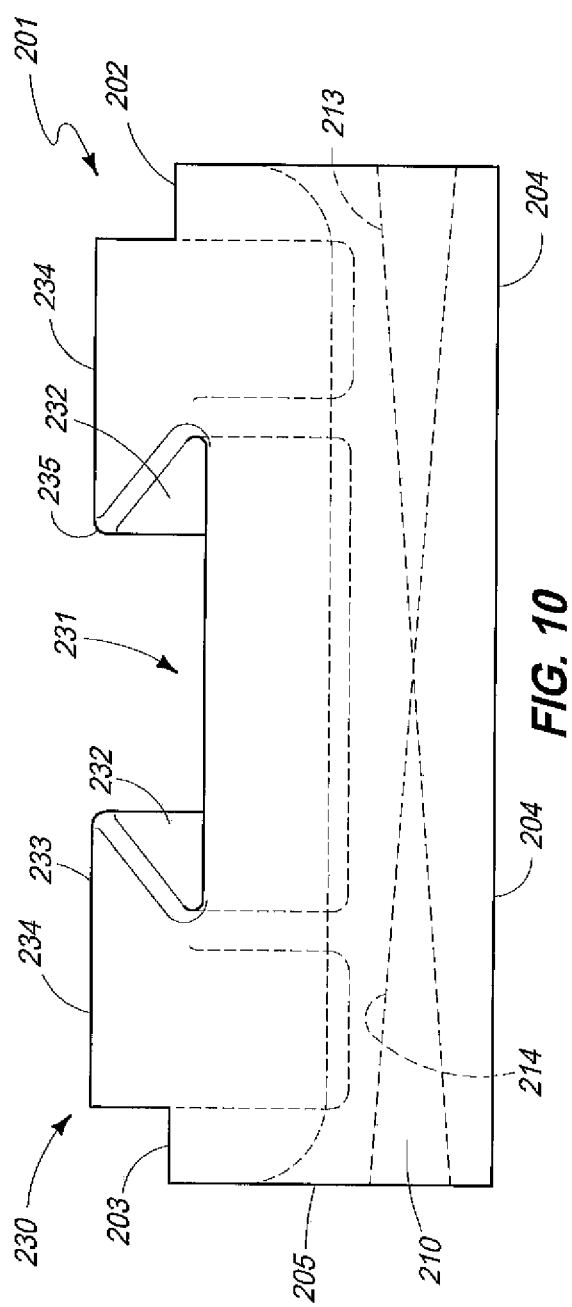
FIG. 10 is a greatly enlarged, side elevation view of the second form of the platform base, and which forms a feature of the present invention.
Figure 11:
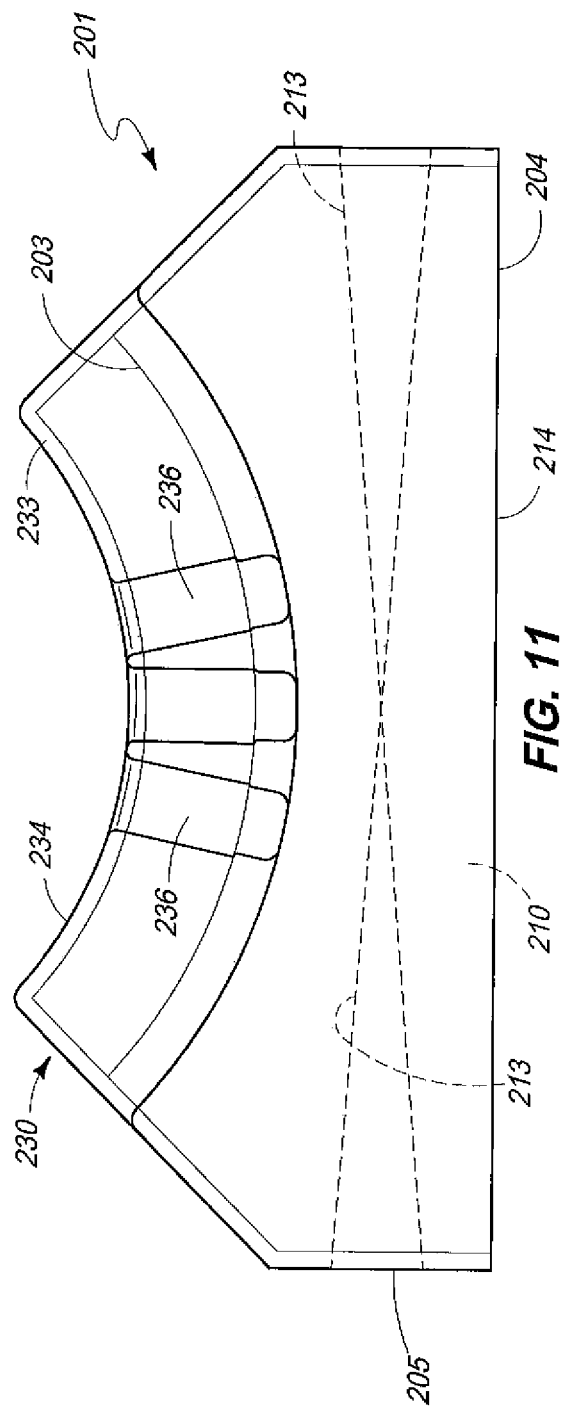
FIG. 11 is a second, side elevation view of the platform base and which is taken from a position 90 degrees offset from FIG. 10, and which forms a feature of the present invention.

Referring now to FIG. 9, the platform base 201, as described, above, includes a coupling portion 230 which is made integral with the anterior facing surface 203 thereof. The coupling portion 230 is similar in operation to the coupling portion 30 as was discussed with respect to the first form of the invention. In this regard, the coupling portion 230, as seen in FIG. 9, and following, includes or defines a curved dovetail-shaped slot 231, and which is operable to slidably and matably couple with a bracket body as will be described, hereinafter. The curved dovetail-shaped slot 231 is defined, in part, by spaced angulated side walls which are indicated by the numeral 232. Still further, the anterior facing surface 203 is defined, in part, by a curved upwardly facing surfaces 233, and which are operable to cooperate with the bracket body as will be described, hereinafter. The curved upwardly facing surface 234 defines, in part, inwardly extending flange portions 235 which individually form, in part, the curved dovetail-shaped slot 231. Similar to that seen in the first form of the invention, a plurality of engagement regions 236 are formed in, and extend downwardly through, the curved upwardly facing surface 234. The engagement regions 236 operate in a manner similar to that earlier described. It should be noted with respect to FIG. 9 that the engagement regions 236, which are located on the opposite peripheral edges 205 of the platform base 201, are substantially aligned, one relative to the other. The operation of this form of the invention 200 will be discussed in greater detail, below.

Figure 14:
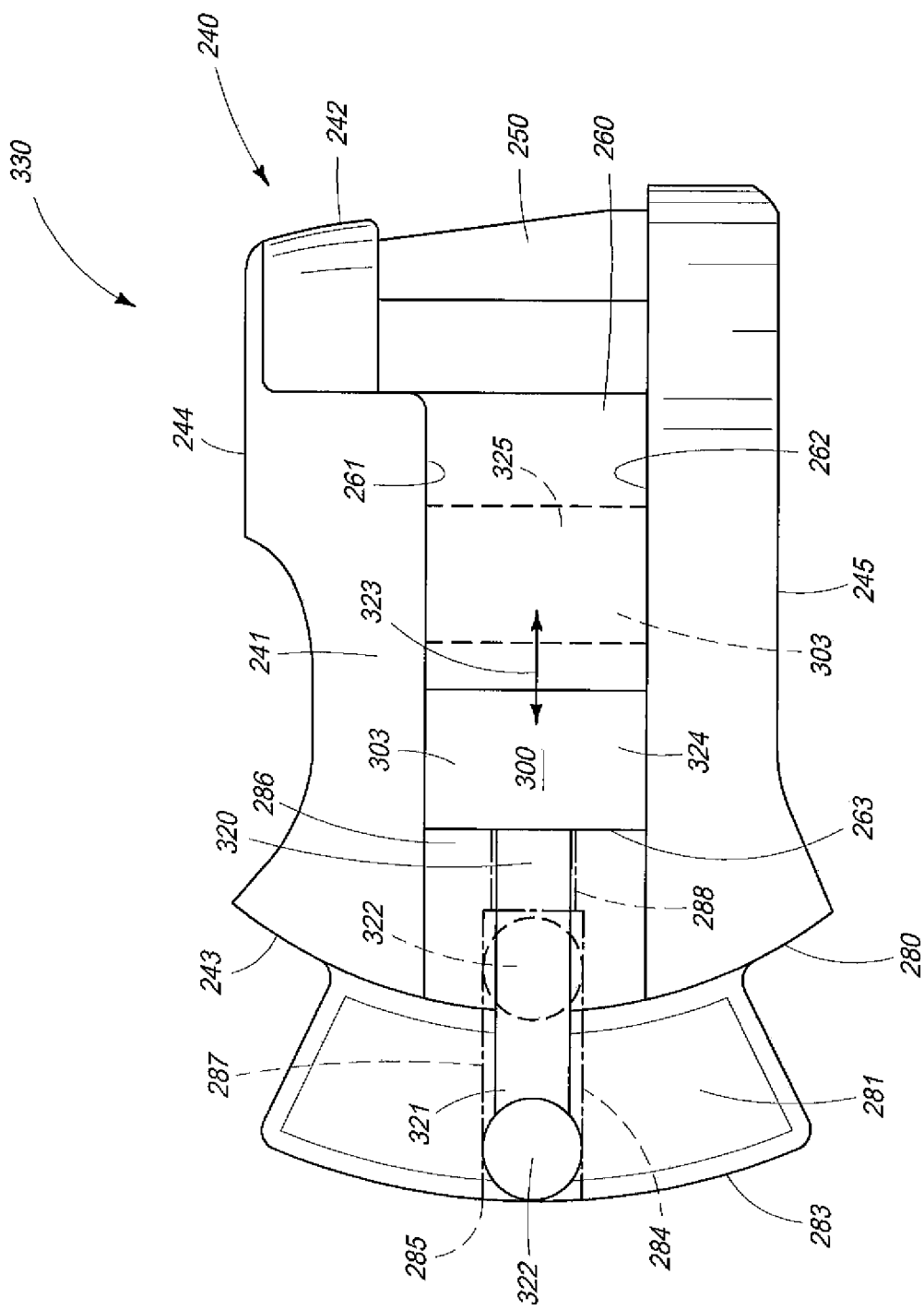
FIG. 14 is a fragmentary, transverse, vertical, sectional view of the second form of the orthodontic bracket, and which is taken from a position along line 14-14 of FIG. 8.

Referring now to FIG. 14, the second form of the orthodontic bracket 200 includes a bracket body 240, and which operates in a manner somewhat similar to the bracket body 40, as disclosed in the first form of the invention [FIGS. 1-7]. The bracket body 240 as illustrated in FIG. 14, and following, has a main body 241 which has an anterior facing surface 242, and an opposite, posterior facing surface 243. The main body 241 further has a superior facing surface 244, and an opposite, inferior facing surface 245. Similar to that which was earlier described, the bracket body 240 includes a moveable gate 250 which permits access to an archwire slot 260. The archwire slot 260 is defined, in part, by a superior facing surface 261, and an opposite, inferior facing surface 262 which is disposed in spaced relation relative thereto. A supporting or recessed wall 263 extends between the superior and inferior facing surfaces 261 and 262, respectively. The main body 241, and in particular the posterior facing surface 243, has a curved surface 280. Still further, and as will be seen, the main body is also defined, in part, by a curved male pin member 281 which is made integral with the posterior facing surface 243. The curved male pin member is defined, in part, by a complimentary curved surface 283, and which is operable to be matingly received in inter-fitted relation within the curved dovetail-shaped slot 231 as defined by the coupling portion 230. As seen in FIG. 14, and following, a passageway 284 is formed in the main body 241 and extends between the supporting or recessed wall 263, and through the curved male pin member 281, and terminates at the complimentary curved surface 283. The passageway 284, has a first end 285, and an opposite, second end 286. As seen in FIG. 14, it will be recognized that the passageway 284 has an enlarged first portion 287 which extends from the complementary curve surface 283, and in the direction of the supporting or recessed wall 263, and a second portion 288, and which has a cross-sectional dimension which is smaller than the first portion, and which further extends from the first portion 287 to the supporting or recessed wall 263. The function of this passageway will be discussed in greater detail below.

Figure 13:
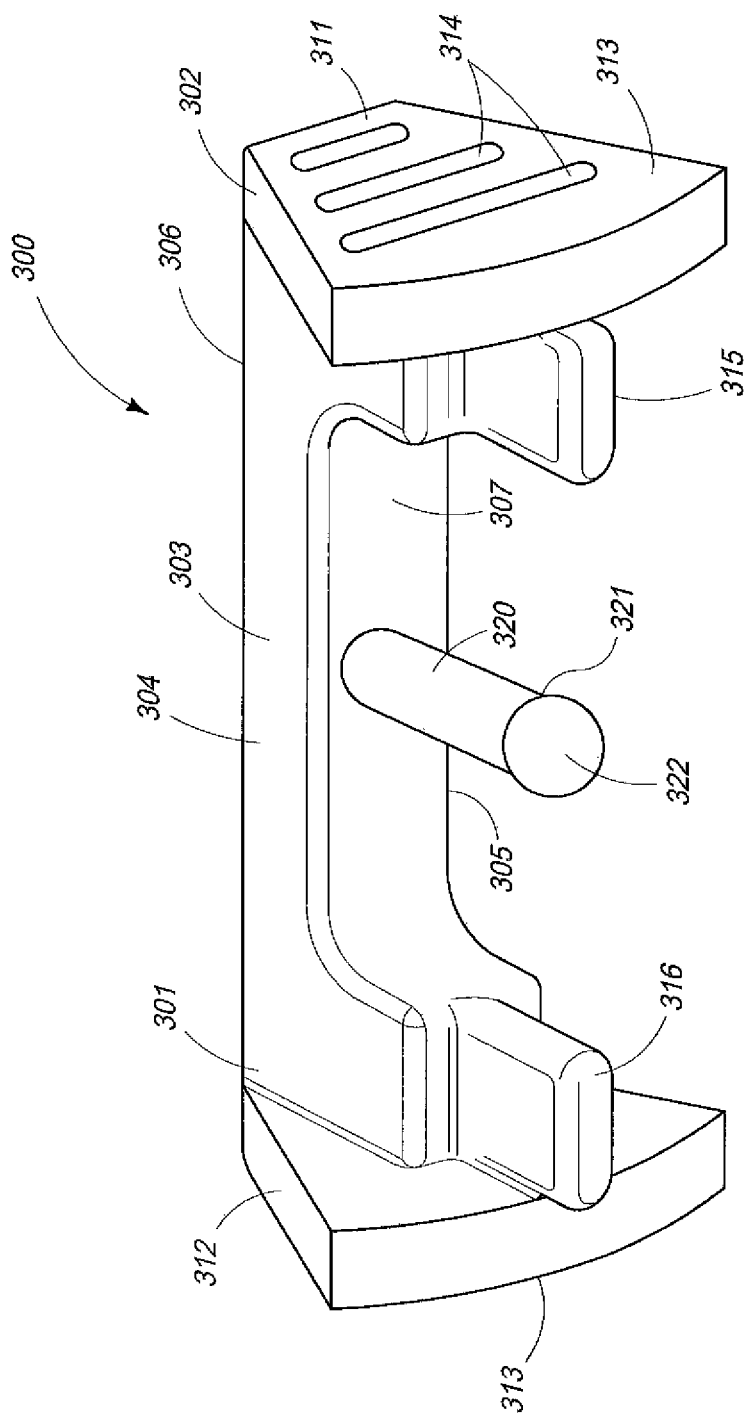
FIG. 13 is a greatly enlarged, perspective view of a second form of a bracket body insert, and which forms a feature of the present invention.
Figure 15:
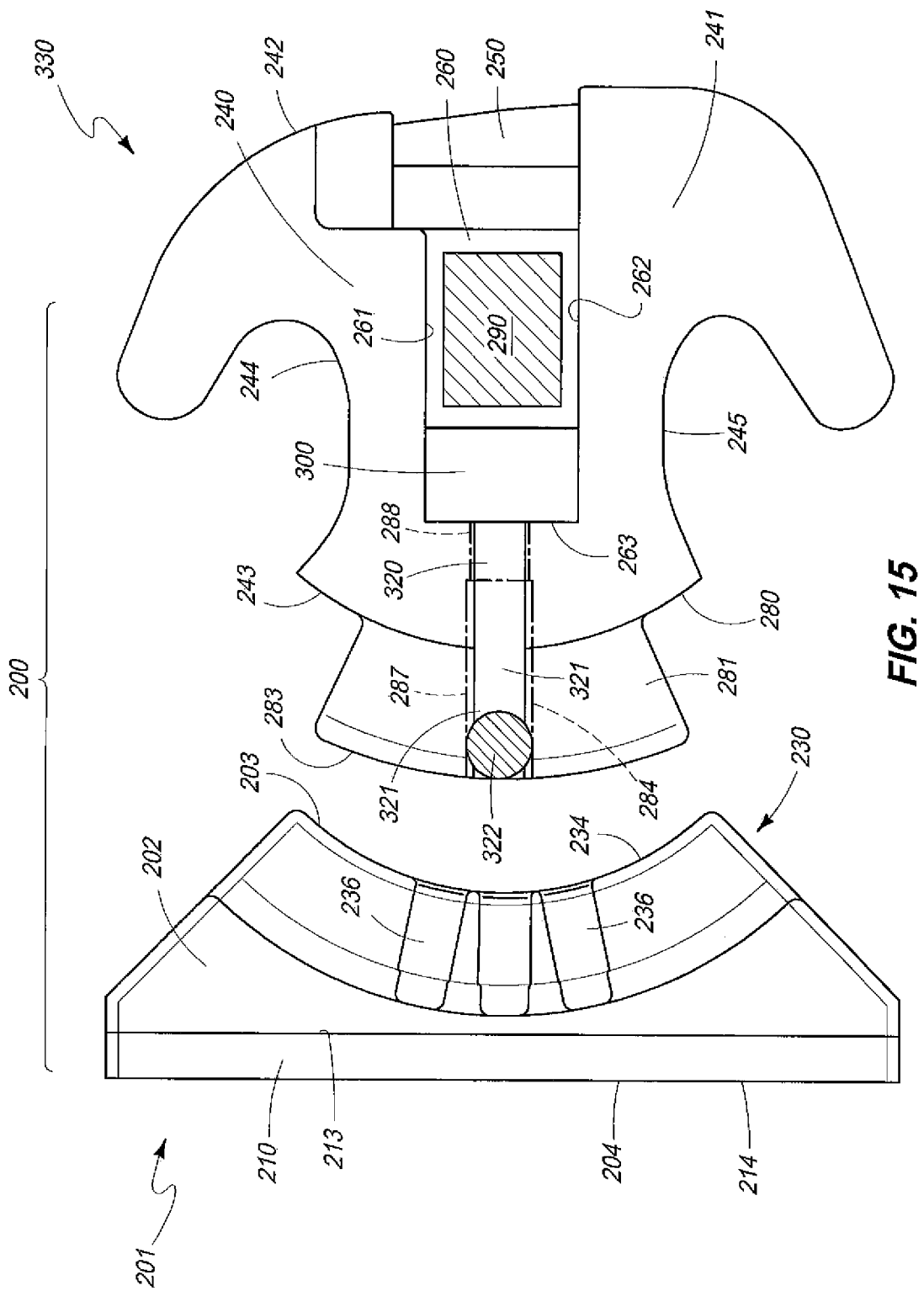
FIG. 15 is an exploded, transverse, sectional view of the second form of the present invention, and which shows one form of a bracket body which can matingly cooperate with the second platform base, and which is a feature of the present invention.
Figure 16:
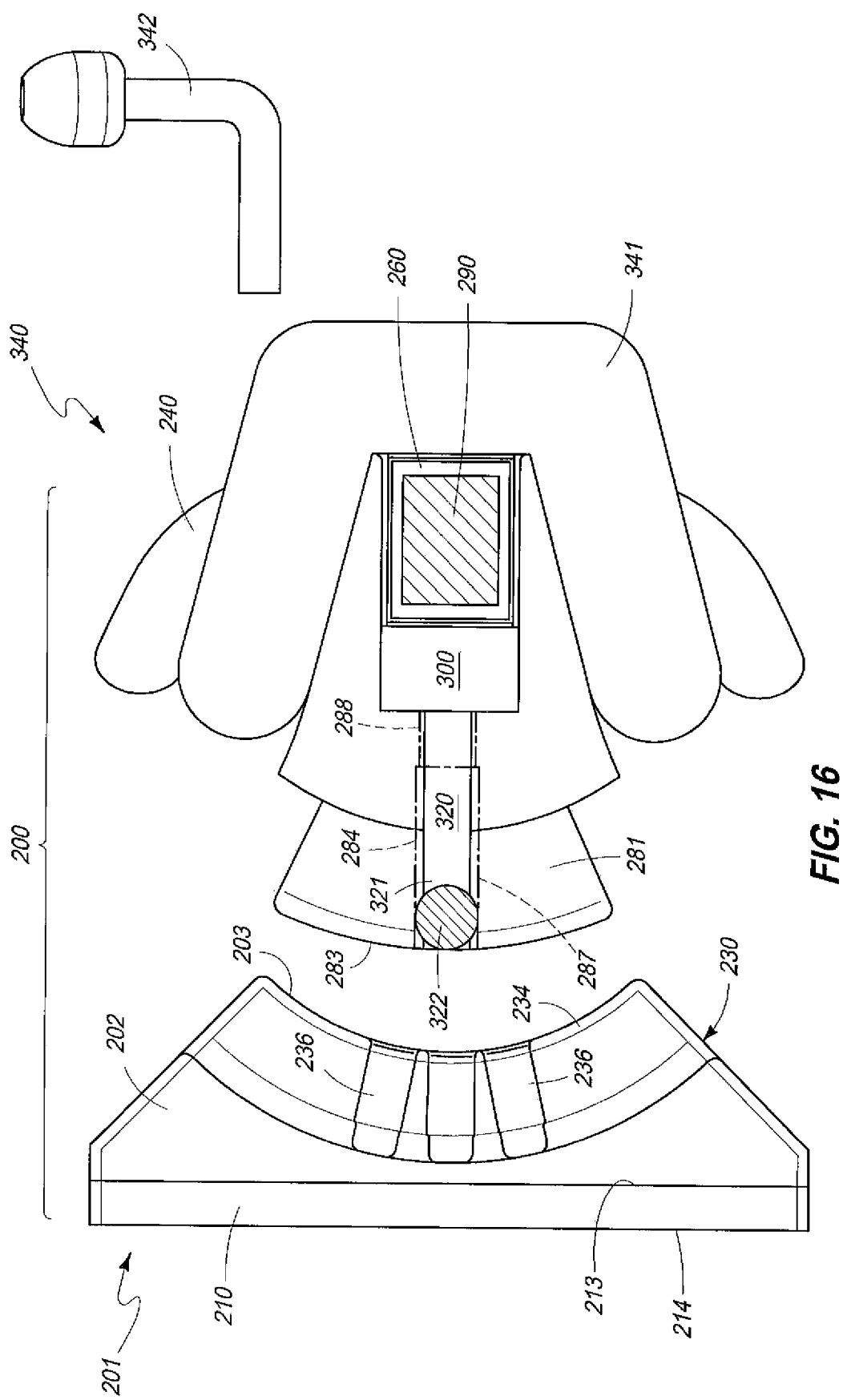
FIG. 16 is an exploded, transverse, vertical sectional view of another form of a bracket body, and which can operably cooperate with the second platform base, as seen in FIG. 10.
Figure 17:
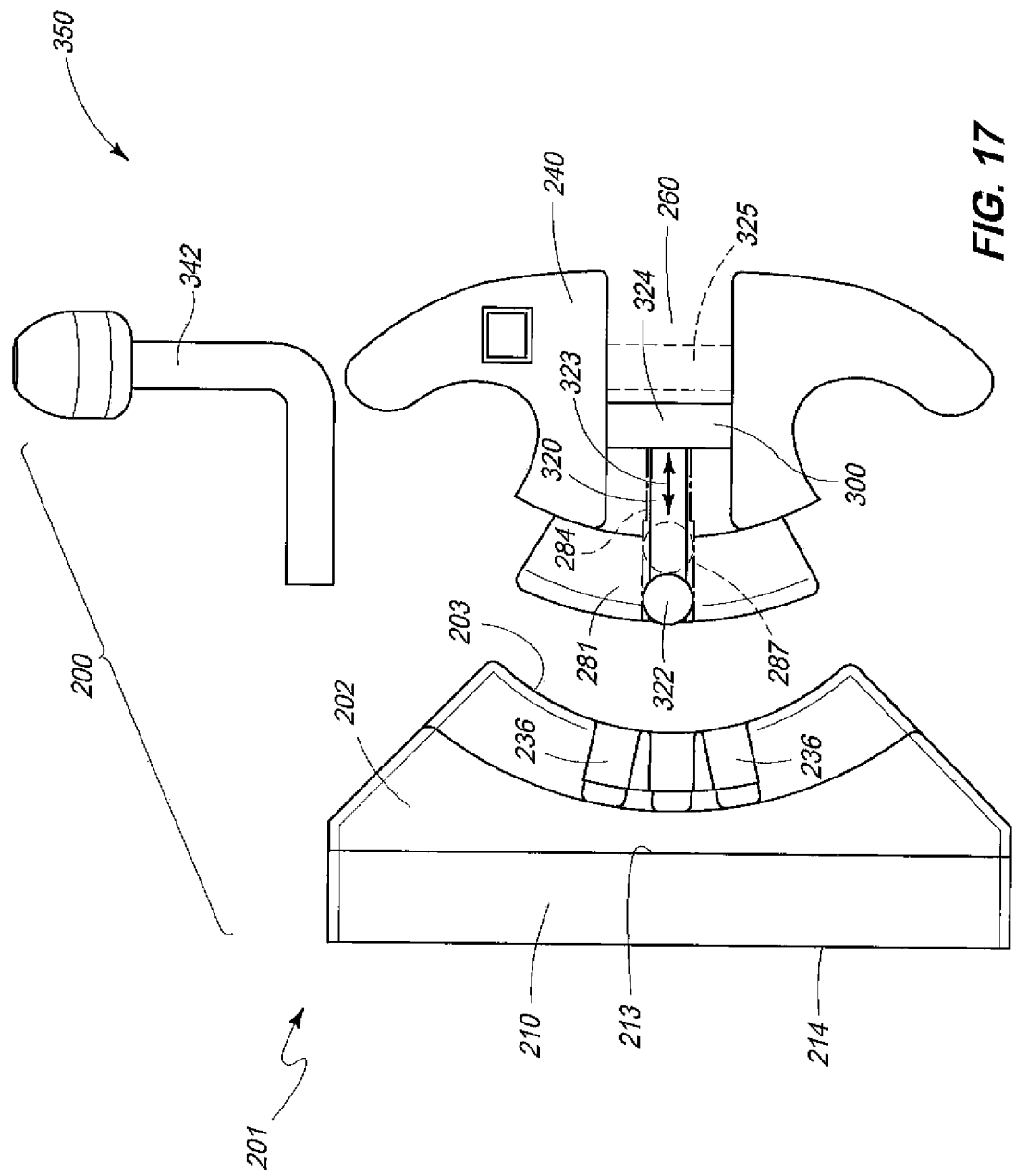
FIG. 17 is still another exploded, transverse, vertical sectional view of another bracket body which can operably cooperate with the second platform base, and which further forms a feature of the present invention.

As seen in FIG. 15, the second form of the bracket body 240 is operable to cooperate with an archwire 290 of conventional design. The characteristics of this archwire 290 was discussed with respect to the first form of the invention, and further discussion regarding this structure is not warranted. The bracket body 240 is similarly operable to cooperate with a bracket body insert which is generally indicated by the numeral 300, and which is best understood by a study of FIG. 13. The bracket body insert 300 has opposite first and second ends 301 and 302, respectively, and an elongated main body 303. The elongated main body has top and bottom surfaces 304 and 305, respectively, and an anterior and posterior facing surface 306 and 307, respectively. Similar to the first form of the bracket body insert 100, the bracket body insert 300 has a first and second engagement portion 311 and 312, respectively. The first and second engagement portions each have outside facing surfaces 313 which have formed, therein, depressions, cavities or as here illustrated, rib members 314, and which allows a tool or even the fingers of the clinician to engage same, and exert force on the bracket body insert 300, so as to move it within the archwire slot 260. Again, and similar to the first form of the bracket body 100, the second form of the bracket body 300 includes first and second engagement members 315 and 316, respectively, and which are operable to releasably cooperate with the individual engagement regions 236, and which are formed in the coupling portion 230. As best seen by reference to FIG. 13, the bracket body insert 300 includes a central post or shaft 320, and which is sized to be received within the passageway 284. The central post or shaft 320 has a distal end 321, which has affixed thereto an enlarged movement limiting member 322. As seen in the drawing, this movement limiting member has an outside diametral dimension which is less than the inside diametral dimension of the enlarged first portion 287 of the passageway 284. The movement limiting member 322 defines a path of travel 323 for the bracket body insert 300. As illustrated in FIG. 14, the path of travel includes a first position 324 where the bracket body insert 300 rests in juxtaposed relation relative to the supporting or recessed wall 263, and therefore defines, at least in part, the archwire slot 260. Further, the bracket body insert 300 is moveable from the first position 324, to a second position 325 which is shown in phantom lines in FIG. 14, and which permits the first and second engagement members 315 and 316, respectively, to be moved out of engagement or cooperation with the individual engagement regions 236, and which are formed in the coupling portion 230. When disengaged from the engagement regions 236, the bracket body insert permits the bracket body 240 to rotate relative to the platform base 201, so as to allow the clinician to reorient the bracket body 240 in an appropriate position to receive the archwire. When appropriately positioned the bracket body insert 300 is moved from the second position 325, back to the first position 324, and which causes the first and second engagement members 315 and 316 to be received into a coupling, inter-fitted and mating relationship within one of the engagement regions 236. This effectively now retains the bracket body 240 in a fixed orientation relative to the platform base 201. This construction prevents the bracket body insert 300 from being removed from the bracket body 240, and further prevents the loss of this component during the treatment of the patient. Additionally, this feature provides increased convenience for the clinician because the clinician no longer has to manually manipulate or handle an extremely small object and appropriately place it within the archwire slot 260.

The second form of the orthodontic bracket 200 provides still another advantage over the first form of the invention inasmuch as the central post/shaft 320 and the enlarged movement limiting member 322, in combination, provides a tactile means by which the clinician can readily determine when the bracket body insert 300 is disengaged from that platform base 201 so as to permit rotation of the bracket body 240 to a different position relative to the platform base 201.

The present invention 200 provides a convenient means whereby a complete line of orthodontic brackets may be fabricated which allows a clinician to practice in a manner that they are most familiar with. It further permits the clinician to continue utilizing orthodontic treatment plans which they have established and found successful, and to use the style of orthodontic brackets which are considered conventional. As seen in the drawings, the present invention may be useful on passive self-ligating brackets 330, conventional twin brackets which have assisted self-ligation such as what is illustrated, and wherein an elastic ligature 341 is employed, and wherein the bracket body may be further fabricated so as to cooperate with a hook 342 of conventional design. Still further the bracket bodies may be manufactured in the form of a convention twin bracket 350 which is familiar to many orthodontic practitioners. Still further conventional twin brackets using conventional metal clips 360 (FIG. 18) may also be utilized, on the same platform base 20/201 as described with respect to the first and second forms of the invention. Consequently, the present invention provides a convenient means whereby a platform base 20/201 may be installed on the tooth 11 of a patient requiring treatment, and thereafter, a clinician may employ assorted and different bracket bodies that he is very familiar with, and implement an orthodontic treatment plan utilizing appliances and techniques for which little or no additional training is necessary, and which does not require the removal of the platform base 20/201 from the tooth 11. This, of course, expedites the treatment plan, and provides increasing comfort for the patient.

Third Form

Figure 19:
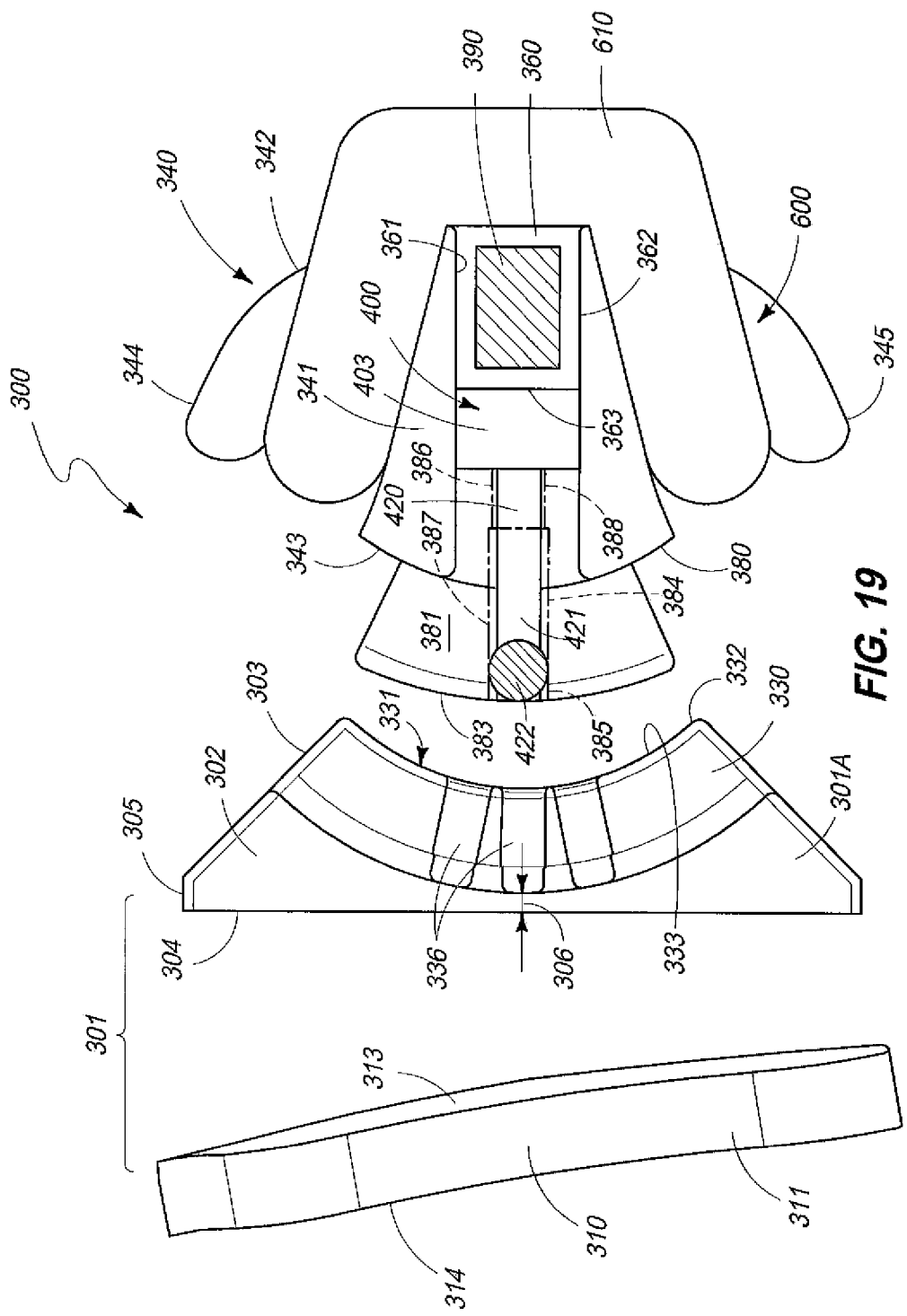
FIG. 19 is a greatly enlarged, transverse, vertical, sectional, and exploded view of another form of the orthodontic bracket of the present invention.
Figure 20:
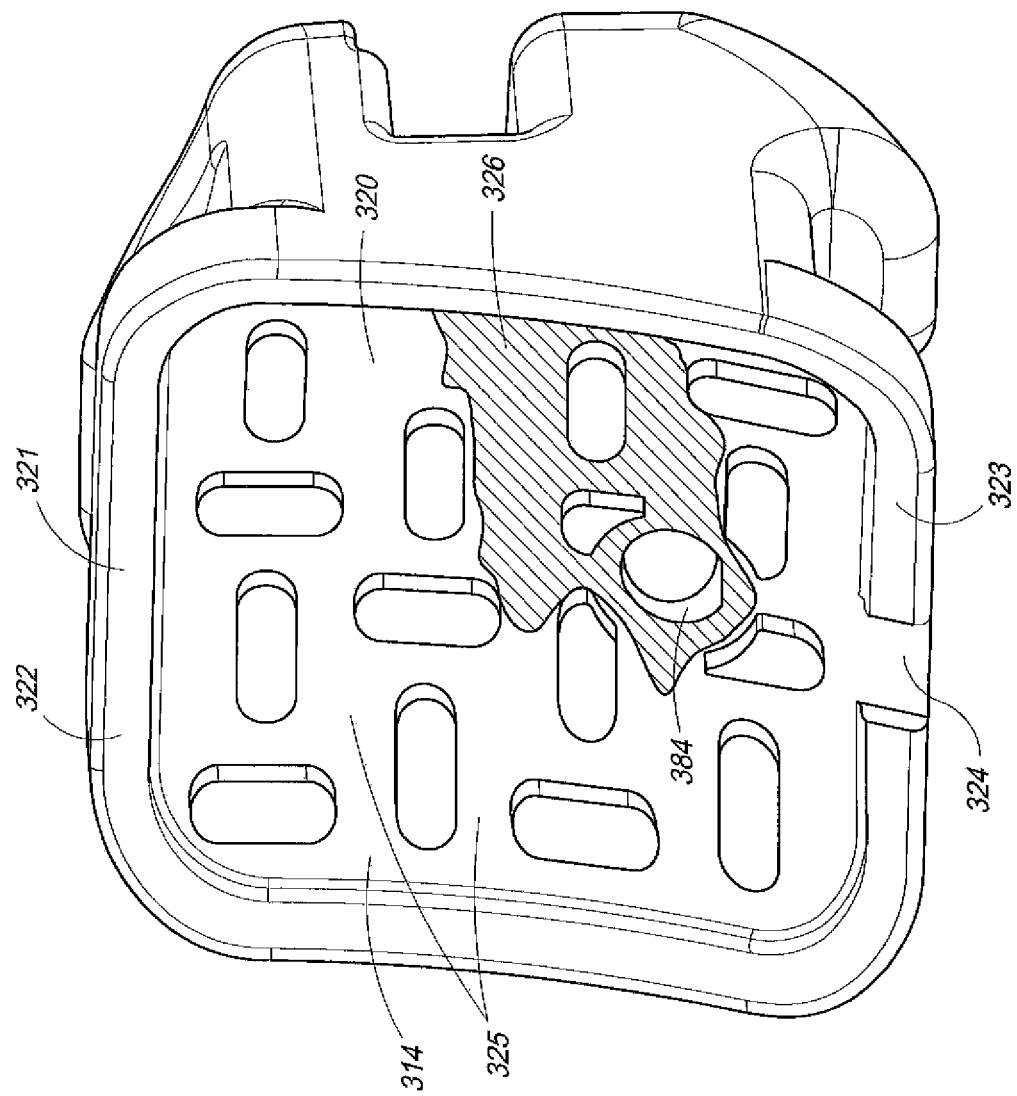
FIG. 20 is a greatly enlarged, posterior, perspective view of one form of a pad which is useful in the present invention.
Figure 21:
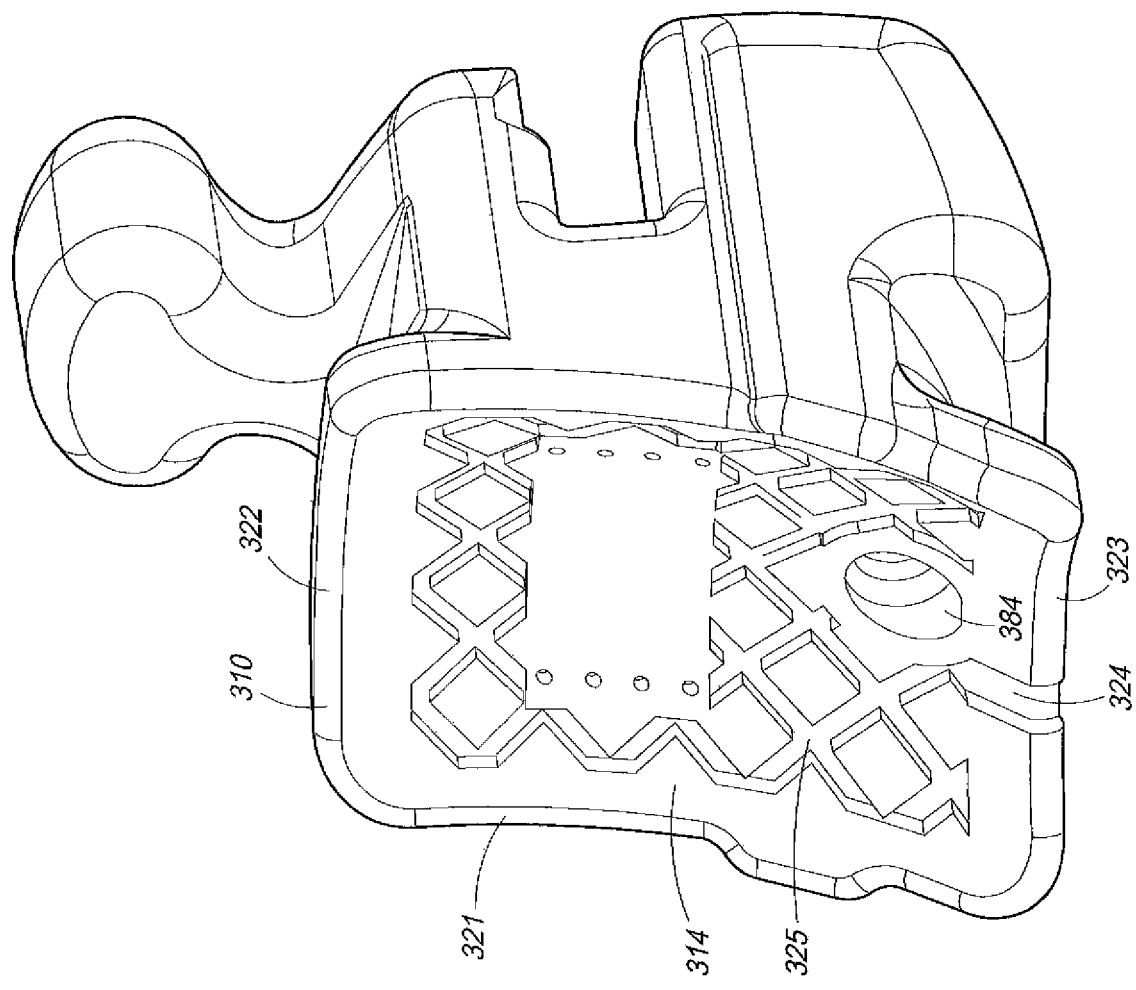
FIG. 21 is a greatly enlarged, posterior, perspective view of another form of a pad which is useful in the present invention.
Figure 22:
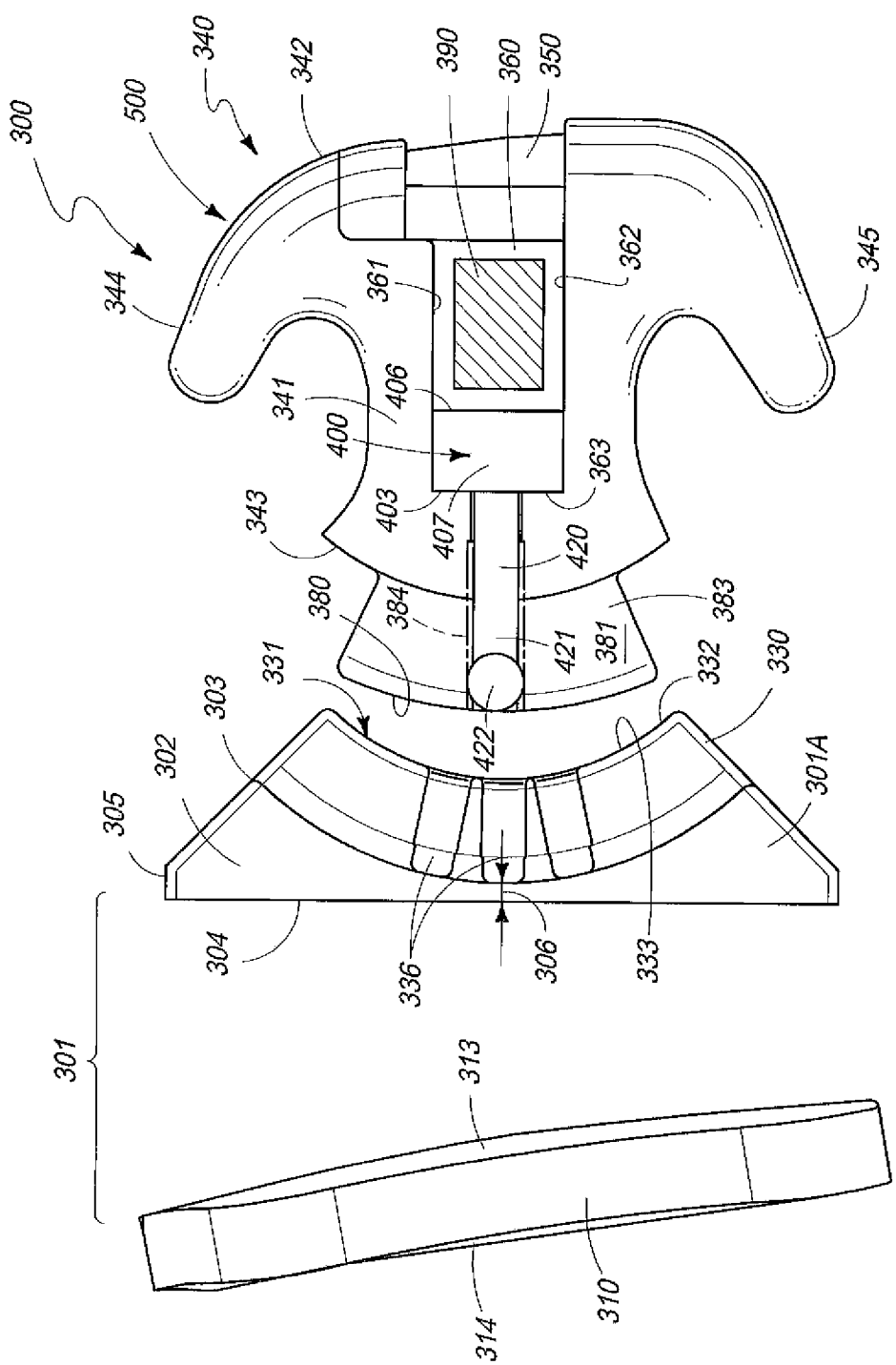
FIG. 22 is a greatly enlarged, transverse, vertical sectional and exploded view of another form of the orthodontic bracket of the present invention.
Figure 23:
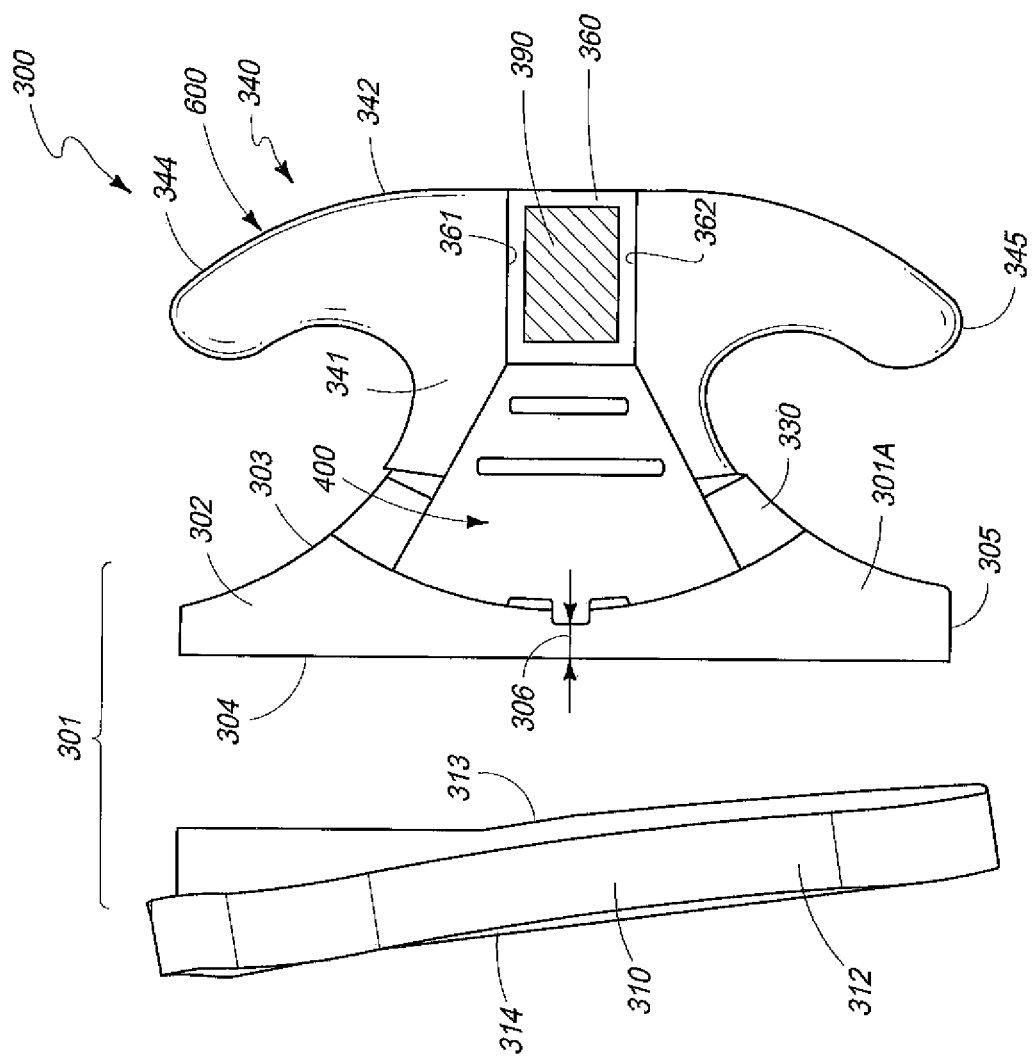
FIG. 23 is an exploded, side elevation view of another possible form of the present invention.
Figure 24:
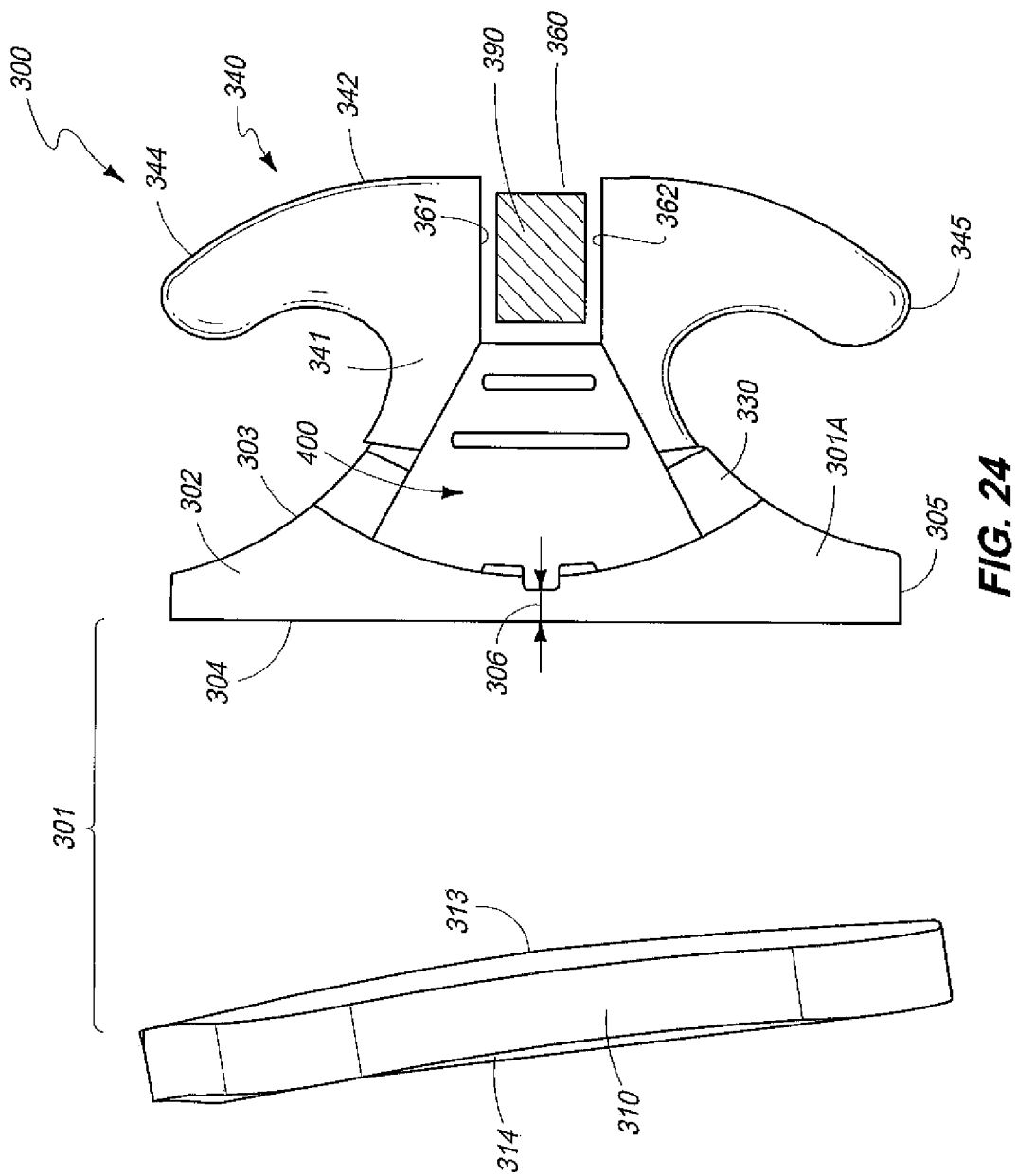
FIG. 24 is still another exploded, side elevation view of a possible form of the present invention.

The third form of the orthodontic bracket of the present invention is generally indicated by the numeral 300, and is seen in FIG. 19, and following. The third form of the orthodontic bracket is supported for selective movement relative to the anterior facing surface 12 of the patient's tooth 11, as seen in FIG. 2, by means of a platform base which is generally indicated by the numeral 301. The platform base is releasably secured on the anterior facing surface of the patient's tooth by a suitable adhesive, or other means known in the art. The platform base 301 is somewhat similar to that which was earlier described with regard to the structure 20. The platform base 301 has a main body 302, which has an exterior or anterior facing surface 303, and an opposite, posterior facing surface 304. Still further, the platform base has a peripheral edge which is generally indicated by the numeral 305. The overall thickness dimension of the platform base 301, is reduced from the two previous forms of the invention which have been described. This is indicated by the line labeled 306. Referring now to FIG. 19, and following, it will be recognized from these drawings that the third form of the platform base 301 is originally fabricated in two discreet pieces, those being the pad/base 310, which is placed in juxtaposed relation relative to the anterior facing surface of the patient's tooth 11, and an overlying or juxtaposed platform 301, and which is subsequently made integral with the pad 310, and upon which the bracket body, as will be described below, moveably cooperates. As seen in the drawings, various forms of the pad 310 may be fabricated, and which will provide, as earlier disclosed, sufficient material thickness so as to allow the pad 310, post-fabrication to be machined or otherwise formed, so as to give a clinician a wide variety of options in addressing or correcting orthodontic anomalies for patients which have been difficult, or impossible to correct, heretofore. As seen in FIG. 19 and following, it should be understood that the pad 310 has alternative forms including a first form 311, and a second form 312. The pad 310, and which is made integral with the platform 301, as will be described, has, upon fabrication, an anterior facing surface 313, and which is subsequently secured to the adjacent platform 301, and an outside or posterior facing surface 314, and which is juxtaposed relative to the anterior facing surface of the tooth 11. As will be recognized by a study of the drawings, and in the first form 311, extra material is fabricated and/or deposited on the anterior facing surface 313 of the pad 310, in assorted locations thus permitting the pad 310 to be subsequently machined or otherwise adjusted post-fabrication, and which is then attached to the platform 301. By this manufacturing technique, a clinician may secure custom orthodontic appliances which are fabricated for use on patients having tooth anomalies which require such custom appliances. Thus the clinician is now permitted to create patient-specific torque brackets, and can have milling conducted, post-fabrication, and which will permit a series of orthodontic brackets to be supplied, and which can be shaped to fit unusual tooth contours that a patient might possess or exert predetermined torque or other force to a tooth. This feature has not been available in orthodontic brackets which have been fabricated and supplied heretofore.

Figure 25:
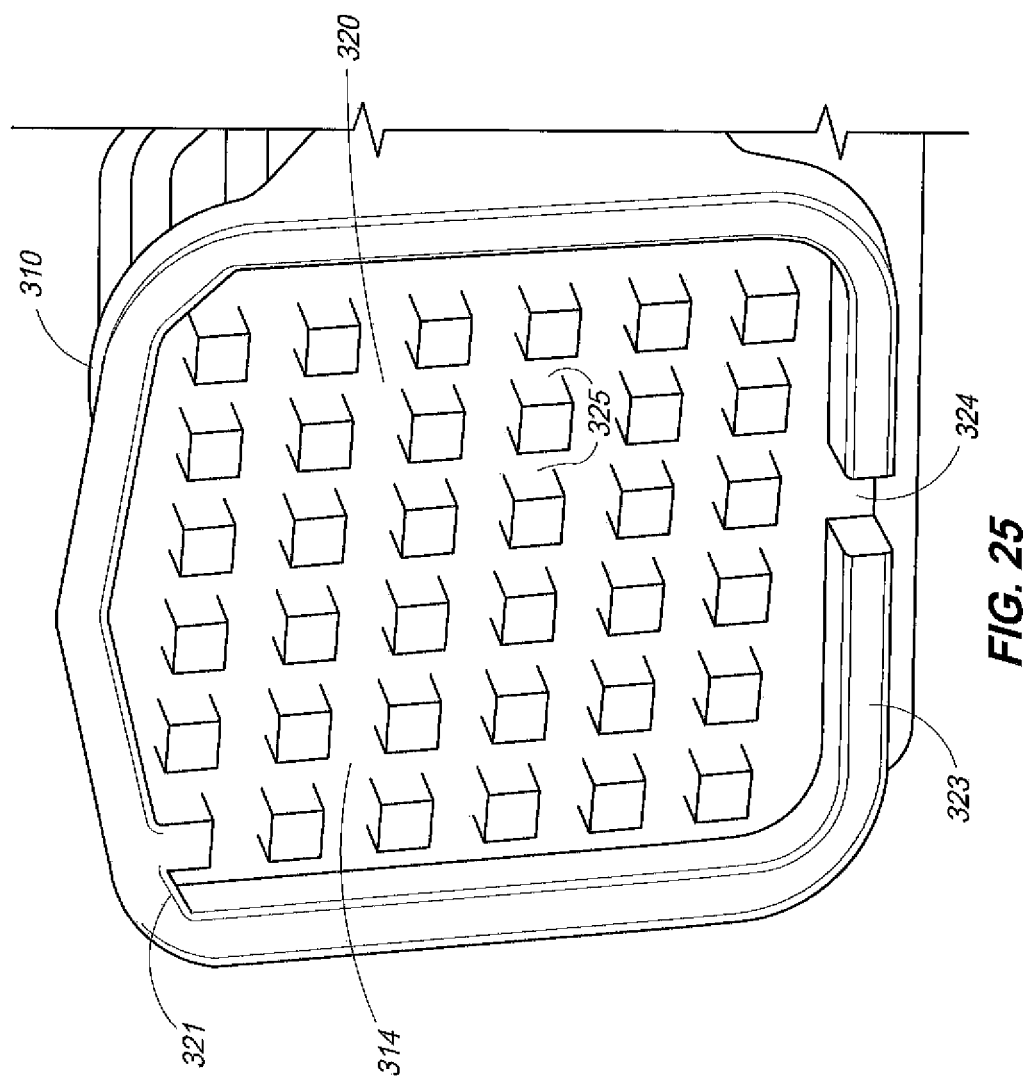
FIG. 25 is a greatly enlarged, posterior, perspective view of a possible pad topography which finds usefulness in the present invention.

The pad 310, as used in the third form of the invention 300, has formed in the posterior facing surface 314, a cavity 320 which is best seen by reference to FIG. 25. The cavity 320 is defined, in part, by an elevated peripheral edge which is generally indicated by a numeral 321. The peripheral edge 321 has a superior or first portion 322, and an opposite, second or inferior portion which is generally indicated by the numeral 323. As seen in the drawings, an aperture or passageway 324 is formed in the inferior or second portion 323, of the peripheral edge 321. As seen in the drawings, the cavity 320 may define a multiplicity of channels which are generally indicated by the numeral 325. As should be appreciated by those skilled in the art, an adhesive 326 is deposited within the cavity 320, and is operable to releasably affix the pad 310 to the anterior facing surface 12 of the patient's tooth 11. As will be understood from the drawings, the multiplicity of channels 325 which are formed in the cavity 320 are coupled in fluid flowing relation relative to the aperture 324, and which is formed in the inferior portion 323 of the peripheral edge 321. Consequently, when the pad 310 is pressed into contact with the anterior facing surface of the patient's tooth, excessive adhesive previously deposited in the cavity 320 moves out through the aperture 324, and then can be removed by the clinician post-installation of the pad 310 on the patient's tooth 11. As will be understood from the drawings, the superior or first portion 322 of the peripheral edge 321 is located in spaced relation relative to the gum of the patient, not shown, and the aperture 324 is oriented in spaced relationship relative to the crown of the patient's tooth 11B. The orientation of the aperture 324 is placed in this location for purposes of ensuring that the adhesive being employed does not come into contact with the tissue of the patient undergoing the orthodontic treatment regimen.

Referring again to FIG. 19, and following, it will be seen that the platform base 301, as described, above, includes a coupling portion 330, which is made integral with the anterior facing surface 303 thereof. The coupling portion 330 is similar in operation to the coupling portion 30, as was discussed with respect to the first and second forms of the invention. In this regard, the coupling portion 330, as seen in the drawings, includes or defines a curved dovetail-shaped slot 331, and which is operable to slidably and matingly couple with a plurality of the bracket bodies, as will be described, hereinafter. The curved dovetail-shaped slot 331 is defined, in part, by spaced, angulated sidewalls, which are indicated by the numeral 332. Still further, the anterior facing surface 303, is defined, in part, by curved, upwardly facing surfaces 333, and which are individually operable to cooperate with the bracket body, as will be described, hereinafter. The curved upwardly facing surfaces 334 define, in part, inwardly extending flange portions 335, and which individually form, at least in part, the curved dovetail-shaped slot 331. Similar to that which was illustrated and described in the previous forms of the invention, a plurality of engagement regions 336 are formed in, and extend downwardly through or into the curved upwardly facing surfaces 334. The respective engagement regions 336 operate in a manner which is similar to that earlier described. It should be noted with respect to FIG. 19, and following, that the engagement regions 336, which are located on the opposite peripheral edges 305 of the platform base 301, are substantially coaxially aligned, one relative to the other. The operation of this form of the invention will be discussed in greater detail, hereinafter. Again, the platform base 301 has a reduced thickness 306, and increased amounts of material are typically deposited on the anterior facing surface of the pad 310, and then, post-fabrication, the pad 310 is machined or otherwise modified prior to being affixed to the platform base 301 so as to provide the desired amount of torque for appropriate orthodontic treatment of the patient.

Referring further to the FIG. 19, and following, the third form of the orthodontic bracket 300 includes a bracket body 340, and which operates in a manner which is similar to the bracket body 40, as disclosed in the first form of the invention (FIGS. 1 to 7). The bracket body 340, as illustrated, has a main body 341, which has an anterior facing surface 342, and an opposite, posterior facing surface 343. The main body 341 further has a superior facing surface 344, and an opposite inferior facing surface 345. Similar to that which was earlier described, the bracket body 340 includes a moveable gate 350, which permits access to an archwire slot 360. The archwire slot 360 is defined, in part, by a superior facing surface 361, and an opposite, inferior facing surface 362, which is disposed in spaced relation relative thereto. A supporting or recessed wall 363 extends between the superior, and inferior facing surfaces 361, and 362, respectively. The main body 341, and in particular the posterior facing surface 343, has a curved surface 380. Still further, and as will be seen, the main body is also defined, in part, by a curved male pin member 381, and which is further made integral with the posterior facing surface 343. The curved male pin member is defined, at least in part, by complimentary, curved surfaces 383, and which are further operable to be matingly received in inter-fitted relation within the curved dovetail-shaped slot 331, as defined by the coupling portion 330. As seen in the drawings, a passageway 384 is formed in the main body 341, and extends between the supporting recessed wall 363, and through the curved male pin member 381, and further terminates at the complimentary curved surface 383. The passageway 384 has a first end 385, and an opposite, second end 386. As seen in the drawings, it should be recognized that the passageway 384 has an enlarged first portion 387, which extends from the complimentary curved surface 383, and in the direction of the supporting or recessed wall 363; and a second portion 388, and which has a cross-sectional dimension which is smaller than the first portion, and which further extends from the first portion 387 to the supporting recessed wall 363. The function of this passageway is similar to that which was earlier disclosed in the second form of the invention.

As seen in the drawings, the third form of the bracket body 340 is operable to cooperate with an archwire 390 of conventional design. The characteristics of this archwire 390 was discussed with respect to the first and second forms of the invention, and further discussion regarding the structure of this element is not warranted. The bracket body 340 is similarly operable to cooperate with a bracket body insert, which is generally indicated by the numeral 400, and which further is best understood in the drawings as provided herewith. The bracket body insert 400 has opposite first and second ends, not shown, and an elongated main body 403. The elongated main body has top and bottom surfaces 404 and 405, respectively, and an anterior and posterior facing surface 406 and 407, respectively. Similar to the other forms of the bracket body insert, as earlier described, the bracket body insert 400 has first and second engagement portions, not shown. The first and second engagement portions each have an outside facing surface which has formed therein depressions, cavities or, as previously disclosed, rib members, and which allow a tool or even the fingers of a clinician to engage same, and exert force on the bracket body insert 400, so as to move it within the archwire slot 360. Again, and similar to the first and second forms of the bracket body, as earlier described, the third form of the bracket body insert 400 includes first and second engagement members, not shown, and which are operable to releasably cooperate with the individual engagement regions 336, which are formed in the coupling portion 330. As best seen in drawings, the bracket body insert 400 includes a central post or shaft 420, and which is sized to be received within the passageway 384, which is formed in the main body 341. The central post or shaft 420 has a distal end 421, which has affixed thereto an enlarged, movement limiting member 422. As seen in the drawings, this movement limiting member has an outside diametral dimension, which is less than the inside diametral dimension of a portion of the passageway 384. The movement limiting member 422 defines a path of travel, not shown, which is similar to that earlier discussed with regard to the first and second forms of the invention. Similar to that earlier described, the bracket body insert 400 is moveable along a path of travel (not shown) between a first position where the bracket body insert 400 rests in juxtaposed relation relative to the supporting or recessed wall 363, and therefore defines, at least in part, the archwire slot 360. Further, the bracket body insert 400 is moveable from this first position, to a second position (not shown), and which permits the first and second engagement members, as earlier discussed, to be moved out of engagement or cooperation with the individual engagement regions 336, and which are formed in the coupling portion 330. When disengaged from the respective engagement regions 336, the bracket body insert 400 permits the bracket body 340 to rotate relative to the platform base 301, so as to allow the clinician to reorient the bracket body in an appropriate position to receive the archwire 390, as earlier described. When appropriately positioned, the bracket body insert 400 is moved from the second position back to the first position and which causes the first and second engagement members to be received into a coupling, inter-fitted and matingly relationship within one of the engagement regions 336. This effectively now retains the bracket body 340 in a predetermined, fixed orientation relative to the platform base 301. As earlier discussed, this construction prevents the bracket body insert 400 from being removed from the bracket body 340 and further prevents the loss of this component during the treatment of a patient. Additionally, this feature provides an increased convenience for the clinician because the clinician no longer has to manually manipulate or handle an extremely small object and appropriately place it within the archwire slot 360.

Similar to the structure as earlier described in the first and second forms of the invention, the third form 300 provides a convenient means whereby a complete line of orthodontic brackets may be fabricated, and which allows a clinician to continue to practice in a manner in which they are most familiar. It further permits a clinician to continue utilizing orthodontic treatment plans which they have established, and found successful, and to further use the style of orthodontic brackets which are now considered relatively conventional. As seen in the drawings which are provided, the third form of the invention 300 may be useful in passive self-ligating brackets 500, conventional twin brackets 600, which have assisted self-ligation such as what is illustrated, and wherein an elastic ligature 610 is employed, and wherein the bracket body may be further fabricated so as to cooperate with hooks and other conventional orthodontic appliances not shown. Consequently, the present invention provides a convenient means whereby a platform base 20/201/301 may be installed on the tooth 11 of a patient requiring treatment, and thereafter a clinician may employ assorted different bracket bodies that he/she is very familiar with and implement an orthodontic treatment plan utilizing appliances and techniques for which little or no additional training is necessary. Further, the third form of the invention 300 does not require the removal of the platform base 301 from the tooth 11. This, of course, expedites the treatment plan selected, and further provides increasing comfort for the patient undergoing orthodontic treatment.

Fourth Form

Figure 26:
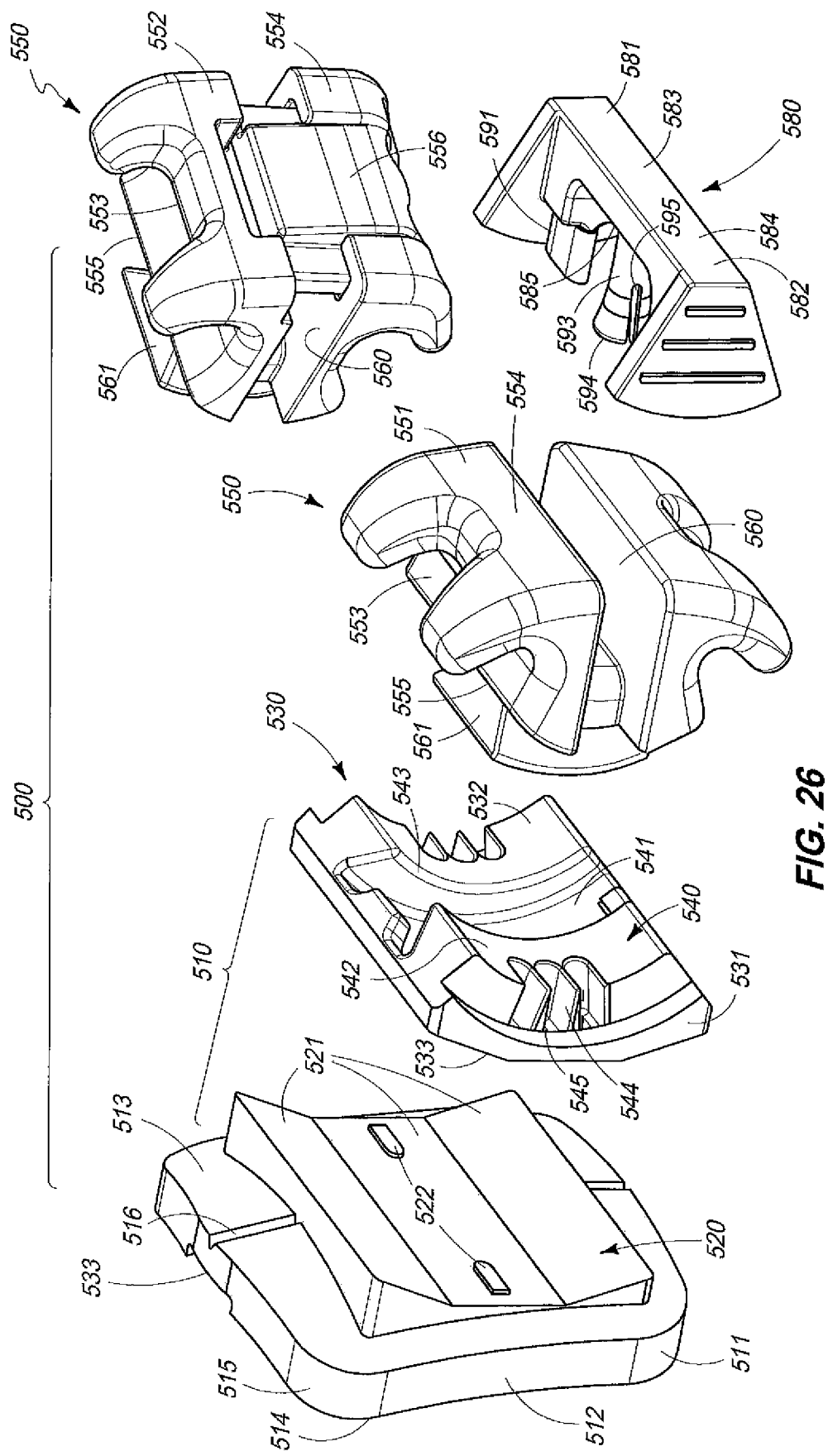
FIG. 26 is a greatly enlarged, exploded, perspective view of yet another form of the present invention.
Figure 27:
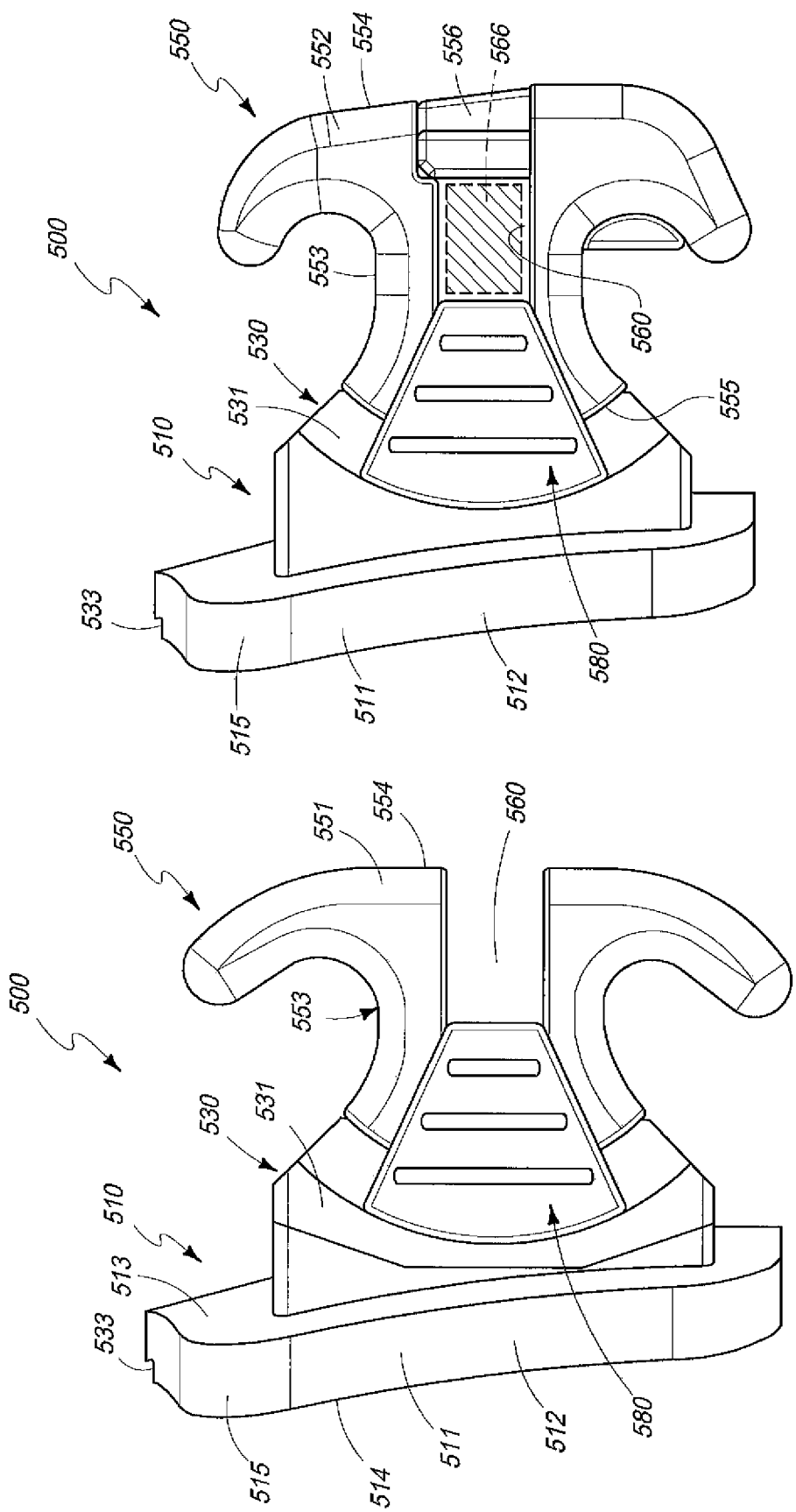
FIGS. 27A and 27B show side elevation views of two possible orthodontic bracket forms which possess features of the present invention.

The fourth form of the invention 500 is best seen in the drawings beginning at FIG. 26. The fourth form of the invention 500 operates in a manner quite similar to the other forms as earlier disclosed. However, the fourth form has other novel features which enhance the operation of the orthodontic bracket in the treatment of various orthodontic anomalies. As best seen in the drawings, the orthodontic bracket 500 includes a platform base 510, and which is defined, in part, by a pad 511. The pad 511 has a main body 512. The main body is defined by an anterior facing surface 513, and a posterior facing surface 514. The posterior facing surface of the pad 511 is attached to the patient's tooth 11, and which is undergoing the earlier mentioned orthodontic treatment regimen. The main body 512 further has a peripheral edge 515. As earlier mentioned, and as seen in the drawings, a scored orientation line 516 extends along the anterior facing surface 513, and provides a convenient visual point-of-reference for a clinician, so that the clinician can appropriately position the pad 511 on the anterior facing surface 12 of the patient's tooth 11. As seen in the drawings, the pad 511 includes a platform cradle 520, and which is made integral with the anterior facing surface 513 thereof. The platform cradle has a predetermined shaped as defined by a multiplicity of angled anterior facing surfaces 521. Still further, and as seen in the drawings, at least one coupling member 522 is mounted on one of the multiplicity of angled anterior facing surfaces 521, and extends anteriorly, outwardly relative thereto. The coupling member has a predetermined shape and size. Still further, and as seen in the drawings, a passageway 533 is formed in the posterior facing surface 514 of the pad 511, and communicates with the peripheral edge 515. The passageway 533 is employed to release an excessive amount of adhesive when the pad is affixed to the anterior facing surface 12 of the patient's tooth 11 by the clinician. This was discussed with respect to one of the earlier forms of the invention.

The orthodontic bracket 500 includes a platform which is generally indicated by the numeral 530. The platform has a main body 531 which has an anterior facing surface 532, and an opposite, posterior facing surface 533. It should be appreciated by a study of the drawings that the posterior facing surface 533 has a complimentary shape which allows it to matingly cooperate with the platform cradle 520 when the pad 511, and the platform 530, are affixed together, post-fabrication. As illustrated in the drawings, the current arrangement allows for an orthodontic bracket 500 to be fabricated which has neutral torque when it is employed on a typical patient's tooth 11.

Figure 28:
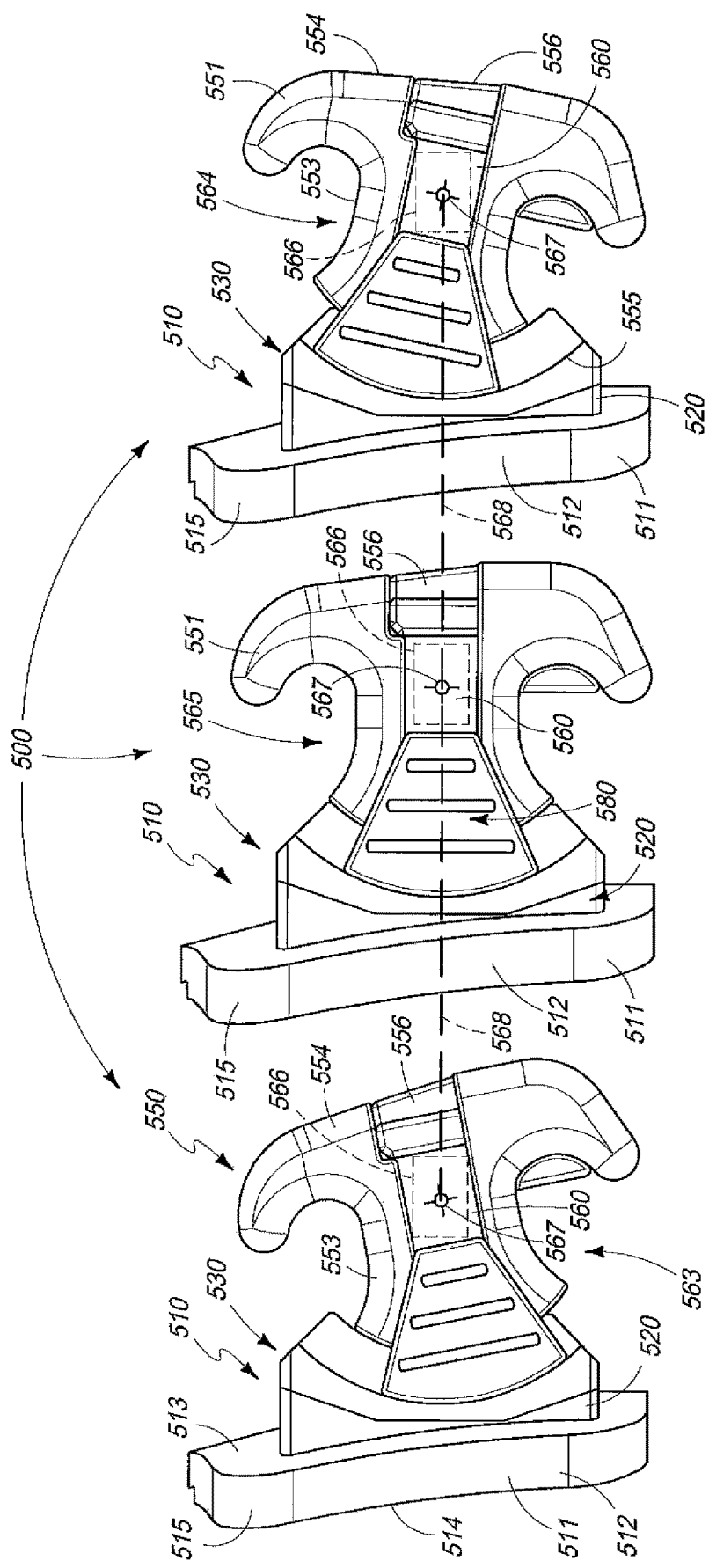
FIGS. 28A, 28B and 28C show side elevation views of the present invention in three alternative positions which exert torque on an archwire when the archwire is employed with same.
Figure 29:
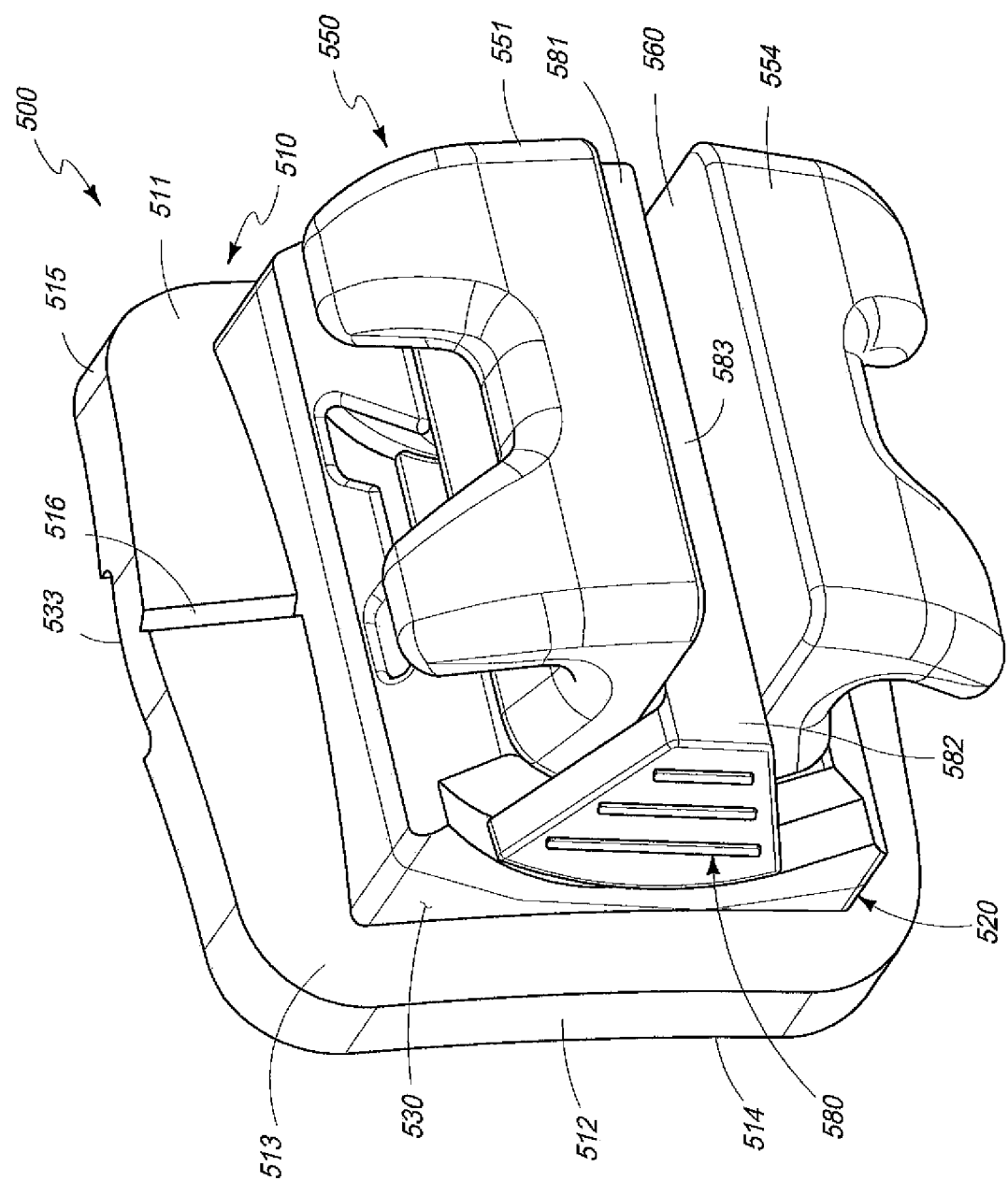
FIG. 29 is a greatly enlarged, perspective view of one form of the orthodontic bracket of the present invention.
Figure 30:
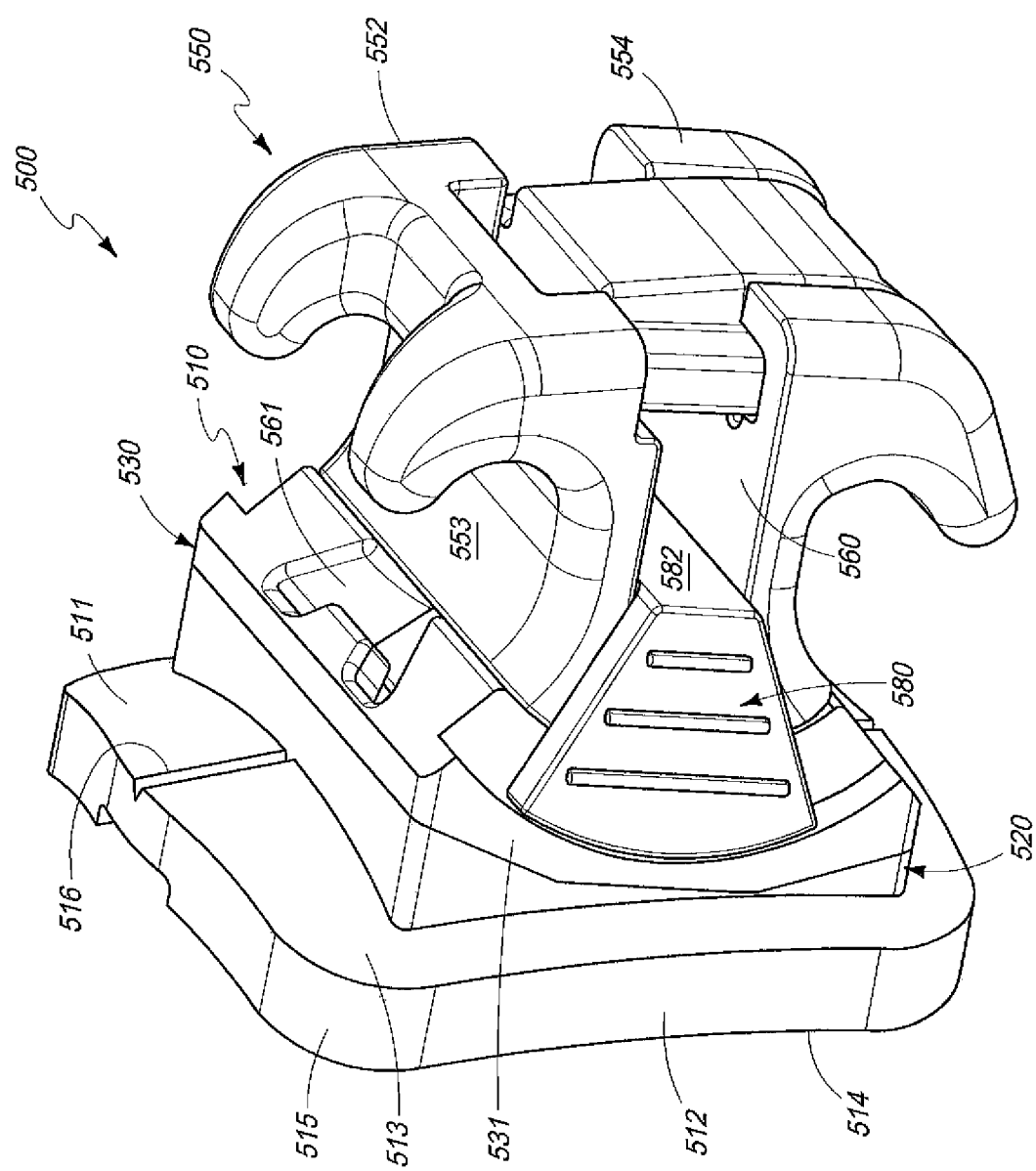
FIG. 30 is a second, greatly enlarged, perspective view of the form of the orthodontic bracket of the present invention as seen in FIG. 29.
Figure 31:
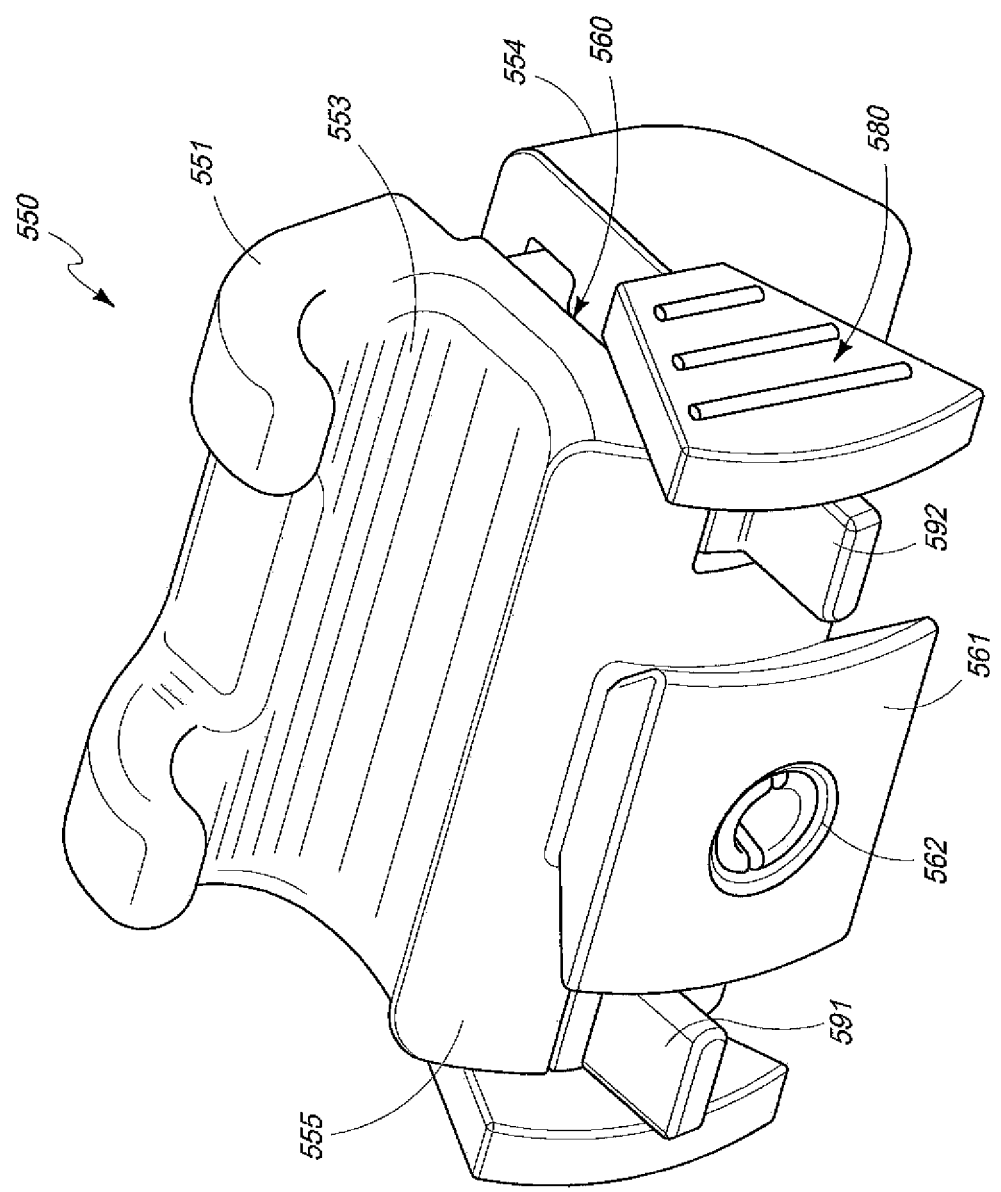
FIG. 31 is a greatly enlarged, posterior, perspective view of a bracket body which finds usefulness in the present invention.

As seen in the drawings which are provided herewith, the platform 530 includes a coupling portion 540, and which is somewhat similar in design to that which was described earlier in the application. Therefore, for purposes of brevity only the essential features of the structure relative to the fourth form of the invention 500 are described herein, it being understood that the remaining structures, as earlier disclosed, remain the same in the fourth form of the invention. In particular the coupling portion 540 includes, as earlier described, a curved dovetail-shaped slot 541, and which is operable to matingly, and moveably receive individual bracket bodies as will be described, hereinafter. Still further, the coupling portion 540 has a curved, upwardly facing surface 542, and is further defined, at least in part, by inwardly extending flange portions 543. Similarly, and as earlier described, the coupling portion 540 includes engagement regions 544, and which allows a bracket body insert, as will be described, below, to cooperate with same, and further allows a clinician to adjustably position a bracket body relative to the platform base 510 once it is positioned appropriately on the patient's tooth 11. Again, an engagement region 544 is formed or located on the opposite sides of the coupling portion 540, and which cooperates with the bracket body insert which will be described, below. In this form of the invention 500, and as seen in the drawings, a passageway 545 extends from the anterior facing surface 532, of the main body 531, to the posterior facing surface 533. This passageway 545 has a shape which is complimentary to the coupling member 522, and which extends anteriorly outwardly relative to at least one of the multiplicity of angled anterior facing surfaces 521, and which defines the platform cradle 520. The coupling member 522 is received within the passageway 545. The coupling member 522 is then secured to the platform 530 by welding during an assembly process. The coupling member 522, and the passageway 545, provide a convenient means whereby the platform can be appropriately and conveniently oriented relative to the pad 511, and then securely welded or affixed, in place, by a machine operator, using conventional technology. It should be understood that these particular parts, that being the pad 511, and the platform 530 are quite small, and therefore this arrangement of the coupling member 522, within the passageway 545, insures that the pad 511, and the platform 530 are appropriately orientated prior to welding, or otherwise being affixed together. The fourth form of the invention 500 includes a multiplicity of bracket bodies which are generally indicated by the numeral 550, and which further are only briefly described hereinafter, it being understood that the features of these bracket bodies as earlier discussed in significant detail in this application are substantially identical to this form of the invention. The bracket bodies 550 include a first form 551, which is herein illustrated as a generally, conventionally designed twin orthodontic bracket; and a second form 552, which is herein illustrated as a bracket body which implements passive self ligation, and which further includes a moveable gate 556, as earlier described. Each of the bracket bodies 550 has a main body 553 which is defined by an anterior or outside facing surface 554, and an opposite posterior facing surface 555, and which matingly and moveably cooperates with the platform 530. In this regard, each of the bracket bodies includes an archwire slot 560, and which is operable to receive an archwire 566 of conventional design, and which was earlier described. Still further the respective bracket bodies 550 each have a curved male pin member 561, and which is dimensioned for slidable mating receipt within the curved dovetail shaped slot 541, as defined by the coupling portion 540, of the platform 530. Similar to that described in the earlier forms of the invention, a passageway 562 is formed in the respective bracket bodies 550, and extends between the archwire slot 560, and the posterior facing surface 555. This is best understood by reference to FIG. 31. As seen in FIGS. 28A-C, and when assembled, the bracket bodies are moveable to given predetermined positions relative to the platform 530 to implement high torque 563 (FIG. 28A); neutral torque 564 (FIG. 28B); and low torque 565 (FIG. 28C); on the archwire 566 and which is received within the archwire slot 560. As will be noted from the aforementioned drawings, the movement of the bracket body 550 to implement or impart high, neutral and low torque 563, 564 and 565, on an arch wire 566 occurs in such a manner that the arch wire slot 560 remains in substantially the same plane (this has been termed a "level arch wire slot line-up") throughout the movement. As noted, earlier in the application, this is a novel feature of this invention which has not been available in orthodontic brackets which have been employed, heretofore. Referring again for FIGS. 28A; 28B; and 28C one of the inventive concepts of the present invention relates to an orthodontic bracket 500 which includes a platform base 510 which is releasably retained on an anterior facing surface 12 of one of a multiplicity of a patient's teeth 11, and wherein at least some of the patient's teeth 11 require an orthodontic treatment regimen which is implemented substantially simultaneously by a clinician, and wherein the platform base 510 remains affixed to the anterior facing surface of the patient's tooth during the orthodontic treatment regimen. The orthodontic bracket further includes multiple bracket bodies 550 which can individually, matingly, and sequentially cooperate with, and partially rotate relative to the platform base 510 so as to facilitate the orthodontic treatment regimen. Of course, the orthodontic brackets can be fabricated in manner where the bracket body is permanently affixed and immovable relative to the platform base. The respective bracket bodies 550 each have a given vertical position relative to an adjacent bracket body 550 and which is located on an adjacent tooth of the patient. This is best imagined by collectively looking at the images in FIGS. 28A, 28B, and 28C respectively. Further as seen in those same views, each bracket body 550 defines an arch wire slot 560 which has a central region 567, and which further is oriented along a given line of reference 568 and which defines the level arch wire slot line-up. The given line of reference 568 extends between the central region 567 of the arch wire slot 560, and the central region 567 of other arch wire slots 560 of still other bracket bodies 550, and which are located on the patient's other, and adjacent teeth 11, and which are undergoing the orthodontic treatment regimen. It should be recognized from studying FIGS. 28A, 28B, and 28C that the respective bracket bodies 550, whether moveable or immoveable, are oriented or mounted on the platform base or pad 510 so that the central region 567 of the arch wire slot 560 is located in an intermediate region of the platform base 510, that is, midway between the superior and inferior peripheral edges 322 an 323 of the platform base 510. The orthodontic bracket 500 further includes an arch wire 566 which extends between, and is received within, the arch wire slot 560 of each of the respective bracket bodies 550, and which are releasably positioned on the anterior facing surface 12 of the respective patient's teeth 11, and which further are undergoing the orthodontic treatment regimen. The partial rotation or fixed orientation of the bracket body 550 as seen in FIGS. 28A, 28B and 28C permits a clinician to impart a predetermined amount of torque on the patient's respective teeth 11 by forcibly engaging the arch wire 566 which is located within the arch wire slot 560. As should be understood, an adjustment of the predetermined amount of torque exerted on the patient's tooth 11, and/or a replacement of the bracket body 550 which releasably, and moveably engages the platform base 510, in one possible form of the invention, takes place while the central region 567 of the arch wire slot 560 remains substantially oriented along the predetermined line of reference 568, and in substantially the same vertical position relative to the arch wire slot 560 of the bracket bodies 550, and which are located on the adjacent teeth 11 of the patient. This level amp wire slot line-up feature is a very novel aspect of the present invention, and allows a clinician to adjust torque on multiple teeth 11 and insert a non-bent arch wire 566 into a bracket body 550 so as to immediately begin an orthodontic treatment regimen which includes expressing, for example, third order movement or control 15. This particular feature also saves considerable patient treatment time, aids in the proper deployment of the new orthodontic brackets at the initiation of treatment, and further provides for the enhanced control of the treatment forces which are applied to the patients respective teeth 11.

Figure 32:
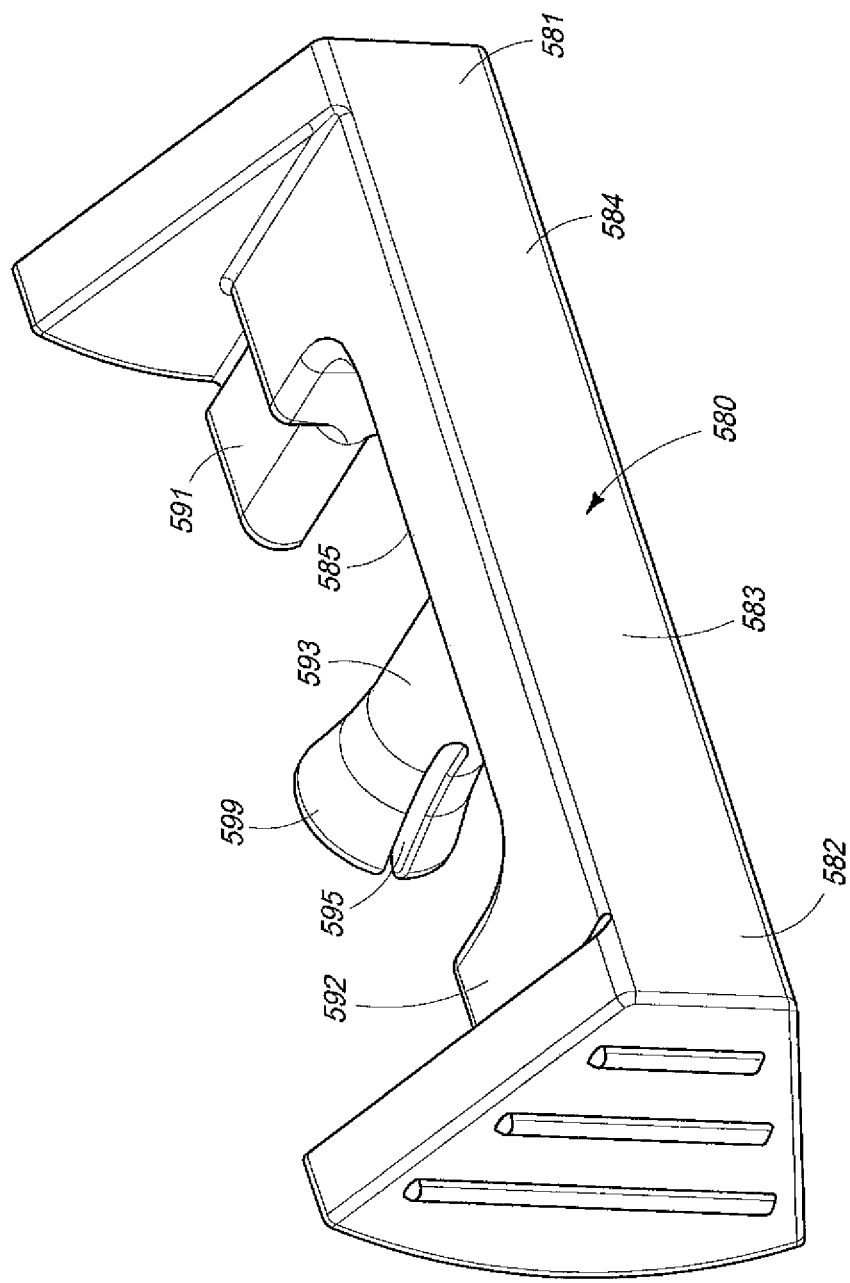
FIG. 32 is a greatly enlarged, anterior, perspective view of a bracket body insert which finds usefulness in the present invention.
Figure 33:
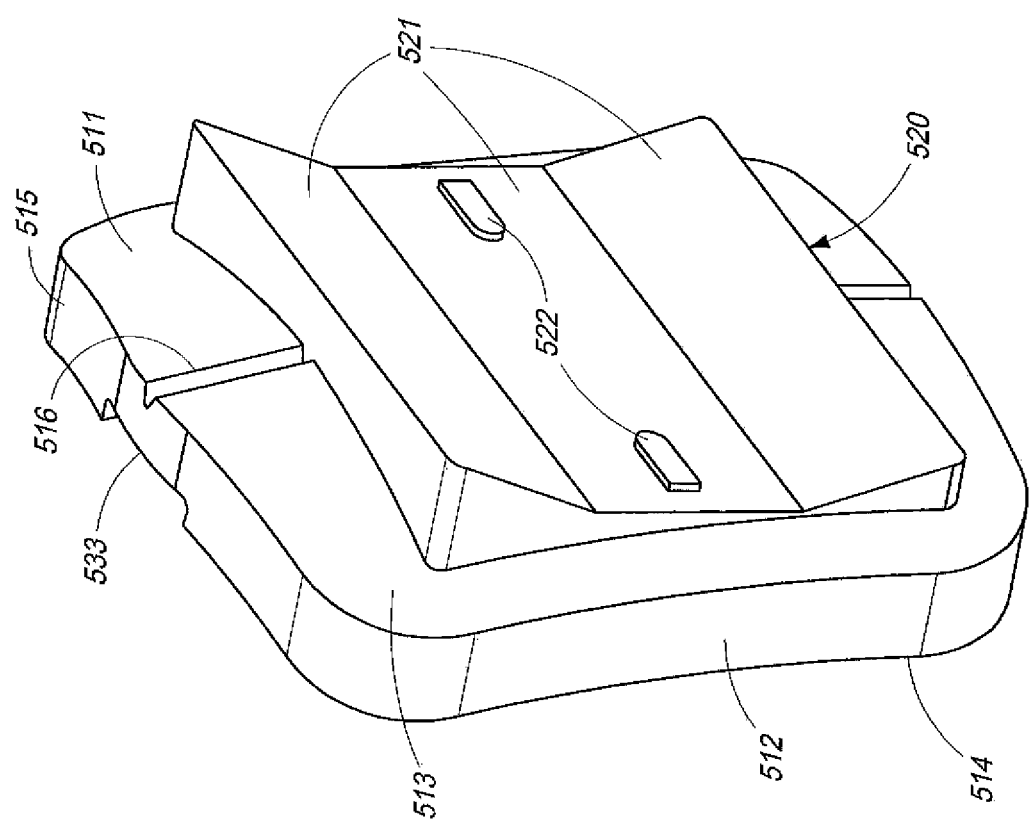
FIG. 33 is a perspective, anterior view of a pad which finds usefulness in one form of the present invention.
Figure 34:
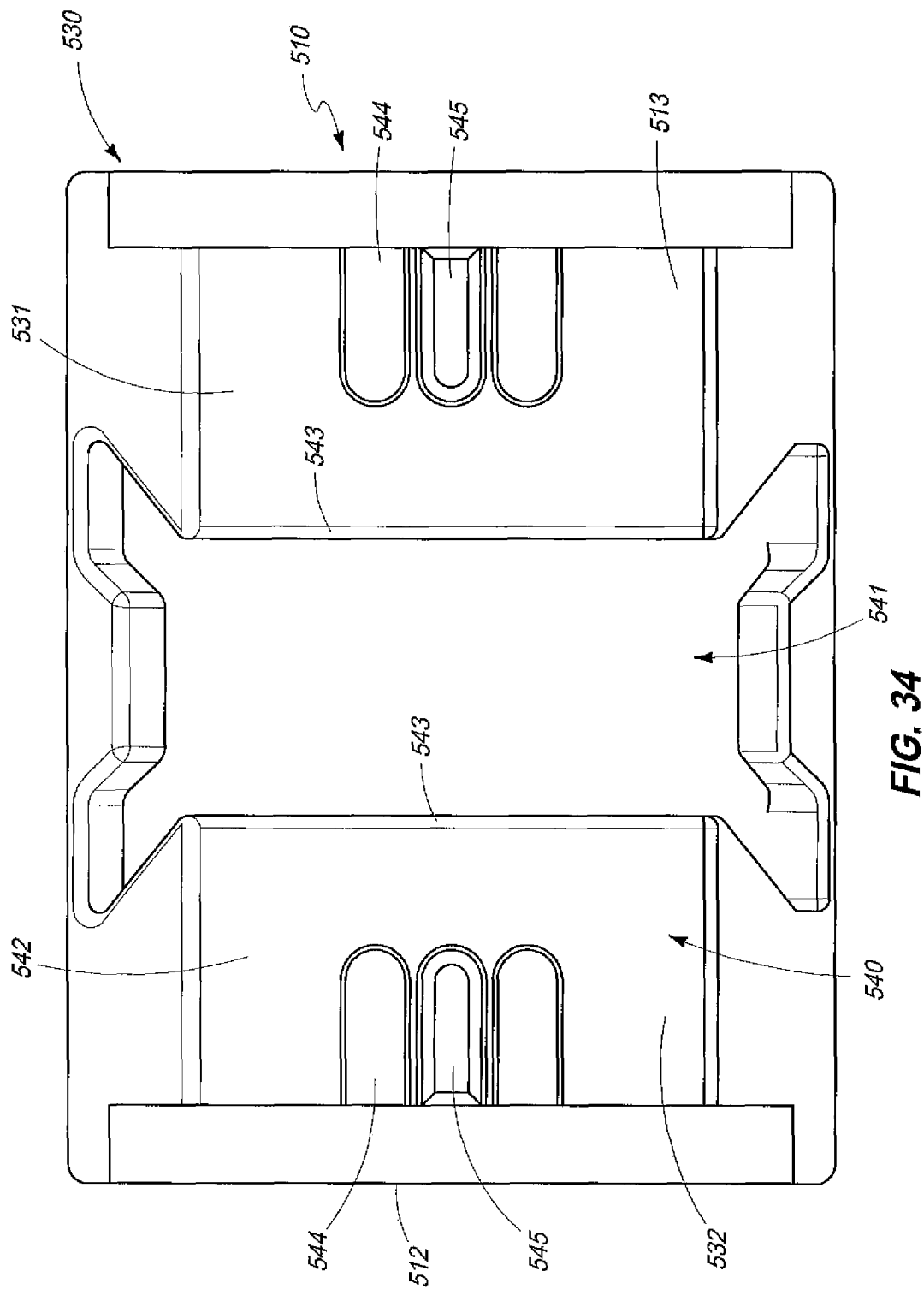
FIG. 34 is an anterior, plan view of a platform which finds usefulness in the present invention.
Figure 35:
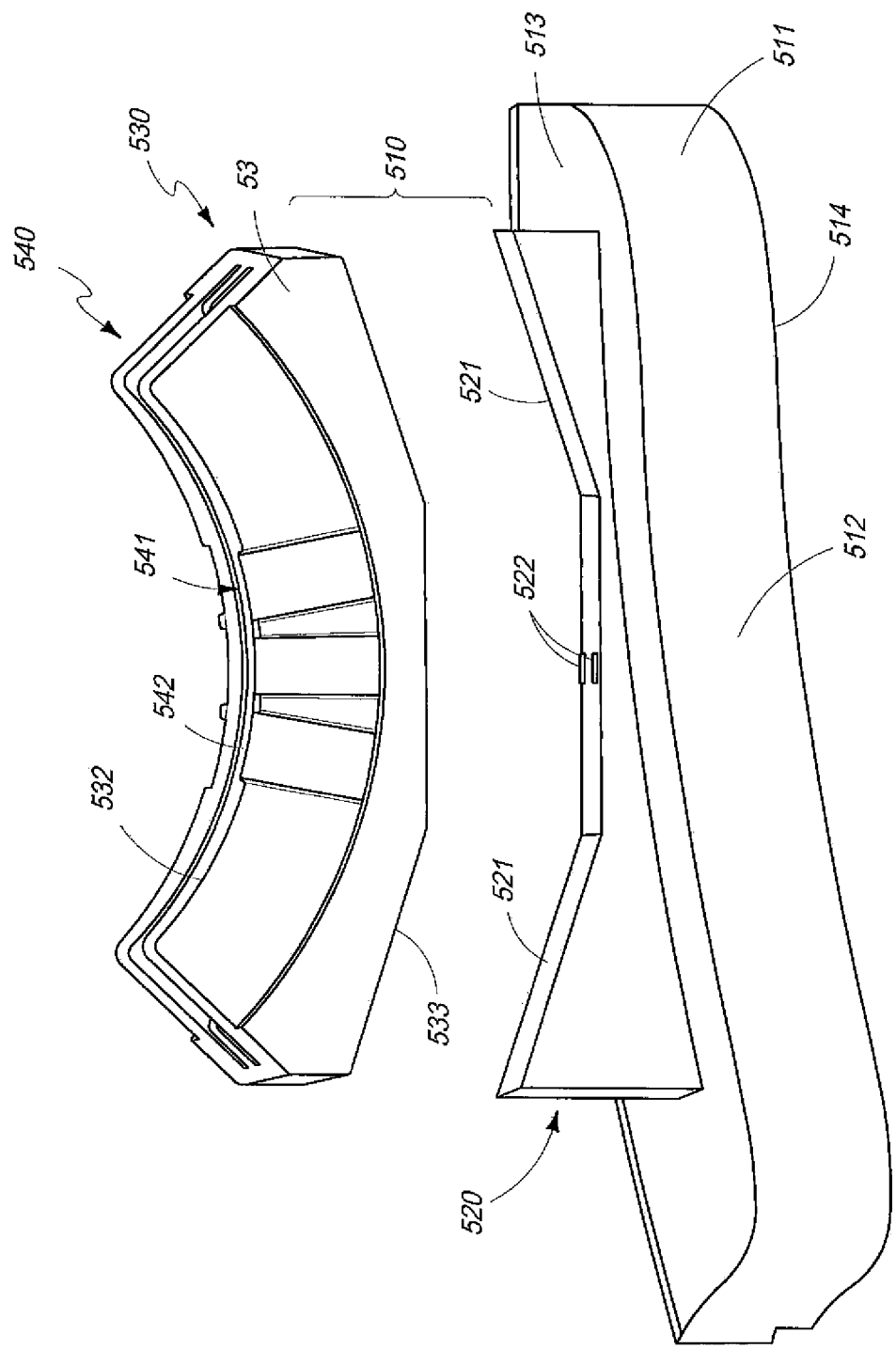
FIG. 35 is a greatly enlarged, exploded, side elevation view of a platform base which finds usefulness in one form of the present invention.

Similar to the other forms of the invention, the fourth form of the invention 500 includes a bracket body insert 580 and which is best indicated by FIGS. 26 and 32 in the drawings. The bracket body insert 580 works in a manner similar to the earlier forms of the invention which have been described. The bracket body insert 580 has a first and second end, 581 and 582, respectively, and further includes an elongated main body 583 which is sized so as to be received within the archwire slot 560. The elongated main body 583 has an anterior facing surface 584, and which forms, at least in part, a portion of the archwire slot 560, and an opposite, posterior facing surface 585. As seen in the drawings, the bracket body insert 580 includes first and second engagement members 591 and 592, respectively, and which extend posteriorly outwardly relative to the opposite first and second ends 581 and 582, respectively. The engagement members 591 and 592 are dimensioned so as to be matingly received within the respective engagement regions 544 as formed in the coupling portion 540. As earlier described, the selective movement of the bracket body insert 580 so as to move the respective first and second engagement members 591 and 592 into individual receipt within the respective passageways which form the engagement region 544, allows the bracket body 550 to be located in a given, predetermined position, so as to impart high, neutral or low torque 563, 564 and 565 respectively to an accompanying archwire 566, and which is received within the archwire slot 560. In this form of the invention 500, and as best seen in the drawings, the bracket body insert 580 includes a retention member 593 which is mounted on the posterior facing surface of the elongated main body 583, and which extends posteriorly, outwardly, relative thereto. The retention member 593 is sized so as to be received within the passageway 562, and which extends from the archwire slot 560, to the posterior facing surface 555 of the bracket body 550. As seen in the drawings, the distal end 594 of the retention member 593 has formed therein a longitudinally extending slot 595. Following receipt of the retention member 593 within the passageway 562, a tool or other implement is utilized to exert force on the distal end 594 of the retention member 593 thereby increasing the outside diametral dimension of the distal end 594. This expansion of the distal end 594, to increase the outside diametral dimension of same causes the retention member 593 to frictionally engage the passageway 562. This frictional engagement substantially impedes the premature movement of the bracket body insert 580 into the archwire slot 560 when a smaller cross-sectionally dimensioned archwire 566 is being employed within the archwire slot 560. However, the friction which is generated is not sufficient to prevent a clinician from utilizing a tool, or their fingers for that matter, to exert force on the first and second ends 581 and 582 of the bracket body 580 to temporarily move the bracket body insert 580 into the archwire slot 560, so as to affect a disengagement of the first and second engagement members 591 and 592 from the engagement region 544 of the coupling portion 540. Thus, a clinician may effectively move the bracket body insert 580 into the archwire slot 560, and cause a resulting rotational movement of the bracket body 550 relative to the coupling portion 540; and then again push the bracket body insert 580 back into a fully seated position where the first and second engagement members 591 and 592 releasably orient the bracket body 580 in an appropriate, and clinician selected, high, neutral or low torque position 563, 564 and 565 respectively. The expanded distal end 594 of the retention member 593 prevents the bracket body insert 580 from being removed from the archwire slot 560, but allows sufficient movement of the bracket body insert so that rotation of the bracket body 550 can be achieved.

Figure 36:
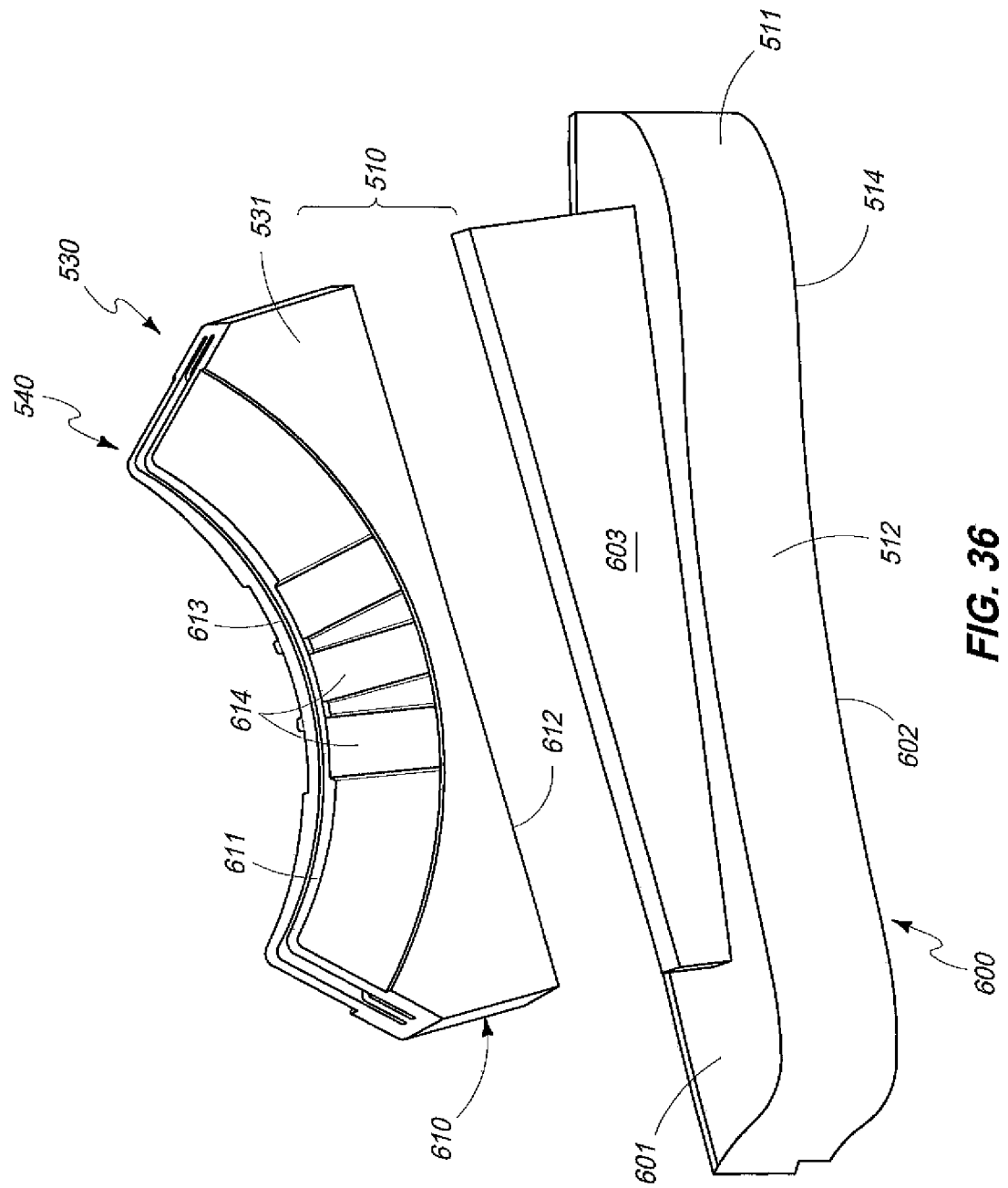
FIG. 36 is a greatly enlarged, exploded, side elevation view of still another form of a platform base which finds usefulness in one form of the present invention.

Referring now to FIG. 36, another alternative pad is shown and which is indicated by the numeral 600. Again, this pad 600 operates in a manner similar to that which was earlier described for the other described pads, that being, it has an anterior facing surface 601, and a posterior facing surface 602 and which is releasably coupled to the anterior facing surface 12 of the patient's tooth 11. In this particular variation, the pad 600, includes additional material 603, and which is deposited on the anterior facing surface 601, and can thereafter be machined, post-fabrication, into any resulting topography so as to allow a clinician to order custom-manufactured brackets to address orthodontic anomalies on a patient which requires special treatment. Still further, and as seen in the drawings, an alternative platform 610 is illustrated, and which has an anterior facing surface 611, and a posterior facing surface 612. The alternate platform 610, again, has the dove tailed-shaped slot or channel 613 as earlier described, and engagement regions 614. In this particular, alternative form, the posterior facing surface 612 of the alternative platform 610 is again affixed by welding or the like to the anterior facing surface 601 of the alternative pad 600 so as to achieve a resulting arrangement which allows a clinician to select a predetermined amount of torque to address an orthodontic anomaly for a patient having special needs.

Operation

The operation of the described embodiment of the present invention is believed to be readily apparent, and is briefly summarized at this point. In one of its broadest aspects, the present invention relates to an orthodontic bracket 10 which includes a platform base 20 and which further is releasably retained on an anterior surface 12 of a patient's tooth 11. Further, the invention 10 includes multiple bracket bodies 40 as earlier disclosed, and which can individually, matingly and sequentially cooperate with the platform base 20 so as to facilitate an orthodontic treatment regimen which is selected for a patient by a treating clinician, and without a removal of the platform base 20 from the anterior facing surface 12 of the patient's tooth 11 during the orthodontic treatment regimen.

As earlier disclosed, and in one form of the invention, the orthodontic bracket 10, following fabrication, has a posterior, or outside facing surface 23, having a sufficient material thickness, and which can be modified so as to provide a clinician with selected, predetermined amounts of torque, and which can be exerted on the patient's tooth 11 during the orthodontic treatment regimen. As should be understood, the clinician selected amount of torque could be neutral, or further some other given amount as determined by the clinician. As should be understood, the individual bracket bodies 40 which cooperate with the platform base 20 are either immovable or adjustably moveable relative to the platform base 20, and during the orthodontic treatment regimen. The respective bracket bodies further include conventional bracket bodies 230, twin bracket bodies, passive self-ligating bracket bodies 330, active self-ligating bracket bodies 340 and bracket bodies which are either immoveable or adjustably moveable relative to the platform base 20, and which may generate neutral, high and/or low torques. Still further, some of the bracket bodies which matingly cooperate with the platform base 20 have hooks 342, and/or other orthodontic appliances, and which generate neutral, low and/or high torques on the patient's tooth 11 undergoing the orthodontic treatment regimen.

Figure 18:
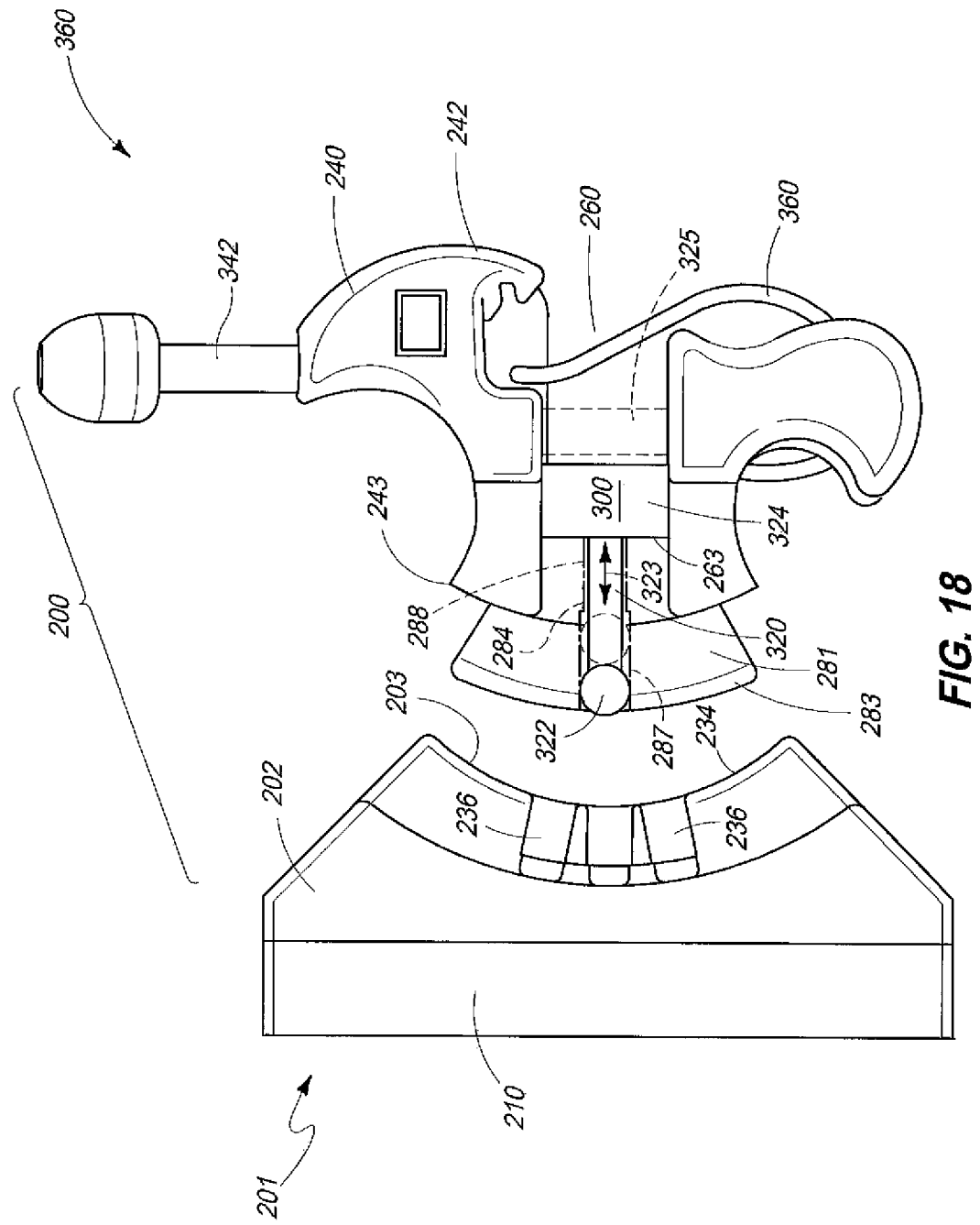
FIG. 18 is yet another exploded, transverse, vertical section view of a bracket body which matingly cooperates with the second platform base, and which forms a feature of the present invention.

As seen in FIG. 18, and following, and in another form of the invention, an orthodontic bracket 300, and which includes a platform base 301, is matingly and releasably positioned adjacent to an anterior facing surface 12 of a patient's tooth 11. The patient's tooth 11 is subject to a multiple step orthodontic treatment regimen. The platform base 301 has an anterior facing surface 303, and a posterior facing surface 304. The orthodontic bracket as seen in FIG. 18, and following, includes a multiplicity of bracket bodies 340, which are operable to individually, matingly, and sequentially cooperate with the anterior facing surface 303 of the platform base 301, and which implement individual steps of the multiple-step orthodontic treatment regimen. The orthodontic bracket 300, as seen in FIG. 18 and following, further includes a pad 310 which is made integral with the posterior facing surface 304 of the platform base 301, and which further has a posterior facing surface 314, which is juxtaposed relative to the anterior facing surface 12 of the patient's tooth 11. The pad 310 has a predetermined, and variable thickness dimension, and topography, and which locates the respective bracket bodies 340, which cooperate with the platform base 301, in an orientation relative to the patient's tooth 11 and which is undergoing an orthodontic treatment regimen so as to impart varying degrees of torque, and other forces, and which, in combination, corrects an orthodontic anomaly which the patient's tooth possesses.

The orthodontic bracket 300, as seen in FIG. 18 and following, and as noted above, includes a pad 310, which has an anterior facing surface 313, which is made integral with the posterior facing surface 304 of the platform base 301. The posterior facing surface 314 of the pad 310 has at least one cavity 320 which is formed therein, and which receives the source of an adhesive 326, which releasably retains the pad 310 on the anterior facing surface 12 of the patient's tooth 11. As should be understood, the pad 310 is defined, at least in part, by a peripheral edge 321, and which as an aperture 324 formed therein. The cavity 320, which is formed in the posterior facing surface of the pad, is coupled in fluid flowing relation relative to the aperture 324, and which is formed in the peripheral edge 321 of the pad 310. As should be understood, an excessive amount of adhesive 326, which is received within the cavity 320, may fluid-flowingly move through the aperture 324 when the pad is located in, and pressed into a juxtaposed relationship relative to, the anterior facing surface 12 of the patient's tooth 11. In the arrangement as seen in the drawings, the peripheral edge 321 of the pad 310 has a superior or first peripheral edge portion 322, which is located in spaced relation relative to the patient's gum, and an opposite, inferior or second peripheral edge portion 323, and which is located in spaced relation relative to a crown of the patient's tooth 11. The aperture 324, which is formed in the peripheral edge of the pad 310, is formed in the inferior or second peripheral edge portion 323 of the pad 310. It should be understood that the pad 310 includes a multiplicity of forms having predetermined and different thickness dimensions, and topographies, and which are further operable when affixed to the platform base 301 to exert predetermined amounts of torque, or other forces to the patient's tooth 11. In this regard, it should be understood that a clinician implementing an orthodontic treatment regimen selects the pad 310, which will impart the predetermined amount of torque and other forces to the patient's tooth 11 so as to achieve a desired orthodontic treatment objective. As was the case with the earlier forms of the invention as described, the multiple-step orthodontic treatment regimen selected by a clinician includes the treatment of a multiplicity of the patient's teeth 11, and which have individual unique orthodontic anomalies. In the present invention, the same platform base 301 is employed on each of the patient's teeth 11, and remains affixed to the patient's teeth during the entire orthodontic treatment regimen. Again, the present invention is operable to utilize bracket bodies which include conventional bracket bodies; twin bracket bodies; passive self-ligating bracket bodies; active self-ligating bracket bodies; bracket bodies with neutral, high, and/or low torques; and bracket bodies having hooks and/or other orthodontic appliances and which generate neutral, low and/or high torques.

Therefore, it will be seen that the present invention provides treatment options for a clinician not possible heretofore. The present orthodontic bracket allows a clinician to proceed with a given treatment plan for a patient by employing multiple bracket bodies which can be releasably and matingly affixed to a platform base 20 and which remains affixed to a patient's tooth 11 throughout the treatment regimen. This new orthodontic bracket greatly enhances the treatment options available to a clinician, advances the speed of treatment of a patient beyond what has been available heretofore, and further increases the comfort of the patient during an orthodontic treatment regimen which may include multiple treatment steps. In addition to the foregoing advantages, manufacturers will experience increased cost savings because these same manufacturers can now fabricate multiple bracket body types which utilize the same platform base, and further employ a similar pad which can, post-fabrication, be modified so as to be useful on patient's having tooth anomalies which could not be conveniently addressed heretofore.

In compliance with the statute, the invention has been described in language more or less specific as to structural and methodical features. It should be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalence.

We claim:
1. An orthodontic bracket comprising:
  a base including a first surface configured for securement to a tooth and a coupling portion opposite the first surface;
  a bracket body including an archwire slot extending along an axis and a slide engagement track, the bracket body being rotatably coupled to the platform base via the coupling portion such that the bracket body is rotatable about the axis; and
  a ligating slide that is movable in the slide engagement track between an opened position and a closed position,
  wherein the coupling portion includes a first curved surface and the bracket body includes a complementary second curved surface which matingly and moveably engages the first curved surface,
  wherein the bracket body includes a male pin member having a shaft region extending outwardly from the bracket body to a distal end, and wherein the second curved surface is positioned on the distal end, and
  wherein the coupling portion includes first and second inwardly extending flanges and the distal end includes an enlarged flange, and wherein the first and second inwardly extending flanges slidably and matingly capture the enlarged flange.
2. The orthodontic bracket of claim 1, wherein the second curved surface is positioned on the enlarged flange.

3. The orthodontic bracket of claim 1, further comprising:
  a bracket body insert movably coupled to the bracket body and configured to define at least a portion of the archwire slot.
4. The orthodontic bracket of claim 3, wherein the bracket body includes a recessed wall between the slide engagement track and the base, and wherein the bracket body insert is configured to abut the recessed wall.
5. The orthodontic bracket of claim 3, wherein the bracket body insert includes a cavity configured to receive a tool for effecting removal of the bracket body insert from the bracket body.
6. The orthodontic bracket of claim 3, wherein the bracket body insert includes a main body terminating at first and second ends including first and second engagement members, respectively.
7. The orthodontic bracket of claim 6, wherein the bracket body includes first and second passageways configured to slidably receive the first and second engagement members, respectively, for movably coupling the bracket body insert to the bracket body.
8. An orthodontic bracket comprising:
  a base including a first surface configured for securement to a tooth and a coupling portion opposite the first surface;
  a bracket body including an archwire slot extending along an axis and a slide engagement track, the bracket body being rotatably coupled to the base via the coupling portion such that the bracket body is rotatable about the axis; and
  a ligating slide that is movable in the slide engagement track between an opened position and a closed position,
  wherein the coupling portion includes a first curved surface and the bracket body includes a complementary second curved surface which matingly and moveably engages the first curved surface,
  wherein the bracket body includes a male pin member having a shaft region extending outwardly from the bracket body to a distal end, and wherein the second curved surface is positioned on the distal end, and
  wherein the coupling portion includes first and second elevated regions positioned on opposite sides of the first curved surface and including third and fourth curved surfaces, respectively, and wherein the bracket body includes fifth and sixth curved surfaces which are complementary to and matingly and moveably engage the third and fourth curved surfaces, respectively.
9. The orthodontic bracket of claim 8, wherein the first, third, and fourth curved surfaces each have a same curvature.
10. An orthodontic bracket comprising:
  a base including a first surface configured for securement to a tooth and a coupling portion opposite the first surface;
  a bracket body including an archwire slot extending along an axis and a slide engagement track, the bracket body being rotatably coupled to the base via the coupling portion such that the bracket body is rotatable about the axis;
  a ligating slide that is movable in the slide engagement track between an opened position and a closed position; and
  a bracket body insert movably coupled to the bracket body and configured to define at least a portion of the archwire slot,
  wherein the coupling portion includes a first curved surface and the bracket body includes a complementary second curved surface which matingly and moveably engages the first curved surface, wherein the bracket body includes a male pin member having a shaft region extending outwardly from the bracket body to a distal end, and wherein the second curved surface is positioned on the distal end wherein the bracket body insert includes a main body terminating at first and second ends including first and second engagement members, respectively, wherein the bracket body includes first and second passageways configured to slidably receive the first and second engagement members, respectively, for movably coupling the bracket body insert to the bracket body, and wherein the first engagement member includes a distal end, and wherein the base includes a plurality of engagement regions configured to matingly receive the distal end for selectively positioning the bracket body in corresponding rotational orientations relative to the base.

11. The orthodontic bracket of claim 10, wherein at least a portion of the engagement regions are positioned on opposite sides of the first curved surface.

12. The orthodontic bracket of claim 10, wherein the first engagement member is longer than the second engagement member.

* * * * *

UNITED STATES PATENT AND TRADEMARK OFFICE
CERTIFICATE OF CORRECTION

| | |
|---|---|
| PATENT NO. | : 10,945,815 B2 |
| APPLICATION NO. | : 14/702961 |
| DATED | : March 16, 2021 |
| INVENTOR(S) | : Paul L. Damon et al. |

It is certified that error appears in the above-identified patent and that said Letters Patent is hereby corrected as shown below:

In the Specification

Column 1, Lines 15-20, "reference herein, orthodontic brackets are described, and which when used in combination with an archwire, provides" should be --reference herein, orthodontic brackets are described, and which when used in combination with an archwire, provide--.

Column 1, Line 65, "These and other concerns frequently causes delays in the" should be --These and other concerns frequently cause delays in the--.

Column 1, Line 67 thru Column 2, Lines 1-4, "[tanta-]mount to clinical malpractice, it is clear that the delay in the implementation of ... often are not in the patients' best interest," should be --[tanta-]mount to clinical malpractice, it is clear that the delays in the implementation of ... often are not in the patients' best interest,--.

Column 4, Line 30, "another possible form a pad which forms a portion of the" should be --another possible form of a pad which forms a portion of the--.

Column 8, Line 8, "body which moveably, and mating cooperates with the" should be --body which moveably, and matingly cooperates with the--.

Column 8, Lines 24-26, "The superior and inferior facing services 46 and 47, define respective the wings which" should be --The superior and inferior facing surfaces 46 and 47 define respective tie wings which--.

Column 9, Line 7, "surface 43 defines a complimentary, substantially uniformly" should be --surface 43 defines a complementary, substantially uniformly--.

Column 9, Line 13, "further includes a complimentary" should be --further includes a complementary--.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*

Column 9, Lines 26-27, "is further dimensioned for complimentary, slidable, matingly engagable receipt" should be --is further dimensioned for complementary, slidable, matingly engagable receipt--.

Column 9, Line 53, "enlarged flange 85 has a complimentary, curved surface 86," should be --enlarged flange 85 has a complementary, curved surface 86,--.

Column 11, Lines 8-10, "the first and second engagement portions 111 and 112 extend ..., and further provides a convenient means by" should be --the first and second engagement portions 111 and 112 extend ..., and further provide a convenient means by--.

Column 11, Lines 61-62, "which can, post fabrication, be machined to assorted thickness, a multitude of" should be --which can, post fabrication, be machined to assorted thicknesses, a multitude of--.

Column 14, Line 28, "facing surface 203 is defined, in part, by a curved upwardly facing surfaces 233," should be --facing surface 203 is defined, in part, by curved upwardly facing surfaces 233,--.

Column 14, Lines 65-66, "male pin member is defined, in part, by a complimentary curved surface 283," should be --male pin member is defined, in part, by a complementary curved surface 283,--.

Column 15, Lines 5-6, "281, and terminates at the complimentary curved surface 283." should be --281, and terminates at the complementary curved surface 283.--.

Column 15, Lines 18-19, "The characteristics of this archwire 290 was discussed with respect to the first" should be --The characteristics of this archwire 290 were discussed with respect to the first--.

Column 16, Lines 17-18, "inasmuch as the central post/shaft 320 and the enlarged movement limiting member 322, in combination, provides a" should be --inasmuch as the central post/shaft 320 and the enlarged movement limiting member 322, in combination, provide a--.

Column 19, Line 9, "complimentary, curved surfaces 383" should be --complementary, curved surfaces 383--.

Column 19, Lines 15-16, "male pin member 381, and further terminates at the complimentary curved surface 383." should be --male pin member 381, and further terminates at the complementary curved surface 383.--.

Column 19, Lines 29-30, "The characteristics of this archwire 390 was discussed with respect to the" should be --The characteristics of this archwire 390 were discussed with respect to the--.

Column 20, Lines 17-18, "the first and second engagement members to be received into a coupling, inter-fitted and matingly relationship within one" should be --the first and second engagement members to be received into a coupling, inter-fitted and mating relationship within one--.

Column 21, Line 15, "The platform cradle has a predetermined shaped as defined" should be --The platform cradle has a predetermined shape as defined--.

CERTIFICATE OF CORRECTION (continued)
U.S. Pat. No. 10,945,815 B2

Column 21, Line 34, "facing surface 533 has a complimentary shape which allows" should be --facing surface 533 has a complementary shape which allows--.

Column 22, Line 1, "This passageway 545 has a shape which is complimentary to the coupling member" should be --This passageway 545 has a shape which is complementary to the coupling member--.

Column 23, Line 30, "superior and inferior peripheral edges 322 an 323 of the" should be --superior and inferior peripheral edges 322 and 323 of the--.

Column 23, Line 52, "This level amp wire slot line-up feature is a" should be --This level arch wire slot line-up feature is a--.

Column 24, Line 49, "affect a disengagement of the first and second engagement" should be --effect a disengagement of the first and second engagement--.

Column 26, Lines 33-34, "defined, at least in part, by a peripheral edge 321, and which as an aperture 324 formed therein." should be --defined, at least in part, by a peripheral edge 321, and which has an aperture 324 formed therein.--.

Column 27, Lines 27-28, "fabrication, be modified so as to be useful on patient's having tooth anomalies which" should be --fabrication, be modified so as to be useful on patients having tooth anomalies which--.

In the Claims

Column 27, Line 46, Claim 1, "being rotatably coupled to the platform base via the" should be --being rotatably coupled to the base via the--.

Column 29, Line 6, Claim 10, "curved surface is positioned on the distal end" should be --curved surface is positioned on the distal end,--.